(12) United States Patent
Svec et al.

(10) Patent No.: US 12,214,358 B1
(45) Date of Patent: Feb. 4, 2025

(54) SYSTEMS AND METHODS FOR DRYING ASPHALT SHINGLE WASTE

(71) Applicant: BMIC LLC, Dallas, TX (US)

(72) Inventors: James A Svec, Kearny, NJ (US); Maxwell Everett, Parsippany, NJ (US)

(73) Assignee: BMIC LLC, Dallas, TX (US)

(*) Notice: Subject to any disclaimer, the term of this patent is extended or adjusted under 35 U.S.C. 154(b) by 0 days.

(21) Appl. No.: 18/503,706

(22) Filed: Nov. 7, 2023

Related U.S. Application Data

(60) Provisional application No. 63/382,562, filed on Nov. 7, 2022.

(51) Int. Cl.
| | |
|---|---|
| *B02C 19/00* | (2006.01) |
| *B09B 3/50* | (2022.01) |
| *C08L 95/00* | (2006.01) |
| *C09D 195/00* | (2006.01) |

(52) U.S. Cl.
CPC ............ *B02C 19/0056* (2013.01); *B09B 3/50* (2022.01); *C08L 95/00* (2013.01); *C09D 195/00* (2013.01); *C08L 2555/34* (2013.01)

(58) Field of Classification Search
CPC ..... B02C 19/0056; B02C 19/186; B09B 3/00; B09B 3/405; C08L 95/00; C08L 2555/22; C08L 2555/34; C08L 2555/52; C09D 195/00; E01C 19/05; E01C 19/08; E01C 19/1004; E01C 19/1036; E01C 19/104; E01C 19/20; H05B 6/6426; H05B 6/70; H05B 6/707; H05B 6/76; H05B 6/78; H05B 6/784; H05B 6/786; H05B 6/806
See application file for complete search history.

(56) References Cited

U.S. PATENT DOCUMENTS

| | | |
|---|---|---|
| 3,026,568 A | 3/1962 | Moar |
| 4,222,851 A | 9/1980 | Good et al. |
| 4,352,837 A | 10/1982 | Kopenhaver |
| 4,706,893 A | 11/1987 | Brock |
| 5,209,802 A | 5/1993 | Hannah et al. |
| 5,385,426 A | 1/1995 | Omann |
| 5,718,787 A | 2/1998 | Gallagher et al. |
| 5,810,471 A | 9/1998 | Nath et al. |
| 5,848,755 A | 12/1998 | Zickell et al. |
| 6,120,838 A | 9/2000 | Zickell |
| 6,743,313 B2 | 6/2004 | Mischo |

(Continued)

FOREIGN PATENT DOCUMENTS

| | | |
|---|---|---|
| WO | 2018/091769 A1 | 5/2018 |
| WO | 2018/094315 A2 | 5/2018 |

(Continued)

*Primary Examiner* — Hung D Nguyen
(74) *Attorney, Agent, or Firm* — GREENBERG TRAURIG, LLP

(57) ABSTRACT

Systems and methods for drying asphalt shingle waste are provided. A method comprises obtaining an asphalt shingle waste, exposing the asphalt shingle waste to microwaves emitted by a microwave dryer, and processing the asphalt shingle waste into a processed asphalt shingle waste. The asphalt shingle waste has a first moisture content at an inlet of the microwave dryer. The asphalt shingle waste has a second moisture content at an outlet of the microwave dryer. The second moisture content of the asphalt shingle waste is less than the first moisture content of the asphalt shingle waste.

20 Claims, 5 Drawing Sheets

(56) References Cited

U.S. PATENT DOCUMENTS

| | | | |
|---|---|---|---|
| 6,984,670 B2 | 1/2006 | Meyers, III et al. |
| 7,052,635 B2 | 5/2006 | Mischo |
| 7,297,301 B1 | 11/2007 | Deschamps et al. |
| 7,891,590 B2 | 2/2011 | Rasmussen |
| 7,913,940 B2 | 3/2011 | Harmon |
| 8,083,166 B2 | 12/2011 | Gould et al. |
| 8,162,242 B2 | 4/2012 | Hofmann et al. |
| 8,177,152 B2 | 5/2012 | Harmon |
| 8,186,610 B2 | 5/2012 | Gould et al. |
| 8,210,458 B2 | 7/2012 | Strasser et al. |
| 8,388,873 B2 | 3/2013 | Hofmann et al. |
| 8,496,196 B2 | 7/2013 | Zickell et al. |
| 8,672,248 B2 | 3/2014 | Zickell et al. |
| 8,783,590 B2 | 7/2014 | Zickell et al. |
| 8,789,773 B2 | 7/2014 | Teeter, Jr. et al. |
| 8,919,681 B1 | 12/2014 | Horton et al. |
| 9,156,035 B1 | 10/2015 | Horton et al. |
| 9,227,196 B2 | 1/2016 | Hassan et al. |
| 9,273,228 B1 | 3/2016 | Hyer et al. |
| 9,295,992 B2 | 3/2016 | Zickell |
| 9,382,423 B2 | 7/2016 | Bolton et al. |
| 9,440,239 B1 | 9/2016 | Horton et al. |
| 9,457,354 B2 | 10/2016 | Svec et al. |
| 9,550,311 B1 | 1/2017 | Neel |
| 9,834,895 B2 | 12/2017 | Neel |
| 9,855,677 B2 | 1/2018 | Brock et al. |
| 9,951,223 B2 | 4/2018 | Gillespie et al. |
| 9,951,224 B2 | 4/2018 | Russell |
| 10,196,783 B2 | 2/2019 | Dempsey et al. |
| 10,309,722 B1 | 6/2019 | Troxler |
| 10,323,149 B2 | 6/2019 | Russell |
| 10,683,620 B1 | 6/2020 | Kelley et al. |
| 10,858,790 B1 | 12/2020 | Kelley et al. |
| 11,059,976 B2 | 7/2021 | Franzen et al. |
| 11,499,276 B2 | 11/2022 | Kelley et al. |
| 2002/0066813 A1 | 6/2002 | Mischo |
| 2006/0078383 A1 | 4/2006 | Novak |
| 2008/0184661 A1 | 8/2008 | Lombard |
| 2008/0314803 A1 | 12/2008 | Burke |
| 2010/0064937 A1 | 3/2010 | Harmon et al. |
| 2010/0307380 A1 | 12/2010 | Fader |
| 2011/0041731 A1 | 2/2011 | Lombard |
| 2013/0008986 A1* | 1/2013 | Zickell .................... C08J 11/00 241/23 |
| 2013/0199410 A1 | 8/2013 | Maldonado et al. |
| 2013/0220175 A1 | 8/2013 | Zickell |
| 2013/0307172 A1 | 11/2013 | Seder et al. |
| 2013/0313344 A1 | 11/2013 | Nykulin et al. |
| 2014/0014000 A1 | 1/2014 | Franzen et al. |
| 2014/0146632 A1 | 5/2014 | Eliot |
| 2014/0269143 A1 | 9/2014 | Gencer |
| 2014/0299018 A1 | 10/2014 | Elseifi et al. |
| 2014/0331897 A1 | 11/2014 | Elseifi |
| 2014/0373749 A1 | 12/2014 | Zickell et al. |
| 2015/0237684 A1* | 8/2015 | Huber .................... H05B 6/786 219/700 |
| 2015/0252534 A1 | 9/2015 | Dempsey et al. |
| 2016/0362338 A1 | 12/2016 | Reinke et al. |
| 2016/0362339 A1 | 12/2016 | Franzen et al. |
| 2018/0141866 A1 | 5/2018 | Kotefski et al. |
| 2018/0186963 A1 | 7/2018 | Kotefski et al. |
| 2018/0208771 A1 | 7/2018 | Gillespie et al. |
| 2018/0243798 A1 | 8/2018 | Abraham et al. |
| 2018/0334620 A1 | 11/2018 | Kotefski et al. |
| 2019/0039105 A1 | 2/2019 | Burns, Sr. et al. |
| 2019/0300427 A1 | 10/2019 | Horton |
| 2019/0375940 A1 | 12/2019 | Franzen et al. |
| 2020/0325071 A1* | 10/2020 | Franzen .................... E04D 1/20 |
| 2022/0371955 A1 | 11/2022 | Wilson |

FOREIGN PATENT DOCUMENTS

| | | |
|---|---|---|
| WO | 2018/125952 A2 | 7/2018 |
| WO | 2019/134729 A1 | 7/2019 |

\* cited by examiner

SYSTEMS AND METHODS FOR DRYING ASPHALT SHINGLE WASTE

CROSS-REFERENCE TO RELATED APPLICATIONS

The present application claims priority to and benefit of U.S. Provisional Patent Application No. 63/382,562, filed Nov. 7, 2022 and entitled "SYSTEMS AND METHODS FOR DRYING ASPHALT SHINGLE WASTE," the entirety of which is herein incorporated by reference.

FIELD

This disclosure generally relates to systems and methods for drying asphalt shingle waste.

BACKGROUND

Approximately 11 million tons of asphalt shingle waste (ASW) are generated in the U.S. each year. Asphalt shingle waste can take time to decompose in a landfill.

SUMMARY

Some embodiments relate to a method. In some embodiments, the method comprises obtaining an asphalt shingle waste. In some embodiments, the method comprises feeding the asphalt shingle waste to an inlet of a microwave dryer. In some embodiments, the method comprises exposing the asphalt shingle waste to microwaves emitted by the microwave dryer. In some embodiments, the method comprises discharging the asphalt shingle waste at an outlet of the microwave dryer. In some embodiments, a moisture content of the asphalt shingle waste at the outlet of the microwave dryer is less than a moisture content of the asphalt shingle waste at the inlet of the microwave dryer. In some embodiments, the method comprises processing the asphalt shingle waste.

In some embodiments, the asphalt shingle waste at the inlet of the microwave dryer has a moisture content of greater than 2% to 20% by weight based on a total weight of the asphalt shingle waste.

In some embodiments, the asphalt shingle waste at the outlet of the microwave dryer has a moisture content of 0.1% to 2% by weight based on the total weight of the asphalt shingle waste.

In some embodiments, a temperature of the asphalt shingle waste at the outlet of the microwave dryer is within 10% of a temperature of the asphalt shingle waste at the inlet of the microwave dryer.

In some embodiments, the asphalt shingle waste comprises waste asphalt, limestone, granules, and impurities.

In some embodiments, the processing comprises forming the asphalt shingle waste into an asphalt shingle waste powder.

In some embodiments, the processing comprises forming the asphalt shingle waste into a plurality of briquettes.

In some embodiments, the processing comprises forming the asphalt shingle waste into an asphalt shingle waste filled coating.

Some embodiments relate to a method. In some embodiments, the method comprises obtaining an asphalt shingle waste. In some embodiments, the method comprises feeding the asphalt shingle waste to an inlet of a microwave dryer. In some embodiments, the method comprises exposing the asphalt shingle waste to microwaves emitted by the microwave dryer so as to reduce a moisture content of the asphalt shingle waste. In some embodiments, the method comprises discharging the asphalt shingle waste at an outlet of the microwave dryer. In some embodiments, an average particle size of the asphalt shingle waste at the outlet of the microwave dryer is within 10% of an average particle size of the asphalt shingle waste at the inlet of the microwave dryer. In some embodiments, the method comprises processing the asphalt shingle waste.

In some embodiments, the average particle size of the asphalt shingle waste at the outlet of the microwave dryer is within 5% of the average particle size of the asphalt shingle waste at the inlet of the microwave dryer.

In some embodiments, a temperature of the asphalt shingle waste at the outlet of the microwave dryer is within 10% of a temperature of the asphalt shingle waste at the inlet of the microwave dryer.

In some embodiments, the asphalt shingle waste comprises waste asphalt, limestone, granules, and impurities.

In some embodiments, the processing comprises forming the asphalt shingle waste into an asphalt shingle waste powder.

In some embodiments, the processing comprises forming the asphalt shingle waste into a plurality of briquettes.

In some embodiments, the processing comprises forming the asphalt shingle waste into an asphalt shingle waste filled coating.

Some embodiments relate to a method. In some embodiments, the method comprises obtaining a plurality of briquettes. In some embodiments, the plurality of briquettes comprises an asphalt shingle waste. In some embodiments, the method comprises feeding the plurality of briquettes to an inlet of a microwave dryer. In some embodiments, the method comprises exposing the plurality of briquettes to microwaves emitted by the microwave dryer. In some embodiments, the method comprises discharging the plurality of briquettes at an outlet of the microwave dryer. In some embodiments, a moisture content of the plurality of briquettes at the outlet of the microwave dryer is less than a moisture content of the plurality of briquettes at the inlet of the microwave dryer.

In some embodiments, the method further comprises forming the plurality of briquettes into an asphalt shingle waste filled coating.

In some embodiments, the method further comprises feeding the plurality of briquettes, an asphalt coating, and at least one filler material into a mixer; and mixing the plurality of briquettes the asphalt coating, and the at least one filler material in the mixer.

In some embodiments, the asphalt coating comprises at least one of an oxidized asphalt, a polymer-modified asphalt, or any combination thereof.

In some embodiments, the plurality of briquettes has an average dimension in a range of 0.5 inches to 2 inches.

In some embodiments, the moisture content of the plurality of briquettes at the outlet of the microwave dryer 30% to 99% less than the moisture content of the plurality of briquettes at the inlet of the microwave dryer.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
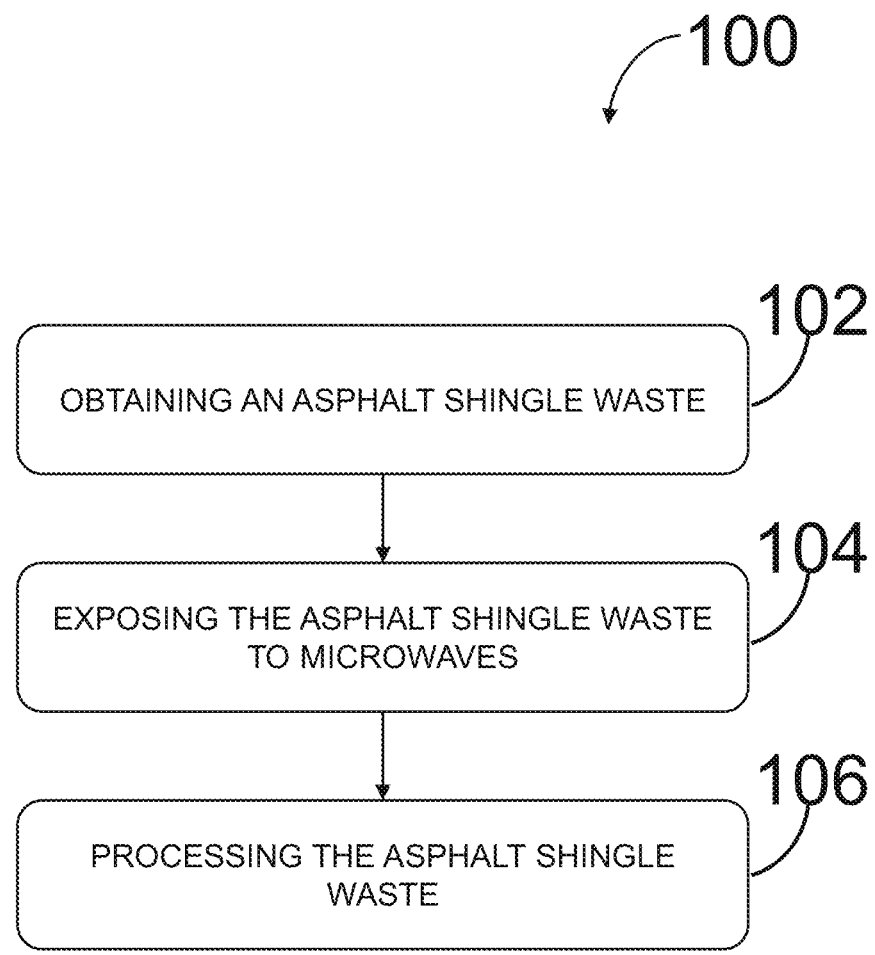
FIG. 1 is a flowchart of a system and method for drying asphalt shingle waste, according to some embodiments.

As used herein, the term "moisture content" refers to a percentage by weight of water present in a substance based on a total weight of the substance. In some embodiments, the total weight of the substance is the total weight of the substance on a wet basis. In some embodiments, the water is present in the substance in any phase, including, for example and without limitation, at least one of a liquid phase, a solid phase, a gas phase, a vapor phase, or any combination thereof.

As used herein, "exposing" refers to bringing into direct contact, or immediate or close proximity. In some embodiments, the term "exposing" comprises irradiating. In some embodiments, the term "exposing" comprises subjecting to electromagnetic radiation. In some embodiments, the term "exposing" comprises subjecting to microwaves. In some embodiments, the term "exposing" comprises subject to microwaves sufficient to reduce a moisture content of a substance.

As used herein, "microwave" refers to electromagnetic radiation having at least one property corresponding to a microwave region of the electromagnetic spectrum. In some embodiments, the term includes electromagnetic radiation with a wavelength in a range of 1 m to 1 mm. In some embodiments, the term includes electromagnetic radiation with a frequency in a range of 300 MHz to 300 GHz. As used herein, a "microwave dryer" refers to any system, device, apparatus, or the like configured to emit or irradiate microwaves.

As used herein, "asphalt shingle waste" is defined as any form of discarded asphalt shingle. "Asphalt shingle waste" includes, but is not limited to, post-manufacturing waste and post-consumer waste.

As used herein "post-consumer waste" is defined as any waste produced by an end consumer of a material stream. A non-limiting example of "post-consumer waste" is a discarded roofing shingle from a residential or commercial roof. Another non-limiting example of "post-consumer waste" is contractor waste including, but not limited to, surplus new material, damaged material, and scrap from cut shingles during installation. Yet another non-limiting example of "post-consumer waste" is at least one of: distributor waste, retail waste, or any combination thereof, including, but not limited to, damaged shingle products, aged inventory of shingles, and customer returns.

As used herein, "post-manufacturing waste" is defined as waste produced prior to reaching the end consumer of a material stream. A non-limiting example of "post-manufacturing waste" is any shingle waste generated during the production, handling, transportation or other method of generation prior to installation on a roof of a consumer. Post-manufacturing waste may include production waste such as, but not limited to, partial shingles and coated fiberglass mat with or without granules.

As used herein "grinding" is the reduction of particles by size. Non-limiting examples of grinding include, but are not limited to, crushing, shredding, chopping, milling (e.g., hammermilling), the like, and combinations thereof.

As used herein, "screening" is the separation of particles by size. Non-limiting examples of screening include, but are not limited to, vibratory screening, rotary screening, the like, and combinations thereof.

As used herein a "screener" is a screening device that is configured to perform at least one screening step.

As used herein, a "rotary screener" is any type of screening device that separates particles by size through rotation of at least a portion of the screening device.

As used herein, a "trommel screener" is a rotary screening device that includes a rotating drum. Trommel screeners are not vibratory screeners. In some embodiments, a trommel screener separates particles by size as the particles pass through the rotating drum. In some embodiments, particles that are smaller than openings in the drum fall through the openings. In some embodiments, particles that are larger than the openings in the drum do not fall through the openings.

As used herein, a "vibratory screener" is any type of screening device that separates particles by size through vibration of at least a portion of the screening device.

As used herein a "sizing shaker" is a type of vibratory screener that includes at least one vibrating tray. In some embodiments, a sizing shaker separates particles by size as the at least one vibrating tray vibrates. In some embodiments, particles that are smaller than openings in the tray fall through the openings. In some embodiments, particles that are larger than the openings in the tray do not fall through the openings. In some embodiments, a sizing shaker includes at least one ball tray.

As used herein a "ball tray" is a tray that includes balls within one or more compartments of the tray. In some embodiments, at least one ball tray may be placed underneath the at least one vibrating tray of a vibratory screener (e.g., a sizing shaker) to reduce clogging of particles within the openings of the tray. In some embodiments, as the at least one vibrating tray vibrates, the balls of the at least one ball tray strike an underside of the vibrating tray, thereby dislodging the clogged particles.

As used herein, an "air separator" is a device configured to receive a suspension of particles in air and separate the particles by at least one of, size, density or a combination thereof. In some embodiments, an "air separator" may include at least one of a "cyclone air separator" or a "mechanical air separator." In some embodiments, a "cyclone air separator" can operate in a vertically oriented configuration (i.e., with a top of the cyclone air separator pointing towards the sky and with a bottom of the cyclone air separator pointing towards the ground). In some embodiments, the suspension of particles may be introduced into a chamber, such that flow of the suspension into the chamber creates a spiral vortex. In some embodiments, a "mechanical air separator" includes one or more spinning blades (e.g., centrifugally rotating blades). In some embodiments, a fraction of particles from the suspension pass through the spinning blades, while a remainder of the particles from the suspension do not pass through the plurality of spinning blades.

As used herein, "wet extraction steps" are steps that include, but are not limited to, at least one of: the introduction of a solvent into a mixture of particles, the formation of a liquid from a mixture of particles, or any combination thereof.

As used herein, "dry grinding steps" are grinding steps that do not include wet extraction steps.

As used herein, "average particle size" is defined as "the smallest size sieve openings according to the U.S. Standard Test Sieve Series where 90% of the particles pass through the sieve." For example, particles having an average particle size of 425 microns means at least 90% of the particles pass through a 40 U.S. Standard Test Sieve having 425 micron sieve openings and less than 90% of the particles pass through a 45 U.S. Standard Test Sieve having 355 micron sieve openings.

As used herein, "a granule liberator" is any device configured to separate granules from a mixture of particles, a powder, or any combination thereof. A non-limiting example of a granule liberator is a rotary impact separator (RIS). Other non-limiting examples of granule liberators include any size separation device described herein, or any density separation device described herein.

As used herein, a "rotary impact separator" is a device having rotating elements attached to a central shaft, such that the device is configured to impact feed material. In some embodiments, the rotating elements may include, but are not limited to paddles, chains, knives, or other shapes. In some embodiments, the rotating elements may be located at one or more locations along the central shaft to facilitate impact of the feed material. In some embodiments, the rotary impact separator may further include screens on at least one of the bottom or the sides of the unit to collect the impacted material. In some embodiments, after collection, the impacted material exits the rotary impact separator via an exit chute or equivalent. In some embodiments, the rotary impact separator may further include dams, baffles, breakers, and adjustable gates. In some embodiments, the rotary impact separator can also be used to help control flow and residence time of the material within the unit. A non-limiting example of a rotary impact separator according to certain embodiments is shown in U.S. Patent Application Publication No. 2017/0305038, which is incorporated by reference in its entirety.

As used herein, a "powder" is a mixture of particles produced by size reduction steps including, but not limited to, grinding, crushing, or disintegration, the like, or any combination thereof, of a solid substance.

As used herein, "asphalt shingle waste (ASW) powder" is a mixture of particles produced by size reduction steps including, but not limited to, grinding, crushing, or disintegration, the like, or any combination thereof, of asphalt shingle waste.

As used herein, a "scalping screen" is a screening device comprising a series of conveyor belts. In some embodiments, the scalping screen is configured to receive particles in various sizes and stockpile resulting screened particles off one or more ends of the conveyor belts.

As used herein, a "lump breaker" is any device configured to de-agglomerate particles.

As used herein, the term "briquette" broadly refers to any solid agglomeration of particles (e.g., a solid mass, a unitary mass, etc.) that includes ASW powder, AC powder (as defined herein, infra), or any combination thereof. In some embodiments, a briquette comprises a compressed, compacted, and/or pressurized ASW powder, AC powder (as defined herein, infra), or any combination thereof. In some embodiments, a briquette may include a binding agent. In some embodiments, a briquette may exclude binding agents. In some embodiments, in any method step where an ASW powder, an AC powder, or any combination thereof is used, the ASW powder, an AC powder, or any combination thereof may be partially or completely replaced with a plurality of briquettes. In some embodiments, a briquette is or comprises a pressurized asphalt shingle waste powder comprising an asphalt shingle waste powder from any form of discarded asphalt shingle.

As used herein the term "briquetting" refers to any process of forming a briquette. In some embodiments, a briquetting process may include the addition of a binding agent. In some embodiments, a briquetting process may exclude addition of any binding agents. In some embodiments, a briquetting process comprises compressing an asphalt shingle waste (e.g., an asphalt shingle waste powder) at a pressure sufficient to form a plurality of briquettes.

As used herein, "wet extraction steps" are steps that include, but are not limited to, at least one of: the introduction of a solvent into a mixture of particles, the formation of a liquid from a mixture of particles, or any combination thereof.

As used herein, "waste asphalt" refers to any form of asphalt that is obtained from asphalt shingle waste.

As used herein, "asphalt," when used without the modifier "waste," refers to any form of asphalt that is not obtained from asphalt shingle waste. Non-limiting examples of asphalt include virgin asphalt, such as, for example and without limitation, at least one of hot mix asphalt, warm mix asphalt, cold mix asphalt, sheet asphalt, high-modulus asphalt, or any combination thereof.

As used herein, "asphalt coating" is defined as any form of processed asphalt, where "processed asphalt" is formed by subjecting asphalt to at least one processing step. The at least one processing step can include, but is not limited to, oxidation, dehydrogenation, condensation, polymerization, the like, or any combination thereof.

As used herein, "asphalt containing (AC) powder" is a mixture of particles produced by size reduction steps including, but not limited to, grinding, crushing, or disintegration, the like, or any combination thereof, of at least one asphalt containing composition. Examples of AC powder include, but are not limited to, ASW powder, powders formed from processed asphalt, powders formed from unprocessed asphalt, or any combination or mixture thereof.

As used herein, "oxidized asphalt coating" is defined as a form of processed asphalt that is created by oxidizing asphalt. A non-limiting example of an oxidation procedure is air-blowing, in which air is blown into asphalt at a sufficient temperature (e.g., from 450° F. to 500° F.) to oxidize the asphalt. Other non-limiting examples of oxidation procedures are described in U.S. Pat. Nos. 7,901,563 and 9,556,383, each of which are incorporated by reference in their entireties.

As used herein, "polymer modified asphalt coating" is defined as a form of processed asphalt that is created by adding at least one polymer to asphalt. A non-limiting example of a polymer modification procedure is emulsification, in which at least one polymer is mixed with asphalt at a sufficient temperature (e.g., from 250° F. to 350° F.) to form an emulsion. Other non-limiting examples of polymer modification procedures are described in U.S. Pat. No. 8,901,211, which is incorporated by reference in its entirety. In yet other embodiments, the polymer forms a colloid suspension, colloid solution, or dispersion with the asphalt.

As used herein, "softening point" is the temperature at which a material softens beyond a predetermined reference softness. Softening point is measured herein according to ASTM-D-3461.

As used herein, "penetration point" is the vertical distance penetrated by the point of a standard needle into asphalt under specific conditions of load, time and temperature. Penetration point is measured herein according to ASTM D-5.

As used herein, "viscosity" is a measure of a fluid's resistance to flow at a given shear rate and temperature. Viscosity is measured herein in accordance with ASTM D-4402 by using a Brookfield LVT viscometer at 400° F. with a #31 spindle at 30 RPM.

According to conventional systems and methods, materials are tumbled or otherwise disturbed, under heating, to remove moisture from the materials. The tumbling or disturbing of the materials increases heat transfer to the materials, which in turn increases moisture removal from the materials. As the heated materials must be cooled before entering any downstream process (e.g., to prevent blockages), conventional systems and methods are costly, inefficient, and energy intensive. Conventional systems and methods also must process any heated air that is used to dry the materials and typically employ a high temperature bag house, further increasing costs and energy usage. As one example, tumbling the material to be dried in a tumble dryer, with heat transferred to the tumble chamber to remove moisture from the material. The tumbling can reduce the size of the material, which can be undesirable. In addition, heating to temperatures sufficient to remove moisture consumes large amounts of energy. The inefficiency of these conventional systems and methods thus includes the energy required to heat and subsequently cool the materials to be dried, among other things.

Some embodiments relate to systems and methods for processing asphalt shingle waste. In some embodiments, the systems and methods for processing asphalt shingle waste comprise reducing a moisture content (e.g., drying) asphalt shingle waste by exposing the asphalt shingle waste to microwaves emitted by a microwave dryer. In some embodiments, the microwaves emitted by the microwave dryer result in evaporating water from the asphalt shingle waste so as to reduce a moisture content of the asphalt shingle waste. In some embodiments, the asphalt shingle waste can be conveyed to the microwave dryer without disturbing or without tumbling the asphalt shingle waste on the conveyor. In some embodiments, drying the asphalt shingle waste without disturbing or without tumbling, minimizes or avoids reducing a size of the asphalt shingle waste. In some embodiments, the exposure of the asphalt shingle waste to microwaves does not heat the asphalt shingle waste to a temperature that would require the asphalt shingle waste to be cooled prior to entering a downstream process. In some embodiments, the systems and methods are capable of removing moisture from the asphalt shingle waste, with only minimal disturbance to the asphalt shingle waste, while also improving efficiency and reducing energy usage relative to conventional systems and methods. In some embodiments, the systems and methods disclosed herein are capable of adjusting the output energy of the microwave dryers so as to further improve efficiency, reduce costs, and reduce energy usage. In some embodiments, the British thermal units (BTU) required to operate the systems and methods disclosed herein is at least 40% less than conventional systems and methods.

FIG. 1 is a flowchart of a system and method 100 for processing asphalt shingle waste, according to some embodiments. In some embodiments, the steps for processing asphalt shingle waste may be performed in any order.

At step 102, in some embodiments, the system and method 100 for processing asphalt shingle waste comprises obtaining an asphalt shingle waste.

In some embodiments, the asphalt shingle waste is obtained in a form of raw asphalt shingle waste. For example, in some embodiments, the asphalt shingle waste is obtained in a form of unprocessed asphalt shingle waste. In some embodiments, the asphalt shingle waste is obtained in a form of unground asphalt shingle waste, wherein the unground asphalt shingle waste comprises asphalt shingle waste that has not been subjected to any grinding or otherwise size reducing step. In some embodiments, the asphalt shingle waste is obtained in a form of ground asphalt shingle waste, wherein the ground asphalt shingle waste comprises asphalt shingle waste that has been subjected to a grinding or size reducing step. For example, in some embodiments, the asphalt shingle waste is obtained in a form of asphalt shingle waste chips, wherein the asphalt shingle waste chips comprises asphalt shingle waste from at least one of a rotochopper, a milling unit, or any combination thereof. In some embodiments, the asphalt shingle waste is obtained in a form of a briquette or a plurality of briquettes. In some embodiments, the obtaining comprises obtaining a plurality of briquettes comprising the asphalt shingle waste.

In some embodiments, the asphalt shingle waste comprises, consists of, or consists essentially of waste asphalt. In some embodiments, the asphalt shingle waste comprises, consists of, or consists essentially of at least one of limestone, granules, impurities, or any combination thereof. In some embodiments, the impurities comprises, consists of, or consists essentially of at least one of fiberglass mat sand, fines, marker paint, sealant, one or more adhesives, tape, plastic debris, paper debris, soil, woods, nails, or any combination thereof.

In some embodiments, the asphalt shingle waste comprises 1% to 99% by weight of waste asphalt based on a total weight of the asphalt shingle waste. In some embodiments, the asphalt shingle waste comprises 1% to 90% by weight of waste asphalt based on the total weight of the asphalt shingle waste. In some embodiments, the asphalt shingle waste comprises 1% to 80% by weight of waste asphalt based on the total weight of the asphalt shingle waste. In some embodiments, the asphalt shingle waste comprises 1% to 70% by weight of waste asphalt based on the total weight of the asphalt shingle waste. In some embodiments, the asphalt shingle waste comprises 1% to 60% by weight of waste asphalt based on the total weight of the asphalt shingle waste. In some embodiments, the asphalt shingle waste comprises 1% to 50% by weight of waste asphalt based on the total weight of the asphalt shingle waste. In some embodiments, the asphalt shingle waste comprises 1% to 40% by weight of waste asphalt based on the total weight of the asphalt shingle waste. In some embodiments, the asphalt shingle waste comprises 1% to 30% by weight of waste asphalt based on the total weight of the asphalt shingle waste. In some embodiments, the asphalt shingle waste comprises 1% to 20% by weight of waste asphalt based on the total weight of the asphalt shingle waste. In some embodiments, the asphalt shingle waste comprises 1% to 10% by weight of waste asphalt based on the total weight of the asphalt shingle waste.

In some embodiments, the asphalt shingle waste comprises 10% to 99% by weight of waste asphalt based on the total weight of the asphalt shingle waste. In some embodiments, the asphalt shingle waste comprises 20% to 99% by weight of waste asphalt based on the total weight of the asphalt shingle waste. In some embodiments, the asphalt shingle waste comprises 30% to 99% by weight of waste asphalt based on the total weight of the asphalt shingle waste. In some embodiments, the asphalt shingle waste comprises 40% to 99% by weight of waste asphalt based on the total weight of the asphalt shingle waste. In some embodiments, the asphalt shingle waste comprises 50% to 99% by weight of waste asphalt based on the total weight of the asphalt shingle waste. In some embodiments, the asphalt shingle waste comprises 60% to 99% by weight of waste asphalt based on the total weight of the asphalt shingle waste. In some embodiments, the asphalt shingle waste comprises 70% to 99% by weight of waste asphalt based on the total weight of the asphalt shingle waste. In some embodiments, the asphalt shingle waste comprises 80% to 99% by weight of waste asphalt based on the total weight of the asphalt shingle waste. In some embodiments, the asphalt shingle waste comprises 90% to 99% by weight of waste asphalt based on the total weight of the asphalt shingle waste.

In some embodiments, the asphalt shingle waste comprises 1% to 99% by weight of at least one of limestone, granules, impurities, or any combination thereof based on the total weight of the asphalt shingle waste. In some embodiments, the asphalt shingle waste comprises 1% to 90% by weight of at least one of limestone, granules, impurities, or any combination thereof based on the total weight of the asphalt shingle waste. In some embodiments, the asphalt shingle waste comprises 1% to 80% by weight of at least one of limestone, granules, impurities, or any combination thereof based on the total weight of the asphalt shingle waste. In some embodiments, the asphalt shingle waste comprises 1% to 70% by weight of at least one of limestone, granules, impurities, or any combination thereof based on the total weight of the asphalt shingle waste. In some embodiments, the asphalt shingle waste comprises 1% to 60% by weight of at least one of limestone, granules, impurities, or any combination thereof based on the total weight of the asphalt shingle waste. In some embodiments, the asphalt shingle waste comprises 1% to 50% by weight of at least one of limestone, granules, impurities, or any combination thereof based on the total weight of the asphalt shingle waste. In some embodiments, the asphalt shingle waste comprises 1% to 40% by weight of at least one of limestone, granules, impurities, or any combination thereof based on the total weight of the asphalt shingle waste. In some embodiments, the asphalt shingle waste comprises 1% to 30% by weight of at least one of limestone, granules, impurities, or any combination thereof based on the total weight of the asphalt shingle waste. In some embodiments, the asphalt shingle waste comprises 1% to 20% by weight of at least one of limestone, granules, impurities, or any combination thereof based on the total weight of the asphalt shingle waste. In some embodiments, the asphalt shingle waste comprises 1% to 10% by weight of at least one of limestone, granules, impurities, or any combination thereof based on the total weight of the asphalt shingle waste.

In some embodiments, the asphalt shingle waste comprises 10% to 99% by weight of at least one of limestone, granules, impurities, or any combination thereof based on the total weight of the asphalt shingle waste. In some embodiments, the asphalt shingle waste comprises 20% to 99% by weight of at least one of limestone, granules, impurities, or any combination thereof based on the total weight of the asphalt shingle waste. In some embodiments, the asphalt shingle waste comprises 30% to 99% by weight of at least one of limestone, granules, impurities, or any combination thereof based on the total weight of the asphalt shingle waste. In some embodiments, the asphalt shingle waste comprises 40% to 99% by weight of at least one of limestone, granules, impurities, or any combination thereof based on the total weight of the asphalt shingle waste. In some embodiments, the asphalt shingle waste comprises 50% to 99% by weight of at least one of limestone, granules, impurities, or any combination thereof based on the total weight of the asphalt shingle waste. In some embodiments, the asphalt shingle waste comprises 60% to 99% by weight of at least one of limestone, granules, impurities, or any combination thereof based on the total weight of the asphalt shingle waste. In some embodiments, the asphalt shingle waste comprises 70% to 99% by weight of at least one of limestone, granules, impurities, or any combination thereof based on the total weight of the asphalt shingle waste. In some embodiments, the asphalt shingle waste comprises 80% to 99% by weight of at least one of limestone, granules, impurities, or any combination thereof based on the total weight of the asphalt shingle waste. In some embodiments, the asphalt shingle waste comprises 90% to 99% by weight of at least one of limestone, granules, impurities, or any combination thereof based on the total weight of the asphalt shingle waste.

In some embodiments, the asphalt shingle waste has an average particle size of at least 425 microns. In some embodiments, the asphalt shingle waste has an average particle size of at least 500 microns. In some embodiments, the asphalt shingle waste has an average particle size of at least 750 microns. In some embodiments, the asphalt shingle waste has an average particle size of at least 1000 microns. In some embodiments, the asphalt shingle waste has an average particle size of at least 1250 microns. In some embodiments, the asphalt shingle waste has an average particle size of at least 1500 microns. In some embodiments, the asphalt shingle waste has an average particle size of at least 1750 microns. In some embodiments, the asphalt shingle waste has an average particle size of at least 2000 microns. In some embodiments, the asphalt shingle waste has an average particle size of at least 2250 microns. In some embodiments, the asphalt shingle waste has an average particle size of at least 2500 microns. In some embodiments, the asphalt shingle waste has an average particle size of at least 2750 microns. In some embodiments, the asphalt shingle waste has an average particle size of at least 3000 microns.

In some embodiments, the asphalt shingle waste has an average particle size of at least 3250 microns. In some embodiments, the asphalt shingle waste has an average particle size of at least 3500 microns. In some embodiments, the asphalt shingle waste has an average particle size of at least 3750 microns. In some embodiments, the asphalt shingle waste has an average particle size of at least 4000 microns. In some embodiments, the asphalt shingle waste has an average particle size of at least 4250 microns. In some embodiments, the asphalt shingle waste has an average particle size of at least 4500 microns. In some embodiments, the asphalt shingle waste has an average particle size of at least 4750 microns. In some embodiments, the asphalt shingle waste has an average particle size of at least 5000 microns. In some embodiments, the asphalt shingle waste has an average particle size of at least 5250 microns. In some embodiments, the asphalt shingle waste has an average particle size of at least 5500 microns. In some embodiments, the asphalt shingle waste has an average particle size of at least 5750 microns. In some embodiments, the asphalt shingle waste has an average particle size of at least 6000 microns.

In some embodiments, the asphalt shingle waste has an average particle size of 425 microns to 6350 microns. In some embodiments, the asphalt shingle waste has an average particle size of 425 microns to 6250 microns. In some embodiments, the asphalt shingle waste has an average particle size of 425 microns to 6000 microns. In some embodiments, the asphalt shingle waste has an average particle size of 425 microns to 5750 microns. In some embodiments, the asphalt shingle waste has an average particle size of 425 microns to 5500 microns. In some embodiments, the asphalt shingle waste has an average particle size of 425 microns to 5250 microns. In some embodiments, the asphalt shingle waste has an average particle size of 425 microns to 5000 microns. In some embodiments, the asphalt shingle waste has an average particle size of 425 microns to 4750 microns. In some embodiments, the asphalt shingle waste has an average particle size of 425 microns to 4500 microns. In some embodiments, the asphalt shingle waste has an average particle size of 425 microns to 4250 microns. In some embodiments, the asphalt shingle waste has an average particle size of 425 microns to 4000 microns.

In some embodiments, the asphalt shingle waste has an average particle size of 425 microns to 3750 microns. In some embodiments, the asphalt shingle waste has an average particle size of 425 microns to 3500 microns. In some embodiments, the asphalt shingle waste has an average particle size of 425 microns to 3250 microns. In some embodiments, the asphalt shingle waste has an average particle size of 425 microns to 3000 microns. In some embodiments, the asphalt shingle waste has an average particle size of 425 microns to 2750 microns. In some embodiments, the asphalt shingle waste has an average particle size of 425 microns to 2500 microns. In some embodiments, the asphalt shingle waste has an average particle size of 425 microns to 2250 microns. In some embodiments, the asphalt shingle waste has an average particle size of 425 microns to 2000 microns. In some embodiments, the asphalt shingle waste has an average particle size of 425 microns to 1750 microns. In some embodiments, the asphalt shingle waste has an average particle size of 425 microns to 1500 microns. In some embodiments, the asphalt shingle waste has an average particle size of 425 microns to 1250 microns. In some embodiments, the asphalt shingle waste has an average particle size of 425 microns to 1000 microns. In some embodiments, the asphalt shingle waste has an average particle size of 425 microns to 750 microns. In some embodiments, the asphalt shingle waste has an average particle size of 425 microns to 500 microns.

In some embodiments, the asphalt shingle waste has an average particle size of 425 microns to 6250 microns. In some embodiments, the asphalt shingle waste has an average particle size of 500 microns to 6350 microns. In some embodiments, the asphalt shingle waste has an average particle size of 750 microns to 6350 microns. In some embodiments, the asphalt shingle waste has an average particle size of 1000 microns to 6350 microns. In some embodiments, the asphalt shingle waste has an average particle size of 1250 microns to 6350 microns. In some embodiments, the asphalt shingle waste has an average particle size of 1500 microns to 6350 microns. In some embodiments, the asphalt shingle waste has an average particle size of 1750 microns to 6350 microns. In some embodiments, the asphalt shingle waste has an average particle size of 2000 microns to 6350 microns. In some embodiments, the asphalt shingle waste has an average particle size of 2250 microns to 6350 microns. In some embodiments, the asphalt shingle waste has an average particle size of 2500 microns to 6350 microns. In some embodiments, the asphalt shingle waste has an average particle size of 2750 microns to 6350 microns. In some embodiments, the asphalt shingle waste has an average particle size of 3000 microns to 6350 microns.

In some embodiments, the asphalt shingle waste has an average particle size of 3250 microns to 6350 microns. In some embodiments, the asphalt shingle waste has an average particle size of 3500 microns to 6350 microns. In some embodiments, the asphalt shingle waste has an average particle size of 3750 microns to 6350 microns. In some embodiments, the asphalt shingle waste has an average particle size of 4000 microns to 6350 microns. In some embodiments, the asphalt shingle waste has an average particle size of 4250 microns to 6350 microns. In some embodiments, the asphalt shingle waste has an average particle size of 4500 microns to 6350 microns. In some embodiments, the asphalt shingle waste has an average particle size of 4750 microns to 6350 microns. In some embodiments, the asphalt shingle waste has an average particle size of 5000 microns to 6350 microns. In some embodiments, the asphalt shingle waste has an average particle size of 5250 microns to 6350 microns. In some embodiments, the asphalt shingle waste has an average particle size of 5500 microns to 6350 microns. In some embodiments, the asphalt shingle waste has an average particle size of 5750 microns to 6350 microns. In some embodiments, the asphalt shingle waste has an average particle size of 6000 microns to 6350 microns.

In some embodiments, the asphalt shingle waste has an average particle size of 2 microns to 425 microns. In some embodiments, the asphalt shingle waste has an average particle size of 5 microns to 425 microns. In some embodiments, the asphalt shingle waste has an average particle size of 10 microns to 425 microns. In some embodiments, the asphalt shingle waste has an average particle size of 25 microns to 425 microns. In some embodiments, the asphalt shingle waste has an average particle size of 50 microns to 425 microns. In some embodiments, the asphalt shingle waste has an average particle size of 100 microns to 425 microns. In some embodiments, the asphalt shingle waste has an average particle size of 200 microns to 425 microns. In some embodiments, the asphalt shingle waste has an average particle size of 300 microns to 425 microns. In some embodiments, the asphalt shingle waste has an average particle size of 400 microns to 425 microns.

In some embodiments, the asphalt shingle waste has an average particle size of 2 microns to 400 microns. In some embodiments, the asphalt shingle waste has an average particle size of 2 microns to 300 microns. In some embodiments, the asphalt shingle waste has an average particle size of 2 microns to 200 microns. In some embodiments, the asphalt shingle waste has an average particle size of 2 microns to 100 microns. In some embodiments, the asphalt shingle waste has an average particle size of 2 microns to 50 microns. In some embodiments, the asphalt shingle waste has an average particle size of 2 microns to 25 microns. In some embodiments, the asphalt shingle waste has an average particle size of 2 microns to 10 microns. In some embodiments, the asphalt shingle waste has an average particle size of 2 microns to 5 microns.

In some embodiments, the asphalt shingle waste has an average particle size of 5 microns to 400 microns. In some embodiments, the asphalt shingle waste has an average particle size of 10 microns to 300 microns. In some embodiments, the asphalt shingle waste has an average particle size of 25 microns to 200 microns. In some embodiments, the asphalt shingle waste has an average particle size of 50 microns to 100 microns.

In some embodiments, the asphalt shingle waste has an average particle size of 0.1 inches to 5 inches. In some embodiments, the asphalt shingle waste has an average particle size of 0.1 inches to 4.5 inches. In some embodiments, the asphalt shingle waste has an average particle size of 0.1 inches to 4 inches. In some embodiments, the asphalt shingle waste has an average particle size of 0.1 inches to 3.5 inches. In some embodiments, the asphalt shingle waste has an average particle size of 0.1 inches to 3 inches. In some embodiments, the asphalt shingle waste has an average particle size of 0.1 inches to 2.5 inches. In some embodiments, the asphalt shingle waste has an average particle size of 0.1 inches to 2 inches. In some embodiments, the asphalt shingle waste has an average particle size of 0.1 inches to 1.5 inches. In some embodiments, the asphalt shingle waste has an average particle size of 0.1 inches to 1 inches. In some embodiments, the asphalt shingle waste has an average particle size of 0.1 inches to 0.5 inches. In some embodiments, the asphalt shingle waste has an average particle size of 0.5 inches to 5 inches. In some embodiments, the asphalt shingle waste has an average particle size of 1 inches to 5 inches. In some embodiments, the asphalt shingle waste has an average particle size of 1.5 inches to 5 inches. In some embodiments, the asphalt shingle waste has an average particle size of 2 inches to 5 inches. In some embodiments, the asphalt shingle waste has an average particle size of 2.5 inches to 5 inches. In some embodiments, the asphalt shingle waste has an average particle size of 3 inches to 5 inches. In some embodiments, the asphalt shingle waste has an average particle size of 3.5 inches to 5 inches. In some embodiments, the asphalt shingle waste has an average particle size of 4 inches to 5 inches. In some embodiments, the asphalt shingle waste has an average particle size of 4.5 inches to 5 inches.

In some embodiments, the asphalt shingle waste has a moisture content of greater than 2% by weight based on the total weight of the asphalt shingle waste. In some embodiments, the asphalt shingle waste has a moisture content of greater than 2% to 20% by weight based on the total weight of the asphalt shingle waste. In some embodiments, the asphalt shingle waste has a moisture content of 3% to 20% by weight based on the total weight of the asphalt shingle waste. In some embodiments, the asphalt shingle waste has a moisture content of 4% to 20% by weight based on the total weight of the asphalt shingle waste. In some embodiments, the asphalt shingle waste has a moisture content of 5% to 20% by weight based on the total weight of the asphalt shingle waste. In some embodiments, the asphalt shingle waste has a moisture content of 6% to 20% by weight based on the total weight of the asphalt shingle waste. In some embodiments, the asphalt shingle waste has a moisture content of 7% to 20% by weight based on the total weight of the asphalt shingle waste. In some embodiments, the asphalt shingle waste has a moisture content of 8% to 20% by weight based on the total weight of the asphalt shingle waste. In some embodiments, the asphalt shingle waste has a moisture content of 9% to 20% by weight based on the total weight of the asphalt shingle waste. In some embodiments, the asphalt shingle waste has a moisture content of 10% to 20% by weight based on the total weight of the asphalt shingle waste. In some embodiments, the asphalt shingle waste has a moisture content of 11% to 20% by weight based on the total weight of the asphalt shingle waste. In some embodiments, the asphalt shingle waste has a moisture content of 12% to 20% by weight based on the total weight of the asphalt shingle waste. In some embodiments, the asphalt shingle waste has a moisture content of 13% to 20% by weight based on the total weight of the asphalt shingle waste. In some embodiments, the asphalt shingle waste has a moisture content of 14% to 20% by weight based on the total weight of the asphalt shingle waste. In some embodiments, the asphalt shingle waste has a moisture content of 15% to 20% by weight based on the total weight of the asphalt shingle waste. In some embodiments, the asphalt shingle waste has a moisture content of 16% to 20% by weight based on the total weight of the asphalt shingle waste. In some embodiments, the asphalt shingle waste has a moisture content of 17% to 20% by weight based on the total weight of the asphalt shingle waste. In some embodiments, the asphalt shingle waste has a moisture content of 18% to 20% by weight based on the total weight of the asphalt shingle waste. In some embodiments, the asphalt shingle waste has a moisture content of 19% to 20% by weight based on the total weight of the asphalt shingle waste.

In some embodiments, the asphalt shingle waste has a moisture content of greater than 2% to 19% by weight based on the total weight of the asphalt shingle waste. In some embodiments, the asphalt shingle waste has a moisture content of greater than 2% to 18% by weight based on the total weight of the asphalt shingle waste. In some embodiments, the asphalt shingle waste has a moisture content of greater than 2% to 17% by weight based on the total weight of the asphalt shingle waste. In some embodiments, the asphalt shingle waste has a moisture content of greater than 2% to 16% by weight based on the total weight of the asphalt shingle waste. In some embodiments, the asphalt shingle waste has a moisture content of greater than 2% to 15% by weight based on the total weight of the asphalt shingle waste. In some embodiments, the asphalt shingle waste has a moisture content of greater than 2% to 14% by weight based on the total weight of the asphalt shingle waste. In some embodiments, the asphalt shingle waste has a moisture content of greater than 2% to 13% by weight based on the total weight of the asphalt shingle waste. In some embodiments, the asphalt shingle waste has a moisture content of greater than 2% to 12% by weight based on the total weight of the asphalt shingle waste. In some embodiments, the asphalt shingle waste has a moisture content of greater than 2% to 11% by weight based on the total weight of the asphalt shingle waste. In some embodiments, the asphalt shingle waste has a moisture content of greater than 2% to 10% by weight based on the total weight of the asphalt shingle waste. In some embodiments, the asphalt shingle waste has a moisture content of greater than 2% to 9% by weight based on the total weight of the asphalt shingle waste. In some embodiments, the asphalt shingle waste has a moisture content of greater than 2% to 8% by weight based on the total weight of the asphalt shingle waste. In some embodiments, the asphalt shingle waste has a moisture content of greater than 2% to 7% by weight based on the total weight of the asphalt shingle waste. In some embodiments, the asphalt shingle waste has a moisture content of greater than 2% to 6% by weight based on the total weight of the asphalt shingle waste. In some embodiments, the asphalt shingle waste has a moisture content of greater than 2% to 5% by weight based on the total weight of the asphalt shingle waste. In some embodiments, the asphalt shingle waste has a moisture content of greater than 2% to 4% by weight based on the total weight of the asphalt shingle waste. In some embodiments, the asphalt shingle waste has a moisture content of greater than 2% to 3% by weight based on the total weight of the asphalt shingle waste.

In some embodiments, the asphalt shingle waste has a moisture content of 3% to 10% by weight based on the total weight of the asphalt shingle waste. In some embodiments, the asphalt shingle waste has a moisture content of 3% to 9% by weight based on the total weight of the asphalt shingle waste. In some embodiments, the asphalt shingle waste has a moisture content of 3% to 8% by weight based on the total weight of the asphalt shingle waste. In some embodiments, the asphalt shingle waste has a moisture content of 4% to 10% by weight based on the total weight of the asphalt shingle waste. In some embodiments, the asphalt shingle waste has a moisture content of 4% to 9% by weight based on the total weight of the asphalt shingle waste. In some embodiments, the asphalt shingle waste has a moisture content of 4% to 8% by weight based on the total weight of the asphalt shingle waste. In some embodiments, the asphalt shingle waste has a moisture content of 5% to 10% by weight based on the total weight of the asphalt shingle waste. In some embodiments, the asphalt shingle waste has a moisture content of 5% to 9% by weight based on the total weight of the asphalt shingle waste. In some embodiments, the asphalt shingle waste has a moisture content of 5% to 8% by weight based on the total weight of the asphalt shingle waste.

At step 104, in some embodiments, the system and method 100 for processing asphalt shingle waste comprises exposing the asphalt shingle waste to microwaves.

In some embodiments, the exposing comprises feeding the asphalt shingle waste to an inlet of the microwave dryer, exposing the asphalt shingle waste to microwaves emitted by the microwave dryer, and discharging the asphalt shingle waste at an outlet of the microwave dryer. In some embodiments, the exposing comprises exposing the asphalt shingle waste to microwaves emitted by the microwave dryer so as to reduce a moisture content of the asphalt shingle waste. In some embodiments, the exposing comprises passing the asphalt shingle waste to and/or through a microwave dryer. In some embodiments, the exposing comprises loading the asphalt shingle waste into a microwave dryer (e.g., a batch microwave dryer). In some embodiments, the exposing comprises conveying the asphalt shingle waste to and/or through the microwave dryer. In some embodiments, the exposing comprises conveying a bed of the asphalt shingle waste to and/or through the microwave dryer. In some embodiments, exposing the asphalt shingle waste to microwaves comprises passing the asphalt shingle waste through the microwave dryer, from an inlet of the microwave dryer to an outlet of the microwave dryer, so as to expose the asphalt shingle waste to microwaves emitted by the microwave dryer. In some embodiments, the exposing comprises subjecting the asphalt shingle waste to microwaves emitted by the microwave dryer. In some embodiments, the exposing comprises irradiating the asphalt shingle waste with microwaves emitted by the microwave dryer. Non-limiting examples of feeding include, without limitation, at least one of flowing, introducing, providing, conveying, pumping, supplying, or any combination thereof. Non-limiting examples of discharging include, without limitation, at least one of recovering, producing, collecting, forming, obtaining, conveying, feeding, or any combination thereof.

In some embodiments, the exposing comprises feeding the asphalt shingle waste on a static bed. In some embodiments, the exposing comprises feeding the asphalt shingle waste on a semi-static bed. In some embodiments, the exposing comprises feeding the asphalt shingle waste on a dynamic bed. In some embodiments, the asphalt shingle waste is fed on a bed having a thickness of 0.5 inches to 3 inches. In some embodiments, the asphalt shingle waste is fed on a bed having a thickness of 0.5 inches to 2.8 inches. In some embodiments, the asphalt shingle waste is fed on a bed having a thickness of 0.5 inches to 2.6 inches. In some embodiments, the asphalt shingle waste is fed on a bed having a thickness of 0.5 inches to 2.5 inches. In some embodiments, the asphalt shingle waste is fed on a bed having a thickness of 0.5 inches to 2.4 inches. In some embodiments, the asphalt shingle waste is fed on a bed having a thickness of 0.5 inches to 2.2 inches. In some embodiments, the asphalt shingle waste is fed on a bed having a thickness of 0.5 inches to 2 inches. In some embodiments, the asphalt shingle waste is fed on a bed having a thickness of 0.5 inches to 1.8 inches. In some embodiments, the asphalt shingle waste is fed on a bed having a thickness of 0.5 inches to 1.6 inches. In some embodiments, the asphalt shingle waste is fed on a bed having a thickness of 0.5 inches to 1.5 inches. In some embodiments, the asphalt shingle waste is fed on a bed having a thickness of 0.5 inches to 1.4 inches. In some embodiments, the asphalt shingle waste is fed on a bed having a thickness of 0.5 inches to 1.2 inches. In some embodiments, the asphalt shingle waste is fed on a bed having a thickness of 0.5 inches to 1 inches. In some embodiments, the asphalt shingle waste is fed on a bed having a thickness of 0.5 inches to 0.8 inches. In some embodiments, the asphalt shingle waste is fed on a bed having a thickness of 0.5 inches to 0.6 inches.

In some embodiments, the asphalt shingle waste is fed on a bed having a thickness of 0.6 inches to 3 inches. In some embodiments, the asphalt shingle waste is fed on a bed having a thickness of 0.8 inches to 3 inches. In some embodiments, the asphalt shingle waste is fed on a bed having a thickness of 1 inches to 3 inches. In some embodiments, the asphalt shingle waste is fed on a bed having a thickness of 1.2 inches to 3 inches. In some embodiments, the asphalt shingle waste is fed on a bed having a thickness of 1.4 inches to 3 inches. In some embodiments, the asphalt shingle waste is fed on a bed having a thickness of 1.5 inches to 3 inches. In some embodiments, the asphalt shingle waste is fed on a bed having a thickness of 1.6 inches to 3 inches. In some embodiments, the asphalt shingle waste is fed on a bed having a thickness of 1.8 inches to 3 inches. In some embodiments, the asphalt shingle waste is fed on a bed having a thickness of 2 inches to 3 inches. In some embodiments, the asphalt shingle waste is fed on a bed having a thickness of 2.2 inches to 3 inches. In some embodiments, the asphalt shingle waste is fed on a bed having a thickness of 2.4 inches to 3 inches. In some embodiments, the asphalt shingle waste is fed on a bed having a thickness of 2.5 inches to 3 inches. In some embodiments, the asphalt shingle waste is fed on a bed having a thickness of 2.6 inches to 3 inches. In some embodiments, the asphalt shingle waste is fed on a bed having a thickness of 2.8 inches to 3 inches. In some embodiments, the asphalt shingle waste is fed on a bed having a thickness of 0.5 inches to 1.6 inches.

In some embodiments, the microwaves have a frequency in a range of 700 MHz to 1500 MHz. In some embodiments, the microwaves have a frequency in a range of 700 MHz to 1450 MHz. In some embodiments, the microwaves have a frequency in a range of 700 MHz to 1400 MHz. In some embodiments, the microwaves have a frequency in a range of 700 MHz to 1350 MHz. In some embodiments, the microwaves have a frequency in a range of 700 MHz to 1300 MHz. In some embodiments, the microwaves have a frequency in a range of 700 MHz to 1250 MHz. In some embodiments, the microwaves have a frequency in a range of 700 MHz to 1200 MHz. In some embodiments, the microwaves have a frequency in a range of 700 MHz to 1150 MHz. In some embodiments, the microwaves have a frequency in a range of 700 MHz to 1100 MHz. In some embodiments, the microwaves have a frequency in a range of 700 MHz to 1050 MHz. In some embodiments, the microwaves have a frequency in a range of 700 MHz to 1000 MHz. In some embodiments, the microwaves have a frequency in a range of 700 MHz to 950 MHz. In some embodiments, the microwaves have a frequency in a range of 700 MHz to 900 MHz. In some embodiments, the microwaves have a frequency in a range of 700 MHz to 850 MHz. In some embodiments, the microwaves have a frequency in a range of 700 MHz to 800 MHz. In some embodiments, the microwaves have a frequency in a range of 700 MHz to 750 MHz.

In some embodiments, the microwaves have a frequency in a range of 750 MHz to 1500 MHz. In some embodiments, the microwaves have a frequency in a range of 800 MHz to 1500 MHz. In some embodiments, the microwaves have a frequency in a range of 850 MHz to 1500 MHz. In some embodiments, the microwaves have a frequency in a range of 900 MHz to 1500 MHz. In some embodiments, the microwaves have a frequency in a range of 950 MHz to 1500 MHz. In some embodiments, the microwaves have a frequency in a range of 1000 MHz to 1500 MHz. In some embodiments, the microwaves have a frequency in a range of 1050 MHz to 1500 MHz. In some embodiments, the microwaves have a frequency in a range of 1100 MHz to 1500 MHz. In some embodiments, the microwaves have a frequency in a range of 1150 MHz to 1500 MHz. In some embodiments, the microwaves have a frequency in a range of 1200 MHz to 1500 MHz. In some embodiments, the microwaves have a frequency in a range of 1250 MHz to 1500 MHz. In some embodiments, the microwaves have a frequency in a range of 1300 MHz to 1500 MHz. In some embodiments, the microwaves have a frequency in a range of 1350 MHz to 1500 MHz. In some embodiments, the microwaves have a frequency in a range of 1400 MHz to 1500 MHz. In some embodiments, the microwaves have a frequency in a range of 1450 MHz to 1500 MHz. In some embodiments, the microwaves have a frequency in a range of 300 MHz to 300 GHz. In some embodiments, the microwaves have a frequency in a range of 700 MHz to 1200 MHz. In some embodiments, the microwaves have a frequency in a range of 750 MHz to 1150 MHz. In some embodiments, the microwaves have a frequency in a range of 800 MHz to 1100 MHz. In some embodiments, the microwaves have a frequency in a range of 850 MHz to 1050 MHz.

In some embodiments, the asphalt shingle waste is exposed to microwaves emitted by a microwave dryer. That is, in some embodiments, the microwave dryer is configured to emit microwaves. In some embodiments, the microwave dryer is configured to emit microwaves at a frequency in a range of 700 MHz to 1500 MHz. In some embodiments, the microwave dryer is configured to emit microwaves at a frequency in a range of 700 MHz to 1450 MHz. In some embodiments, the microwave dryer is configured to emit microwaves at a frequency in a range of 700 MHz to 1400 MHz. In some embodiments, the microwave dryer is configured to emit microwaves at a frequency in a range of 700 MHz to 1350 MHz. In some embodiments, the microwave dryer is configured to emit microwaves at a frequency in a range of 700 MHz to 1300 MHz. In some embodiments, the microwave dryer is configured to emit microwaves at a frequency in a range of 700 MHz to 1250 MHz. In some embodiments, the microwave dryer is configured to emit microwaves at a frequency in a range of 700 MHz to 1200 MHz. In some embodiments, the microwave dryer is configured to emit microwaves at a frequency in a range of 700 MHz to 1150 MHz. In some embodiments, the microwave dryer is configured to emit microwaves at a frequency in a range of 700 MHz to 1100 MHz. In some embodiments, the microwave dryer is configured to emit microwaves at a frequency in a range of 700 MHz to 1050 MHz. In some embodiments, the microwave dryer is configured to emit microwaves at a frequency in a range of 700 MHz to 1000 MHz. In some embodiments, the microwave dryer is configured to emit microwaves at a frequency in a range of 700 MHz to 950 MHz. In some embodiments, the microwave dryer is configured to emit microwaves at a frequency in a range of 700 MHz to 900 MHz. In some embodiments, the microwave dryer is configured to emit microwaves at a frequency in a range of 700 MHz to 850 MHz. In some embodiments, the microwave dryer is configured to emit microwaves at a frequency in a range of 700 MHz to 800 MHz. In some embodiments, the microwave dryer is configured to emit microwaves at a frequency in a range of 700 MHz to 750 MHz.

In some embodiments, the microwave dryer is configured to emit microwaves at a frequency in a range of 750 MHz to 1500 MHz. In some embodiments, the microwave dryer is configured to emit microwaves at a frequency in a range of 800 MHz to 1500 MHz. In some embodiments, the microwave dryer is configured to emit microwaves at a frequency in a range of 850 MHz to 1500 MHz. In some embodiments, the microwave dryer is configured to emit microwaves at a frequency in a range of 900 MHz to 1500 MHz. In some embodiments, the microwave dryer is configured to emit microwaves at a frequency in a range of 950 MHz to 1500 MHz. In some embodiments, the microwave dryer is configured to emit microwaves at a frequency in a range of 1000 MHz to 1500 MHz. In some embodiments, the microwave dryer is configured to emit microwaves at a frequency in a range of 1050 MHz to 1500 MHz. In some embodiments, the microwave dryer is configured to emit microwaves at a frequency in a range of 1100 MHz to 1500 MHz. In some embodiments, the microwave dryer is configured to emit microwaves at a frequency in a range of 1150 MHz to 1500 MHz. In some embodiments, the microwave dryer is configured to emit microwaves at a frequency in a range of 1200 MHz to 1500 MHz. In some embodiments, the microwave dryer is configured to emit microwaves at a frequency in a range of 1250 MHz to 1500 MHz. In some embodiments, the microwave dryer is configured to emit microwaves at a frequency in a range of 1300 MHz to 1500 MHz. In some embodiments, the microwave dryer is configured to emit microwaves at a frequency in a range of 1350 MHz to 1500 MHz. In some embodiments, the microwave dryer is configured to emit microwaves at a frequency in a range of 1400 MHz to 1500 MHz. In some embodiments, the microwave dryer is configured to emit microwaves at a frequency in a range of 1450 MHz to 1500 MHz. In some embodiments, the microwave dryer is configured to emit microwaves at a frequency in a range of 300 MHz to 300 GHz. In some embodiments, the microwave dryer is configured to emit microwaves at a frequency in a range of 700 MHz to 1200 MHz. In some embodiments, the microwave dryer is configured to emit microwaves at a frequency in a range of 750 MHz to 1150 MHz. In some embodiments, the microwave dryer is configured to emit microwaves at a frequency in a range of 800 MHz to 1100 MHz. In some embodiments, the microwave dryer is configured to emit microwaves at a frequency in a range of 850 MHz to 1050 MHz.

In some embodiments, the microwave dryer is configured to emit microwaves at an output power of 5 kW to 150 kW. In some embodiments, the microwave dryer is configured to emit microwaves at an output power of 5 kW to 140 kW. In some embodiments, the microwave dryer is configured to emit microwaves at an output power of 5 kW to 130 kW. In some embodiments, the microwave dryer is configured to emit microwaves at an output power of 5 kW to 120 kW. In some embodiments, the microwave dryer is configured to emit microwaves at an output power of 5 kW to 110 kW. In some embodiments, the microwave dryer is configured to emit microwaves at an output power of 5 kW to 100 kW. In some embodiments, the microwave dryer is configured to emit microwaves at an output power of 5 kW to 90 kW. In some embodiments, the microwave dryer is configured to emit microwaves at an output power of 5 kW to 80 kW. In some embodiments, the microwave dryer is configured to emit microwaves at an output power of 5 kW to 70 kW. In some embodiments, the microwave dryer is configured to emit microwaves at an output power of 5 kW to 60 kW. In some embodiments, the microwave dryer is configured to emit microwaves at an output power of 5 kW to 50 kW. In some embodiments, the microwave dryer is configured to emit microwaves at an output power of 5 kW to 40 kW. In some embodiments, the microwave dryer is configured to emit microwaves at an output power of 1 kW to 40 kW. In some embodiments, the microwave dryer is configured to emit microwaves at an output power of 1 kW to 35 kW. In some embodiments, the microwave dryer is configured to emit microwaves at an output power of 5 kW to 30 kW. In some embodiments, the microwave dryer is configured to emit microwaves at an output power of 1 kW to 30 kW. In some embodiments, the microwave dryer is configured to emit microwaves at an output power of 5 kW to 20 kW. In some embodiments, the microwave dryer is configured to emit microwaves at an output power of 5 kW to 10 kW.

In some embodiments, the microwave dryer is configured to emit microwaves at an output power of 10 kW to 150 kW. In some embodiments, the microwave dryer is configured to emit microwaves at an output power of 20 kW to 150 kW. In some embodiments, the microwave dryer is configured to emit microwaves at an output power of 30 kW to 150 kW. In some embodiments, the microwave dryer is configured to emit microwaves at an output power of 40 kW to 150 kW. In some embodiments, the microwave dryer is configured to emit microwaves at an output power of 50 kW to 150 kW. In some embodiments, the microwave dryer is configured to emit microwaves at an output power of 60 kW to 150 kW. In some embodiments, the microwave dryer is configured to emit microwaves at an output power of 70 kW to 150 kW. In some embodiments, the microwave dryer is configured to emit microwaves at an output power of 80 kW to 150 kW. In some embodiments, the microwave dryer is configured to emit microwaves at an output power of 90 kW to 150 kW. In some embodiments, the microwave dryer is configured to emit microwaves at an output power of 100 kW to 150 kW. In some embodiments, the microwave dryer is configured to emit microwaves at an output power of 110 kW to 150 kW. In some embodiments, the microwave dryer is configured to emit microwaves at an output power of 120 kW to 150 kW. In some embodiments, the microwave dryer is configured to emit microwaves at an output power of 130 kW to 150 kW. In some embodiments, the microwave dryer is configured to emit microwaves at an output power of 140 kW to 150 kW.

In some embodiments, the microwave dryer is configured to emit microwaves at an output power of 50 kW to 125 kW. In some embodiments, the microwave dryer is configured to emit microwaves at an output power of 75 kW to 125 kW. In some embodiments, the microwave dryer is configured to emit microwaves at an output power of 75 kW to 100 kW.

In some embodiments, the asphalt shingle waste at the inlet of the microwave dryer has a moisture content of greater than 2% by weight based on the total weight of the asphalt shingle waste. In some embodiments, the asphalt shingle waste at the inlet of the microwave dryer has a moisture content of greater than 3% by weight based on the total weight of the asphalt shingle waste. In some embodiments, the asphalt shingle waste at the inlet of the microwave dryer has a moisture content of greater than 4% by weight based on the total weight of the asphalt shingle waste. In some embodiments, the asphalt shingle waste at the inlet of the microwave dryer has a moisture content of greater than 5% by weight based on the total weight of the asphalt shingle waste. In some embodiments, the asphalt shingle waste at the inlet of the microwave dryer has a moisture content of greater than 6% by weight based on the total weight of the asphalt shingle waste. In some embodiments, the asphalt shingle waste at the inlet of the microwave dryer has a moisture content of greater than 7% by weight based on the total weight of the asphalt shingle waste. In some embodiments, the asphalt shingle waste at the inlet of the microwave dryer has a moisture content of greater than 8% by weight based on the total weight of the asphalt shingle waste. In some embodiments, the asphalt shingle waste at the inlet of the microwave dryer has a moisture content of greater than 9% by weight based on the total weight of the asphalt shingle waste. In some embodiments, the asphalt shingle waste at the inlet of the microwave dryer has a moisture content of greater than 10% by weight based on the total weight of the asphalt shingle waste. In some embodiments, the asphalt shingle waste at the inlet of the microwave dryer has a moisture content of greater than 11% by weight based on the total weight of the asphalt shingle waste. In some embodiments, the asphalt shingle waste at the inlet of the microwave dryer has a moisture content of greater than 12% by weight based on the total weight of the asphalt shingle waste. In some embodiments, the asphalt shingle waste at the inlet of the microwave dryer has a moisture content of greater than 13% by weight based on the total weight of the asphalt shingle waste. In some embodiments, the asphalt shingle waste at the inlet of the microwave dryer has a moisture content of greater than 14% by weight based on the total weight of the asphalt shingle waste. In some embodiments, the asphalt shingle waste at the inlet of the microwave dryer has a moisture content of greater than 15% by weight based on the total weight of the asphalt shingle waste. In some embodiments, the asphalt shingle waste at the inlet of the microwave dryer has a moisture content of greater than 16% by weight based on the total weight of the asphalt shingle waste. In some embodiments, the asphalt shingle waste at the inlet of the microwave dryer has a moisture content of greater than 17% by weight based on the total weight of the asphalt shingle waste. In some embodiments, the asphalt shingle waste at the inlet of the microwave dryer has a moisture content of greater than 18% by weight based on the total weight of the asphalt shingle waste. In some embodiments, the asphalt shingle waste at the inlet of the microwave dryer has a moisture content of greater than 19% by weight based on the total weight of the asphalt shingle waste.

In some embodiments, the asphalt shingle waste at the inlet of the microwave dryer has a moisture content of greater than 2% to 20% by weight based on the total weight of the asphalt shingle waste. In some embodiments, the asphalt shingle waste at the inlet of the microwave dryer has a moisture content of 3% to 20% by weight based on the total weight of the asphalt shingle waste. In some embodiments, the asphalt shingle waste at the inlet of the microwave dryer has a moisture content of 4% to 20% by weight based on the total weight of the asphalt shingle waste. In some embodiments, the asphalt shingle waste at the inlet of the microwave dryer has a moisture content of 5% to 20% by weight based on the total weight of the asphalt shingle waste. In some embodiments, the asphalt shingle waste at the inlet of the microwave dryer has a moisture content of 6% to 20% by weight based on the total weight of the asphalt shingle waste. In some embodiments, the asphalt shingle waste at the inlet of the microwave dryer has a moisture content of 7% to 20% by weight based on the total weight of the asphalt shingle waste. In some embodiments, the asphalt shingle waste at the inlet of the microwave dryer has a moisture content of 8% to 20% by weight based on the total weight of the asphalt shingle waste. In some embodiments, the asphalt shingle waste at the inlet of the microwave dryer has a moisture content of 9% to 20% by weight based on the total weight of the asphalt shingle waste. In some embodiments, the asphalt shingle waste at the inlet of the microwave dryer has a moisture content of 10% to 20% by weight based on the total weight of the asphalt shingle waste. In some embodiments, the asphalt shingle waste at the inlet of the microwave dryer has a moisture content of 11% to 20% by weight based on the total weight of the asphalt shingle waste. In some embodiments, the asphalt shingle waste at the inlet of the microwave dryer has a moisture content of 12% to 20% by weight based on the total weight of the asphalt shingle waste. In some embodiments, the asphalt shingle waste at the inlet of the microwave dryer has a moisture content of 13% to 20% by weight based on the total weight of the asphalt shingle waste. In some embodiments, the asphalt shingle waste at the inlet of the microwave dryer has a moisture content of 14% to 20% by weight based on the total weight of the asphalt shingle waste. In some embodiments, the asphalt shingle waste at the inlet of the microwave dryer has a moisture content of 15% to 20% by weight based on the total weight of the asphalt shingle waste. In some embodiments, the asphalt shingle waste at the inlet of the microwave dryer has a moisture content of 16% to 20% by weight based on the total weight of the asphalt shingle waste. In some embodiments, the asphalt shingle waste at the inlet of the microwave dryer has a moisture content of 17% to 20% by weight based on the total weight of the asphalt shingle waste. In some embodiments, the asphalt shingle waste at the inlet of the microwave dryer has a moisture content of 18% to 20% by weight based on the total weight of the asphalt shingle waste. In some embodiments, the asphalt shingle waste at the inlet of the microwave dryer has a moisture content of 19% to 20% by weight based on the total weight of the asphalt shingle waste.

In some embodiments, the asphalt shingle waste at the inlet of the microwave dryer has a moisture content of greater than 2% to 20% by weight based on the total weight of the asphalt shingle waste. In some embodiments, the asphalt shingle waste at the inlet of the microwave dryer has a moisture content of greater than 2% to 19% by weight based on the total weight of the asphalt shingle waste. In some embodiments, the asphalt shingle waste at the inlet of the microwave dryer has a moisture content of greater than 2% to 18% by weight based on the total weight of the asphalt shingle waste. In some embodiments, the asphalt shingle waste at the inlet of the microwave dryer has a moisture content of greater than 2% to 17% by weight based on the total weight of the asphalt shingle waste. In some embodiments, the asphalt shingle waste at the inlet of the microwave dryer has a moisture content of greater than 2% to 16% by weight based on the total weight of the asphalt shingle waste. In some embodiments, the asphalt shingle waste at the inlet of the microwave dryer has a moisture content of greater than 2% to 15% by weight based on the total weight of the asphalt shingle waste. In some embodiments, the asphalt shingle waste at the inlet of the microwave dryer has a moisture content of greater than 2% to 14% by weight based on the total weight of the asphalt shingle waste. In some embodiments, the asphalt shingle waste at the inlet of the microwave dryer has a moisture content of greater than 2% to 13% by weight based on the total weight of the asphalt shingle waste. In some embodiments, the asphalt shingle waste at the inlet of the microwave dryer has a moisture content of greater than 2% to 12% by weight based on the total weight of the asphalt shingle waste. In some embodiments, the asphalt shingle waste at the inlet of the microwave dryer has a moisture content of greater than 2% to 11% by weight based on the total weight of the asphalt shingle waste. In some embodiments, the asphalt shingle waste at the inlet of the microwave dryer has a moisture content of greater than 2% to 10% by weight based on the total weight of the asphalt shingle waste. In some embodiments, the asphalt shingle waste at the inlet of the microwave dryer has a moisture content of greater than 2% to 9% by weight based on the total weight of the asphalt shingle waste. In some embodiments, the asphalt shingle waste at the inlet of the microwave dryer has a moisture content of greater than 2% to 8% by weight based on the total weight of the asphalt shingle waste. In some embodiments, the asphalt shingle waste at the inlet of the microwave dryer has a moisture content of greater than 2% to 7% by weight based on the total weight of the asphalt shingle waste. In some embodiments, the asphalt shingle waste at the inlet of the microwave dryer has a moisture content of greater than 2% to 6% by weight based on the total weight of the asphalt shingle waste. In some embodiments, the asphalt shingle waste at the inlet of the microwave dryer has a moisture content of greater than 2% to 5% by weight based on the total weight of the asphalt shingle waste. In some embodiments, the asphalt shingle waste at the inlet of the microwave dryer has a moisture content of greater than 2% to 4% by weight based on the total weight of the asphalt shingle waste. In some embodiments, the asphalt shingle waste at the inlet of the microwave dryer has a moisture content of greater than 2% to 3% by weight based on the total weight of the asphalt shingle waste.

In some embodiments, the asphalt shingle waste at the inlet of the microwave dryer has a moisture content of 3% to 10% by weight based on the total weight of the asphalt shingle waste. In some embodiments, the asphalt shingle waste at the inlet of the microwave dryer has a moisture content of 3% to 9% by weight based on the total weight of the asphalt shingle waste. In some embodiments, the asphalt shingle waste at the inlet of the microwave dryer has a moisture content of 3% to 8% by weight based on the total weight of the asphalt shingle waste. In some embodiments, the asphalt shingle waste at the inlet of the microwave dryer has a moisture content of 4% to 10% by weight based on the total weight of the asphalt shingle waste. In some embodiments, the asphalt shingle waste at the inlet of the microwave dryer has a moisture content of 4% to 9% by weight based on the total weight of the asphalt shingle waste. In some embodiments, the asphalt shingle waste at the inlet of the microwave dryer has a moisture content of 4% to 8% by weight based on the total weight of the asphalt shingle waste. In some embodiments, the asphalt shingle waste at the inlet of the microwave dryer has a moisture content of 5% to 10% by weight based on the total weight of the asphalt shingle waste. In some embodiments, the asphalt shingle waste at the inlet of the microwave dryer has a moisture content of 5% to 9% by weight based on the total weight of the asphalt shingle waste. In some embodiments, the asphalt shingle waste at the inlet of the microwave dryer has a moisture content of 5% to 8% by weight based on the total weight of the asphalt shingle waste. In some embodiments, the moisture content of the asphalt shingle waste at the inlet of the microwave dryer is a first moisture content.

In some embodiments, the moisture content of the asphalt shingle waste at the outlet of the microwave dryer is less than the moisture content of the asphalt shingle waste at the inlet of the microwave dryer.

In some embodiments, the asphalt shingle waste at the outlet of the microwave dryer has a moisture content of 2% by weight or less based on the total weight of the asphalt shingle waste. In some embodiments, the asphalt shingle waste at the outlet of the microwave dryer has a moisture content of 1.9% by weight or less based on the total weight of the asphalt shingle waste. In some embodiments, the asphalt shingle waste at the outlet of the microwave dryer has a moisture content of 1.8% by weight or less based on the total weight of the asphalt shingle waste. In some embodiments, the asphalt shingle waste at the outlet of the microwave dryer has a moisture content of 1.7% by weight or less based on the total weight of the asphalt shingle waste. In some embodiments, the asphalt shingle waste at the outlet of the microwave dryer has a moisture content of 1.6% by weight or less based on the total weight of the asphalt shingle waste. In some embodiments, the asphalt shingle waste at the outlet of the microwave dryer has a moisture content of 1.5% by weight or less based on the total weight of the asphalt shingle waste. In some embodiments, the asphalt shingle waste at the outlet of the microwave dryer has a moisture content of 1.4% by weight or less based on the total weight of the asphalt shingle waste. In some embodiments, the asphalt shingle waste at the outlet of the microwave dryer has a moisture content of 1.3% by weight or less based on the total weight of the asphalt shingle waste. In some embodiments, the asphalt shingle waste at the outlet of the microwave dryer has a moisture content of 1.2% by weight or less based on the total weight of the asphalt shingle waste. In some embodiments, the asphalt shingle waste at the outlet of the microwave dryer has a moisture content of 1.1% by weight or less based on the total weight of the asphalt shingle waste.

In some embodiments, the asphalt shingle waste at the outlet of the microwave dryer has a moisture content of 1% by weight or less based on the total weight of the asphalt shingle waste. In some embodiments, the asphalt shingle waste at the outlet of the microwave dryer has a moisture content of 0.9% by weight or less based on the total weight of the asphalt shingle waste. In some embodiments, the asphalt shingle waste at the outlet of the microwave dryer has a moisture content of 0.8% by weight or less based on the total weight of the asphalt shingle waste. In some embodiments, the asphalt shingle waste at the outlet of the microwave dryer has a moisture content of 0.7% by weight or less based on the total weight of the asphalt shingle waste. In some embodiments, the asphalt shingle waste at the outlet of the microwave dryer has a moisture content of 0.6% by weight or less based on the total weight of the asphalt shingle waste. In some embodiments, the asphalt shingle waste at the outlet of the microwave dryer has a moisture content of 0.5% by weight or less based on the total weight of the asphalt shingle waste. In some embodiments, the asphalt shingle waste at the outlet of the microwave dryer has a moisture content of 0.4% by weight or less based on the total weight of the asphalt shingle waste. In some embodiments, the asphalt shingle waste at the outlet of the microwave dryer has a moisture content of 0.3% by weight or less based on the total weight of the asphalt shingle waste. In some embodiments, the asphalt shingle waste at the outlet of the microwave dryer has a moisture content of 0.2% by weight or less based on the total weight of the asphalt shingle waste. In some embodiments, the asphalt shingle waste at the outlet of the microwave dryer has a moisture content of 0.1% by weight or less based on the total weight of the asphalt shingle waste.

In some embodiments, the asphalt shingle waste at the outlet of the microwave dryer has a moisture content of 0.1% to 2% by weight based on the total weight of the asphalt shingle waste. In some embodiments, the asphalt shingle waste at the outlet of the microwave dryer has a moisture content of 0.1% to 1.9% by weight based on the total weight of the asphalt shingle waste. In some embodiments, the asphalt shingle waste at the outlet of the microwave dryer has a moisture content of 0.1% to 1.8% by weight based on the total weight of the asphalt shingle waste. In some embodiments, the asphalt shingle waste at the outlet of the microwave dryer has a moisture content of 0.1% to 1.7% by weight based on the total weight of the asphalt shingle waste. In some embodiments, the asphalt shingle waste at the outlet of the microwave dryer has a moisture content of 0.1% to 1.6% by weight based on the total weight of the asphalt shingle waste. In some embodiments, the asphalt shingle waste at the outlet of the microwave dryer has a moisture content of 0.1% to 1.5% by weight based on the total weight of the asphalt shingle waste. In some embodiments, the asphalt shingle waste at the outlet of the microwave dryer has a moisture content of 0.1% to 1.4% by weight based on the total weight of the asphalt shingle waste. In some embodiments, the asphalt shingle waste at the outlet of the microwave dryer has a moisture content of 0.1% to 1.3% by weight based on the total weight of the asphalt shingle waste. In some embodiments, the asphalt shingle waste at the outlet of the microwave dryer has a moisture content of 0.1% to 1.2% by weight based on the total weight of the asphalt shingle waste. In some embodiments, the asphalt shingle waste at the outlet of the microwave dryer has a moisture content of 0.1% to 1.1% by weight based on the total weight of the asphalt shingle waste.

In some embodiments, the asphalt shingle waste at the outlet of the microwave dryer has a moisture content of 0.1% to 1% by weight based on the total weight of the asphalt shingle waste. In some embodiments, the asphalt shingle waste at the outlet of the microwave dryer has a moisture content of 0.1% to 0.9% by weight based on the total weight of the asphalt shingle waste. In some embodiments, the asphalt shingle waste at the outlet of the microwave dryer has a moisture content of 0.1% to 0.8% by weight based on the total weight of the asphalt shingle waste. In some embodiments, the asphalt shingle waste at the outlet of the microwave dryer has a moisture content of 0.1% to 0.7% by weight based on the total weight of the asphalt shingle waste. In some embodiments, the asphalt shingle waste at the outlet of the microwave dryer has a moisture content of 0.1% to 0.6% by weight based on the total weight of the asphalt shingle waste. In some embodiments, the asphalt shingle waste at the outlet of the microwave dryer has a moisture content of 0.1% to 0.5% by weight based on the total weight of the asphalt shingle waste. In some embodiments, the asphalt shingle waste at the outlet of the microwave dryer has a moisture content of 0.1% to 0.4% by weight based on the total weight of the asphalt shingle waste. In some embodiments, the asphalt shingle waste at the outlet of the microwave dryer has a moisture content of 0.1% to 0.3% by weight based on the total weight of the asphalt shingle waste. In some embodiments, the asphalt shingle waste at the outlet of the microwave dryer has a moisture content of 0.1% to 0.2% by weight based on the total weight of the asphalt shingle waste.

In some embodiments, the asphalt shingle waste at the outlet of the microwave dryer has a moisture content of 0.2% to 2% by weight based on the total weight of the asphalt shingle waste. In some embodiments, the asphalt shingle waste at the outlet of the microwave dryer has a moisture content of 0.3% to 2% by weight based on the total weight of the asphalt shingle waste. In some embodiments, the asphalt shingle waste at the outlet of the microwave dryer has a moisture content of 0.4% to 2% by weight based on the total weight of the asphalt shingle waste. In some embodiments, the asphalt shingle waste at the outlet of the microwave dryer has a moisture content of 0.5% to 2% by weight based on the total weight of the asphalt shingle waste. In some embodiments, the asphalt shingle waste at the outlet of the microwave dryer has a moisture content of 0.6% to 2% by weight based on the total weight of the asphalt shingle waste. In some embodiments, the asphalt shingle waste at the outlet of the microwave dryer has a moisture content of 0.7% to 2% by weight based on the total weight of the asphalt shingle waste. In some embodiments, the asphalt shingle waste at the outlet of the microwave dryer has a moisture content of 0.8% to 2% by weight based on the total weight of the asphalt shingle waste. In some embodiments, the asphalt shingle waste at the outlet of the microwave dryer has a moisture content of 0.9% to 2% by weight based on the total weight of the asphalt shingle waste. In some embodiments, the asphalt shingle waste at the outlet of the microwave dryer has a moisture content of 1% to 2% by weight based on the total weight of the asphalt shingle waste.

In some embodiments, the asphalt shingle waste at the outlet of the microwave dryer has a moisture content of 1.1% to 2% by weight based on the total weight of the asphalt shingle waste. In some embodiments, the asphalt shingle waste at the outlet of the microwave dryer has a moisture content of 1.2% to 2% by weight based on the total weight of the asphalt shingle waste. In some embodiments, the asphalt shingle waste at the outlet of the microwave dryer has a moisture content of 1.3% to 2% by weight based on the total weight of the asphalt shingle waste. In some embodiments, the asphalt shingle waste at the outlet of the microwave dryer has a moisture content of 1.4% to 2% by weight based on the total weight of the asphalt shingle waste. In some embodiments, the asphalt shingle waste at the outlet of the microwave dryer has a moisture content of 1.%5 to 2% by weight based on the total weight of the asphalt shingle waste. In some embodiments, the asphalt shingle waste at the outlet of the microwave dryer has a moisture content of 1.6% to 2% by weight based on the total weight of the asphalt shingle waste. In some embodiments, the asphalt shingle waste at the outlet of the microwave dryer has a moisture content of 1.7% to 2% by weight based on the total weight of the asphalt shingle waste. In some embodiments, the asphalt shingle waste at the outlet of the microwave dryer has a moisture content of 1.8% to 2% by weight based on the total weight of the asphalt shingle waste. In some embodiments, the asphalt shingle waste at the outlet of the microwave dryer has a moisture content of 1.9% to 2% by weight based on the total weight of the asphalt shingle waste. In some embodiments, the moisture content of the asphalt shingle waste at the outlet of the microwave dryer is a second moisture content.

In some embodiments, the moisture content of the asphalt shingle waste at the outlet of the microwave dryer is at least 1% less than the moisture content of the asphalt shingle waste at the inlet of the microwave dryer. In some embodiments, the moisture content of the asphalt shingle waste at the outlet of the microwave dryer is at least 5% less than the moisture content of the asphalt shingle waste at the inlet of the microwave dryer. In some embodiments, the moisture content of the asphalt shingle waste at the outlet of the microwave dryer is at least 10% less than the moisture content of the asphalt shingle waste at the inlet of the microwave dryer. In some embodiments, the moisture content of the asphalt shingle waste at the outlet of the microwave dryer is at least 15% less than the moisture content of the asphalt shingle waste at the inlet of the microwave dryer. In some embodiments, the moisture content of the asphalt shingle waste at the outlet of the microwave dryer is at least 20% less than the moisture content of the asphalt shingle waste at the inlet of the microwave dryer. In some embodiments, the moisture content of the asphalt shingle waste at the outlet of the microwave dryer is at least 25% less than the moisture content of the asphalt shingle waste at the inlet of the microwave dryer. In some embodiments, the moisture content of the asphalt shingle waste at the outlet of the microwave dryer is at least 30% less than the moisture content of the asphalt shingle waste at the inlet of the microwave dryer. In some embodiments, the moisture content of the asphalt shingle waste at the outlet of the microwave dryer is at least 35% less than the moisture content of the asphalt shingle waste at the inlet of the microwave dryer. In some embodiments, the moisture content of the asphalt shingle waste at the outlet of the microwave dryer is at least 40% less than the moisture content of the asphalt shingle waste at the inlet of the microwave dryer. In some embodiments, the moisture content of the asphalt shingle waste at the outlet of the microwave dryer is at least 45% less than the moisture content of the asphalt shingle waste at the inlet of the microwave dryer. In some embodiments, the moisture content of the asphalt shingle waste at the outlet of the microwave dryer is at least 50% less than the moisture content of the asphalt shingle waste at the inlet of the microwave dryer. In some embodiments, the moisture content of the asphalt shingle waste at the outlet of the microwave dryer is at least 55% less than the moisture content of the asphalt shingle waste at the inlet of the microwave dryer. In some embodiments, the moisture content of the asphalt shingle waste at the outlet of the microwave dryer is at least 60% less than the moisture content of the asphalt shingle waste at the inlet of the microwave dryer. In some embodiments, the moisture content of the asphalt shingle waste at the outlet of the microwave dryer is at least 65% less than the moisture content of the asphalt shingle waste at the inlet of the microwave dryer. In some embodiments, the moisture content of the asphalt shingle waste at the outlet of the microwave dryer is at least 70% less than the moisture content of the asphalt shingle waste at the inlet of the microwave dryer. In some embodiments, the moisture content of the asphalt shingle waste at the outlet of the microwave dryer is at least 75% less than the moisture content of the asphalt shingle waste at the inlet of the microwave dryer. In some embodiments, the moisture content of the asphalt shingle waste at the outlet of the microwave dryer is at least 80% less than the moisture content of the asphalt shingle waste at the inlet of the microwave dryer. In some embodiments, the moisture content of the asphalt shingle waste at the outlet of the microwave dryer is at least 85% less than the moisture content of the asphalt shingle waste at the inlet of the microwave dryer. In some embodiments, the moisture content of the asphalt shingle waste at the outlet of the microwave dryer is at least 90% less than the moisture content of the asphalt shingle waste at the inlet of the microwave dryer. In some embodiments, the moisture content of the asphalt shingle waste at the outlet of the microwave dryer is at least 95% less than the moisture content of the asphalt shingle waste at the inlet of the microwave dryer.

In some embodiments, the moisture content of the asphalt shingle waste at the outlet of the microwave dryer is 1% to 95% less than the moisture content of the asphalt shingle waste at the inlet of the microwave dryer. In some embodiments, the moisture content of the asphalt shingle waste at the outlet of the microwave dryer is 5% to 95% less than the moisture content of the asphalt shingle waste at the inlet of the microwave dryer. In some embodiments, the moisture content of the asphalt shingle waste at the outlet of the microwave dryer is 10% to 95% less than the moisture content of the asphalt shingle waste at the inlet of the microwave dryer. In some embodiments, the moisture content of the asphalt shingle waste at the outlet of the microwave dryer is 15% to 95% less than the moisture content of the asphalt shingle waste at the inlet of the microwave dryer. In some embodiments, the moisture content of the asphalt shingle waste at the outlet of the microwave dryer is 20% to 95% less than the moisture content of the asphalt shingle waste at the inlet of the microwave dryer. In some embodiments, the moisture content of the asphalt shingle waste at the outlet of the microwave dryer is 25% to 95% less than the moisture content of the asphalt shingle waste at the inlet of the microwave dryer. In some embodiments, the moisture content of the asphalt shingle waste at the outlet of the microwave dryer is 30% to 95% less than the moisture content of the asphalt shingle waste at the inlet of the microwave dryer. In some embodiments, the moisture content of the asphalt shingle waste at the outlet of the microwave dryer is 35% to 95% less than the moisture content of the asphalt shingle waste at the inlet of the microwave dryer. In some embodiments, the moisture content of the asphalt shingle waste at the outlet of the microwave dryer is 40% to 95% less than the moisture content of the asphalt shingle waste at the inlet of the microwave dryer. In some embodiments, the moisture content of the asphalt shingle waste at the outlet of the microwave dryer is 45% to 95% less than the moisture content of the asphalt shingle waste at the inlet of the microwave dryer. In some embodiments, the moisture content of the asphalt shingle waste at the outlet of the microwave dryer is 50% to 95% less than the moisture content of the asphalt shingle waste at the inlet of the microwave dryer.

In some embodiments, the moisture content of the asphalt shingle waste at the outlet of the microwave dryer is 55% to 95% less than the moisture content of the asphalt shingle waste at the inlet of the microwave dryer. In some embodiments, the moisture content of the asphalt shingle waste at the outlet of the microwave dryer is 60% to 95% less than the moisture content of the asphalt shingle waste at the inlet of the microwave dryer. In some embodiments, the moisture content of the asphalt shingle waste at the outlet of the microwave dryer is 65% to 95% less than the moisture content of the asphalt shingle waste at the inlet of the microwave dryer. In some embodiments, the moisture content of the asphalt shingle waste at the outlet of the microwave dryer is 70% to 95% less than the moisture content of the asphalt shingle waste at the inlet of the microwave dryer. In some embodiments, the moisture content of the asphalt shingle waste at the outlet of the microwave dryer is 75% to 95% less than the moisture content of the asphalt shingle waste at the inlet of the microwave dryer. In some embodiments, the moisture content of the asphalt shingle waste at the outlet of the microwave dryer is 80% to 95% less than the moisture content of the asphalt shingle waste at the inlet of the microwave dryer. In some embodiments, the moisture content of the asphalt shingle waste at the outlet of the microwave dryer is 85% to 95% less than the moisture content of the asphalt shingle waste at the inlet of the microwave dryer. In some embodiments, the moisture content of the asphalt shingle waste at the outlet of the microwave dryer is 90% to 95% less than the moisture content of the asphalt shingle waste at the inlet of the microwave dryer.

In some embodiments, the moisture content of the asphalt shingle waste at the outlet of the microwave dryer is 1% to 99% less than the moisture content of the asphalt shingle waste at the inlet of the microwave dryer. In some embodiments, the moisture content of the asphalt shingle waste at the outlet of the microwave dryer is 5% to 99% less than the moisture content of the asphalt shingle waste at the inlet of the microwave dryer. In some embodiments, the moisture content of the asphalt shingle waste at the outlet of the microwave dryer is 10% to 99% less than the moisture content of the asphalt shingle waste at the inlet of the microwave dryer. In some embodiments, the moisture content of the asphalt shingle waste at the outlet of the microwave dryer is 15% to 99% less than the moisture content of the asphalt shingle waste at the inlet of the microwave dryer. In some embodiments, the moisture content of the asphalt shingle waste at the outlet of the microwave dryer is 20% to 99% less than the moisture content of the asphalt shingle waste at the inlet of the microwave dryer. In some embodiments, the moisture content of the asphalt shingle waste at the outlet of the microwave dryer is 25% to 99% less than the moisture content of the asphalt shingle waste at the inlet of the microwave dryer. In some embodiments, the moisture content of the asphalt shingle waste at the outlet of the microwave dryer is 30% to 99% less than the moisture content of the asphalt shingle waste at the inlet of the microwave dryer. In some embodiments, the moisture content of the asphalt shingle waste at the outlet of the microwave dryer is 35% to 99% less than the moisture content of the asphalt shingle waste at the inlet of the microwave dryer. In some embodiments, the moisture content of the asphalt shingle waste at the outlet of the microwave dryer is 40% to 99% less than the moisture content of the asphalt shingle waste at the inlet of the microwave dryer. In some embodiments, the moisture content of the asphalt shingle waste at the outlet of the microwave dryer is 45% to 99% less than the moisture content of the asphalt shingle waste at the inlet of the microwave dryer. In some embodiments, the moisture content of the asphalt shingle waste at the outlet of the microwave dryer is 50% to 99% less than the moisture content of the asphalt shingle waste at the inlet of the microwave dryer.

In some embodiments, the moisture content of the asphalt shingle waste at the outlet of the microwave dryer is 55% to 99% less than the moisture content of the asphalt shingle waste at the inlet of the microwave dryer. In some embodiments, the moisture content of the asphalt shingle waste at the outlet of the microwave dryer is 60% to 99% less than the moisture content of the asphalt shingle waste at the inlet of the microwave dryer. In some embodiments, the moisture content of the asphalt shingle waste at the outlet of the microwave dryer is 65% to 99% less than the moisture content of the asphalt shingle waste at the inlet of the microwave dryer. In some embodiments, the moisture content of the asphalt shingle waste at the outlet of the microwave dryer is 70% to 99% less than the moisture content of the asphalt shingle waste at the inlet of the microwave dryer. In some embodiments, the moisture content of the asphalt shingle waste at the outlet of the microwave dryer is 75% to 99% less than the moisture content of the asphalt shingle waste at the inlet of the microwave dryer. In some embodiments, the moisture content of the asphalt shingle waste at the outlet of the microwave dryer is 80% to 99% less than the moisture content of the asphalt shingle waste at the inlet of the microwave dryer. In some embodiments, the moisture content of the asphalt shingle waste at the outlet of the microwave dryer is 85% to 99% less than the moisture content of the asphalt shingle waste at the inlet of the microwave dryer. In some embodiments, the moisture content of the asphalt shingle waste at the outlet of the microwave dryer is 90% to 99% less than the moisture content of the asphalt shingle waste at the inlet of the microwave dryer. In some embodiments, the moisture content of the asphalt shingle waste at the outlet of the microwave dryer is 95% to 99% less than the moisture content of the asphalt shingle waste at the inlet of the microwave dryer.

In some embodiments, the moisture content of the asphalt shingle waste at the outlet of the microwave dryer is 1% to 90% less than the moisture content of the asphalt shingle waste at the inlet of the microwave dryer. In some embodiments, the moisture content of the asphalt shingle waste at the outlet of the microwave dryer is 1% to 85% less than the moisture content of the asphalt shingle waste at the inlet of the microwave dryer. In some embodiments, the moisture content of the asphalt shingle waste at the outlet of the microwave dryer is 1% to 80% less than the moisture content of the asphalt shingle waste at the inlet of the microwave dryer. In some embodiments, the moisture content of the asphalt shingle waste at the outlet of the microwave dryer is 1% to 75% less than the moisture content of the asphalt shingle waste at the inlet of the microwave dryer. In some embodiments, the moisture content of the asphalt shingle waste at the outlet of the microwave dryer is 1% to 70% less than the moisture content of the asphalt shingle waste at the inlet of the microwave dryer. In some embodiments, the moisture content of the asphalt shingle waste at the outlet of the microwave dryer is 1% to 65% less than the moisture content of the asphalt shingle waste at the inlet of the microwave dryer. In some embodiments, the moisture content of the asphalt shingle waste at the outlet of the microwave dryer is 1% to 60% less than the moisture content of the asphalt shingle waste at the inlet of the microwave dryer. In some embodiments, the moisture content of the asphalt shingle waste at the outlet of the microwave dryer is 1% to 55% less than the moisture content of the asphalt shingle waste at the inlet of the microwave dryer. In some embodiments, the moisture content of the asphalt shingle waste at the outlet of the microwave dryer is 1% to 50% less than the moisture content of the asphalt shingle waste at the inlet of the microwave dryer. In some embodiments, the moisture content of the asphalt shingle waste at the outlet of the microwave dryer is 1% to 45% less than the moisture content of the asphalt shingle waste at the inlet of the microwave dryer. In some embodiments, the moisture content of the asphalt shingle waste at the outlet of the microwave dryer is 1% to 40% less than the moisture content of the asphalt shingle waste at the inlet of the microwave dryer. In some embodiments, the moisture content of the asphalt shingle waste at the outlet of the microwave dryer is 1% to 35% less than the moisture content of the asphalt shingle waste at the inlet of the microwave dryer. In some embodiments, the moisture content of the asphalt shingle waste at the outlet of the microwave dryer is 1% to 30% less than the moisture content of the asphalt shingle waste at the inlet of the microwave dryer. In some embodiments, the moisture content of the asphalt shingle waste at the outlet of the microwave dryer is 1% to 25% less than the moisture content of the asphalt shingle waste at the inlet of the microwave dryer. In some embodiments, the moisture content of the asphalt shingle waste at the outlet of the microwave dryer is 1% to 20% less than the moisture content of the asphalt shingle waste at the inlet of the microwave dryer. In some embodiments, the moisture content of the asphalt shingle waste at the outlet of the microwave dryer is 1% to 15% less than the moisture content of the asphalt shingle waste at the inlet of the microwave dryer. In some embodiments, the moisture content of the asphalt shingle waste at the outlet of the microwave dryer is 1% to 10% less than the moisture content of the asphalt shingle waste at the inlet of the microwave dryer. In some embodiments, the moisture content of the asphalt shingle waste at the outlet of the microwave dryer is 1% to 5% less than the moisture content of the asphalt shingle waste at the inlet of the microwave dryer.

In some embodiments, the asphalt shingle waste has a first temperature at the inlet of the microwave dryer. In some embodiments, the first temperature of the asphalt shingle waste is ambient temperature. In some embodiments, the first temperature of the asphalt shingle waste is a temperature of 50° F. to 120° F. In some embodiments, the first temperature of the asphalt shingle waste is a temperature of 50° F. to 100° F. In some embodiments, the first temperature of the asphalt shingle waste is a temperature of 55° F. to 100° F. In some embodiments, the first temperature of the asphalt shingle waste is a temperature of 60° F. to 100° F. In some embodiments, the first temperature of the asphalt shingle waste is a temperature of 65° F. to 100° F. In some embodiments, the first temperature of the asphalt shingle waste is a temperature of 70° F. to 100° F. In some embodiments, the first temperature of the asphalt shingle waste is a temperature of 75° F. to 100° F. In some embodiments, the first temperature of the asphalt shingle waste is a temperature of 80° F. to 100° F. In some embodiments, the first temperature of the asphalt shingle waste is a temperature of 85° F. to 100° F. In some embodiments, the first temperature of the asphalt shingle waste is a temperature of 90° F. to 100° F. In some embodiments, the first temperature of the asphalt shingle waste is a temperature of 95° F. to 100° F.

In some embodiments, the first temperature of the asphalt shingle waste is a temperature of 50° F. to 95° F. In some embodiments, the first temperature of the asphalt shingle waste is a temperature of 50° F. to 90° F. In some embodiments, the first temperature of the asphalt shingle waste is a temperature of 50° F. to 85° F. In some embodiments, the first temperature of the asphalt shingle waste is a temperature of 50° F. to 80° F. In some embodiments, the first temperature of the asphalt shingle waste is a temperature of 50° F. to 75° F. In some embodiments, the first temperature of the asphalt shingle waste is a temperature of 50° F. to 70° F. In some embodiments, the first temperature of the asphalt shingle waste is a temperature of 50° F. to 65° F. In some embodiments, the first temperature of the asphalt shingle waste is a temperature of 50° F. to 60° F. In some embodiments, the first temperature of the asphalt shingle waste is a temperature of 50° F. to 55° F.

In some embodiments, the asphalt shingle waste has a second temperature at the outlet of the microwave dryer. In some embodiments, the second temperature of the asphalt shingle waste is ambient temperature. In some embodiments, the second temperature of the asphalt shingle waste is a temperature of 50° F. to 120° F. In some embodiments, the second temperature of the asphalt shingle waste is a temperature of 50° F. to 100° F. In some embodiments, the second temperature of the asphalt shingle waste is a temperature of 55° F. to 100° F. In some embodiments, the second temperature of the asphalt shingle waste is a temperature of 60° F. to 100° F. In some embodiments, the second temperature of the asphalt shingle waste is a temperature of 65° F. to 100° F. In some embodiments, the second temperature of the asphalt shingle waste is a temperature of 70° F. to 100° F. In some embodiments, the second temperature of the asphalt shingle waste is a temperature of 75° F. to 100° F. In some embodiments, the second temperature of the asphalt shingle waste is a temperature of 80° F. to 100° F. In some embodiments, the second temperature of the asphalt shingle waste is a temperature of 85° F. to 100° F. In some embodiments, the second temperature of the asphalt shingle waste is a temperature of 90° F. to 100° F. In some embodiments, the second temperature of the asphalt shingle waste is a temperature of 95° F. to 100° F.

In some embodiments, the second temperature of the asphalt shingle waste is a temperature of 50° F. to 95° F. In some embodiments, the second temperature of the asphalt shingle waste is a temperature of 50° F. to 90° F. In some embodiments, the second temperature of the asphalt shingle waste is a temperature of 50° F. to 85° F. In some embodiments, the second temperature of the asphalt shingle waste is a temperature of 50° F. to 80° F. In some embodiments, the second temperature of the asphalt shingle waste is a temperature of 50° F. to 75° F. In some embodiments, the second temperature of the asphalt shingle waste is a temperature of 50° F. to 70° F. In some embodiments, the second temperature of the asphalt shingle waste is a temperature of 50° F. to 65° F. In some embodiments, the second temperature of the asphalt shingle waste is a temperature of 50° F. to 60° F. In some embodiments, the second temperature of the asphalt shingle waste is a temperature of 50° F. to 55° F.

In some embodiments, the second temperature of the asphalt shingle waste is within 20% of the first temperature of the asphalt shingle waste. In some embodiments, the second temperature of the asphalt shingle waste is within 19.5% of the first temperature of the asphalt shingle waste. In some embodiments, the second temperature of the asphalt shingle waste is within 19% of the first temperature of the asphalt shingle waste. In some embodiments, the second temperature of the asphalt shingle waste is within 18.5% of the first temperature of the asphalt shingle waste. In some embodiments, the second temperature of the asphalt shingle waste is within 18% of the first temperature of the asphalt shingle waste. In some embodiments, the second temperature of the asphalt shingle waste is within 17.5% of the first temperature of the asphalt shingle waste. In some embodiments, the second temperature of the asphalt shingle waste is within 17% of the first temperature of the asphalt shingle waste. In some embodiments, the second temperature of the asphalt shingle waste is within 16.5% of the first temperature of the asphalt shingle waste. In some embodiments, the second temperature of the asphalt shingle waste is within 16% of the first temperature of the asphalt shingle waste. In some embodiments, the second temperature of the asphalt shingle waste is within 15.5% of the first temperature of the asphalt shingle waste. In some embodiments, the second temperature of the asphalt shingle waste is within 15% of the first temperature of the asphalt shingle waste. In some embodiments, the second temperature of the asphalt shingle waste is within 14.5% of the first temperature of the asphalt shingle waste. In some embodiments, the second temperature of the asphalt shingle waste is within 14% of the first temperature of the asphalt shingle waste. In some embodiments, the second temperature of the asphalt shingle waste is within 13.5% of the first temperature of the asphalt shingle waste. In some embodiments, the second temperature of the asphalt shingle waste is within 13% of the first temperature of the asphalt shingle waste. In some embodiments, the second temperature of the asphalt shingle waste is within 12.5% of the first temperature of the asphalt shingle waste. In some embodiments, the second temperature of the asphalt shingle waste is within 12% of the first temperature of the asphalt shingle waste. In some embodiments, the second temperature of the asphalt shingle waste is within 11.5% of the first temperature of the asphalt shingle waste. In some embodiments, the second temperature of the asphalt shingle waste is within 11% of the first temperature of the asphalt shingle waste. In some embodiments, the second temperature of the asphalt shingle waste is within 10.5% of the first temperature of the asphalt shingle waste.

In some embodiments, the second temperature of the asphalt shingle waste is within 10% of the first temperature of the asphalt shingle waste. In some embodiments, the second temperature of the asphalt shingle waste is within 9.5% of the first temperature of the asphalt shingle waste. In some embodiments, the second temperature of the asphalt shingle waste is within 9% of the first temperature of the asphalt shingle waste. In some embodiments, the second temperature of the asphalt shingle waste is within 8.5% of the first temperature of the asphalt shingle waste. In some embodiments, the second temperature of the asphalt shingle waste is within 8% of the first temperature of the asphalt shingle waste. In some embodiments, the second temperature of the asphalt shingle waste is within 7.5% of the first temperature of the asphalt shingle waste. In some embodiments, the second temperature of the asphalt shingle waste is within 7% of the first temperature of the asphalt shingle waste. In some embodiments, the second temperature of the asphalt shingle waste is within 6.5% of the first temperature of the asphalt shingle waste. In some embodiments, the second temperature of the asphalt shingle waste is within 6% of the first temperature of the asphalt shingle waste. In some embodiments, the second temperature of the asphalt shingle waste is within 5.5% of the first temperature of the asphalt shingle waste. In some embodiments, the second temperature of the asphalt shingle waste is within 5% of the first temperature of the asphalt shingle waste. In some embodiments, the second temperature of the asphalt shingle waste is within 4.5% of the first temperature of the asphalt shingle waste. In some embodiments, the second temperature of the asphalt shingle waste is within 4% of the first temperature of the asphalt shingle waste. In some embodiments, the second temperature of the asphalt shingle waste is within 3.5% of the first temperature of the asphalt shingle waste. In some embodiments, the second temperature of the asphalt shingle waste is within 3% of the first temperature of the asphalt shingle waste. In some embodiments, the second temperature of the asphalt shingle waste is within 2.5% of the first temperature of the asphalt shingle waste. In some embodiments, the second temperature of the asphalt shingle waste is within 2% of the first temperature of the asphalt shingle waste. In some embodiments, the second temperature of the asphalt shingle waste is within 1.5% of the first temperature of the asphalt shingle waste. In some embodiments, the second temperature of the asphalt shingle waste is within 1% of the first temperature of the asphalt shingle waste. In some embodiments, the second temperature of the asphalt shingle waste is within 0.5% of the first temperature of the asphalt shingle waste. In some embodiments, the second temperature of the asphalt shingle waste is within 0.1% of the first temperature of the asphalt shingle waste.

In some embodiments, the second temperature of the asphalt shingle waste is within 0.1% to 20% of the first temperature of the asphalt shingle waste. In some embodiments, the second temperature of the asphalt shingle waste is within 0.1% to 19.5% of the first temperature of the asphalt shingle waste. In some embodiments, the second temperature of the asphalt shingle waste is within 0.1% to 19% of the first temperature of the asphalt shingle waste. In some embodiments, the second temperature of the asphalt shingle waste is within 0.1% to 18.5% of the first temperature of the asphalt shingle waste. In some embodiments, the second temperature of the asphalt shingle waste is within 0.1% to 18% of the first temperature of the asphalt shingle waste. In some embodiments, the second temperature of the asphalt shingle waste is within 0.1% to 17.5% of the first temperature of the asphalt shingle waste. In some embodiments, the second temperature of the asphalt shingle waste is within 0.1% to 17% of the first temperature of the asphalt shingle waste. In some embodiments, the second temperature of the asphalt shingle waste is within 0.1% to 16.5% of the first temperature of the asphalt shingle waste. In some embodiments, the second temperature of the asphalt shingle waste is within 0.1% to 16% of the first temperature of the asphalt shingle waste. In some embodiments, the second temperature of the asphalt shingle waste is within 0.1% to 15.5% of the first temperature of the asphalt shingle waste. In some embodiments, the second temperature of the asphalt shingle waste is within 0.1% to 15% of the first temperature of the asphalt shingle waste. In some embodiments, the second temperature of the asphalt shingle waste is within 0.1% to 14.5% of the first temperature of the asphalt shingle waste. In some embodiments, the second temperature of the asphalt shingle waste is within 0.1% to 14% of the first temperature of the asphalt shingle waste. In some embodiments, the second temperature of the asphalt shingle waste is within 0.1% to 13.5% of the first temperature of the asphalt shingle waste. In some embodiments, the second temperature of the asphalt shingle waste is within 0.1% to 13% of the first temperature of the asphalt shingle waste. In some embodiments, the second temperature of the asphalt shingle waste is within 0.1% to 12.5% of the first temperature of the asphalt shingle waste. In some embodiments, the second temperature of the asphalt shingle waste is within 0.1% to 12% of the first temperature of the asphalt shingle waste. In some embodiments, the second temperature of the asphalt shingle waste is within 0.1% to 11.5% of the first temperature of the asphalt shingle waste. In some embodiments, the second temperature of the asphalt shingle waste is within 0.1% to 11% of the first temperature of the asphalt shingle waste. In some embodiments, the second temperature of the asphalt shingle waste is within 0.1% to 10.5% of the first temperature of the asphalt shingle waste. In some embodiments, the second temperature of the asphalt shingle waste is within 0.1% to 10% of the first temperature of the asphalt shingle waste.

In some embodiments, the second temperature of the asphalt shingle waste is within 0.1% to 9.5% of the first temperature of the asphalt shingle waste. In some embodiments, the second temperature of the asphalt shingle waste is within 0.1% to 9% of the first temperature of the asphalt shingle waste. In some embodiments, the second temperature of the asphalt shingle waste is within 0.1% to 8.5% of the first temperature of the asphalt shingle waste. In some embodiments, the second temperature of the asphalt shingle waste is within 0.1% to 8% of the first temperature of the asphalt shingle waste. In some embodiments, the second temperature of the asphalt shingle waste is within 0.1% to 7.5% of the first temperature of the asphalt shingle waste. In some embodiments, the second temperature of the asphalt shingle waste is within 0.1% to 7% of the first temperature of the asphalt shingle waste. In some embodiments, the second temperature of the asphalt shingle waste is within 0.1% to 6.5% of the first temperature of the asphalt shingle waste. In some embodiments, the second temperature of the asphalt shingle waste is within 0.1% to 6% of the first temperature of the asphalt shingle waste. In some embodiments, the second temperature of the asphalt shingle waste is within 0.1% to 5.5% of the first temperature of the asphalt shingle waste. In some embodiments, the second temperature of the asphalt shingle waste is within 0.1% to 5% of the first temperature of the asphalt shingle waste. In some embodiments, the second temperature of the asphalt shingle waste is within 0.1% to 4.5% of the first temperature of the asphalt shingle waste. In some embodiments, the second temperature of the asphalt shingle waste is within 0.1% to 4% of the first temperature of the asphalt shingle waste. In some embodiments, the second temperature of the asphalt shingle waste is within 0.1% to 3.5% of the first temperature of the asphalt shingle waste. In some embodiments, the second temperature of the asphalt shingle waste is within 0.1% to 3% of the first temperature of the asphalt shingle waste. In some embodiments, the second temperature of the asphalt shingle waste is within 0.1% to 2.5% of the first temperature of the asphalt shingle waste. In some embodiments, the second temperature of the asphalt shingle waste is within 0.1% to 2% of the first temperature of the asphalt shingle waste. In some embodiments, the second temperature of the asphalt shingle waste is within 0.1% to 1.5% of the first temperature of the asphalt shingle waste. In some embodiments, the second temperature of the asphalt shingle waste is within 0.1% to 1% of the first temperature of the asphalt shingle waste. In some embodiments, the second temperature of the asphalt shingle waste is within 0.1% to 0.5% of the first temperature of the asphalt shingle waste.

In some embodiments, the asphalt shingle waste has a first average particle size at the inlet of the microwave dryer. In some embodiments, the asphalt shingle waste has a first average particle size at the inlet of the microwave dryer of at least 425 microns. In some embodiments, the asphalt shingle waste has a first average particle size at the inlet of the microwave dryer of at least 500 microns. In some embodiments, the asphalt shingle waste has a first average particle size at the inlet of the microwave dryer of at least 750 microns. In some embodiments, the asphalt shingle waste has a first average particle size at the inlet of the microwave dryer of at least 1000 microns. In some embodiments, the asphalt shingle waste has a first average particle size at the inlet of the microwave dryer of at least 1250 microns. In some embodiments, the asphalt shingle waste has a first average particle size at the inlet of the microwave dryer of at least 1500 microns. In some embodiments, the asphalt shingle waste has a first average particle size at the inlet of the microwave dryer of at least 1750 microns. In some embodiments, the asphalt shingle waste has a first average particle size at the inlet of the microwave dryer of at least 2000 microns. In some embodiments, the asphalt shingle waste has a first average particle size at the inlet of the microwave dryer of at least 2250 microns. In some embodiments, the asphalt shingle waste has a first average particle size at the inlet of the microwave dryer of at least 2500 microns. In some embodiments, the asphalt shingle waste has a first average particle size at the inlet of the microwave dryer of at least 2750 microns. In some embodiments, the asphalt shingle waste has a first average particle size at the inlet of the microwave dryer of at least 3000 microns.

In some embodiments, the asphalt shingle waste has a first average particle size at the inlet of the microwave dryer of at least 3250 microns. In some embodiments, the asphalt shingle waste has a first average particle size at the inlet of the microwave dryer of at least 3500 microns. In some embodiments, the asphalt shingle waste has a first average particle size at the inlet of the microwave dryer of at least 3750 microns. In some embodiments, the asphalt shingle waste has a first average particle size at the inlet of the microwave dryer of at least 4000 microns. In some embodiments, the asphalt shingle waste has a first average particle size at the inlet of the microwave dryer of at least 4250 microns. In some embodiments, the asphalt shingle waste has a first average particle size at the inlet of the microwave dryer of at least 4500 microns. In some embodiments, the asphalt shingle waste has a first average particle size at the inlet of the microwave dryer of at least 4750 microns. In some embodiments, the asphalt shingle waste has a first average particle size at the inlet of the microwave dryer of at least 5000 microns. In some embodiments, the asphalt shingle waste has a first average particle size at the inlet of the microwave dryer of at least 5250 microns. In some embodiments, the asphalt shingle waste has a first average particle size at the inlet of the microwave dryer of at least 5500 microns. In some embodiments, the asphalt shingle waste has a first average particle size at the inlet of the microwave dryer of at least 5750 microns. In some embodiments, the asphalt shingle waste has a first average particle size at the inlet of the microwave dryer of at least 6000 microns.

In some embodiments, the asphalt shingle waste has a first average particle size at the inlet of the microwave dryer of 425 microns to 6350 microns. In some embodiments, the asphalt shingle waste has a first average particle size at the inlet of the microwave dryer of 425 microns to 6250 microns. In some embodiments, the asphalt shingle waste has a first average particle size at the inlet of the microwave dryer of 425 microns to 6000 microns. In some embodiments, the asphalt shingle waste has a first average particle size at the inlet of the microwave dryer of 425 microns to 5750 microns. In some embodiments, the asphalt shingle waste has a first average particle size at the inlet of the microwave dryer of 425 microns to 5500 microns. In some embodiments, the asphalt shingle waste has a first average particle size at the inlet of the microwave dryer of 425 microns to 5250 microns. In some embodiments, the asphalt shingle waste has a first average particle size at the inlet of the microwave dryer of 425 microns to 5000 microns. In some embodiments, the asphalt shingle waste has a first average particle size at the inlet of the microwave dryer of 425 microns to 4750 microns. In some embodiments, the asphalt shingle waste has a first average particle size at the inlet of the microwave dryer of 425 microns to 4500 microns. In some embodiments, the asphalt shingle waste has a first average particle size at the inlet of the microwave dryer of 425 microns to 4250 microns. In some embodiments, the asphalt shingle waste has a first average particle size at the inlet of the microwave dryer of 425 microns to 4000 microns.

In some embodiments, the asphalt shingle waste has a first average particle size at the inlet of the microwave dryer of 425 microns to 3750 microns. In some embodiments, the asphalt shingle waste has a first average particle size at the inlet of the microwave dryer of 425 microns to 3500 microns. In some embodiments, the asphalt shingle waste has a first average particle size at the inlet of the microwave dryer of 425 microns to 3250 microns. In some embodiments, the asphalt shingle waste has a first average particle size at the inlet of the microwave dryer of 425 microns to 3000 microns. In some embodiments, the asphalt shingle waste has a first average particle size at the inlet of the microwave dryer of 425 microns to 2750 microns. In some embodiments, the asphalt shingle waste has a first average particle size at the inlet of the microwave dryer of 425 microns to 2500 microns. In some embodiments, the asphalt shingle waste has a first average particle size at the inlet of the microwave dryer of 425 microns to 2250 microns. In some embodiments, the asphalt shingle waste has a first average particle size at the inlet of the microwave dryer of 425 microns to 2000 microns. In some embodiments, the asphalt shingle waste has a first average particle size at the inlet of the microwave dryer of 425 microns to 1750 microns. In some embodiments, the asphalt shingle waste has a first average particle size at the inlet of the microwave dryer of 425 microns to 1500 microns. In some embodiments, the asphalt shingle waste has a first average particle size at the inlet of the microwave dryer of 425 microns to 1250 microns. In some embodiments, the asphalt shingle waste has a first average particle size at the inlet of the microwave dryer of 425 microns to 1000 microns.

In some embodiments, the asphalt shingle waste has a first average particle size at the inlet of the microwave dryer of 425 microns to 750 microns. In some embodiments, the asphalt shingle waste has a first average particle size at the inlet of the microwave dryer of 425 microns to 500 microns.

In some embodiments, the asphalt shingle waste has a first average particle size at the inlet of the microwave dryer of 425 microns to 6250 microns. In some embodiments, the asphalt shingle waste has a first average particle size at the inlet of the microwave dryer of 500 microns to 6350 microns. In some embodiments, the asphalt shingle waste has a first average particle size at the inlet of the microwave dryer of 750 microns to 6350 microns. In some embodiments, the asphalt shingle waste has a first average particle size at the inlet of the microwave dryer of 1000 microns to 6350 microns. In some embodiments, the asphalt shingle waste has a first average particle size at the inlet of the microwave dryer of 1250 microns to 6350 microns. In some embodiments, the asphalt shingle waste has a first average particle size at the inlet of the microwave dryer of 1500 microns to 6350 microns. In some embodiments, the asphalt shingle waste has a first average particle size at the inlet of the microwave dryer of 1750 microns to 6350 microns. In some embodiments, the asphalt shingle waste has a first average particle size at the inlet of the microwave dryer of 2000 microns to 6350 microns. In some embodiments, the asphalt shingle waste has a first average particle size at the inlet of the microwave dryer of 2250 microns to 6350 microns. In some embodiments, the asphalt shingle waste has a first average particle size at the inlet of the microwave dryer of 2500 microns to 6350 microns. In some embodiments, the asphalt shingle waste has a first average particle size at the inlet of the microwave dryer of 2750 microns to 6350 microns. In some embodiments, the asphalt shingle waste has a first average particle size at the inlet of the microwave dryer of 3000 microns to 6350 microns.

In some embodiments, the asphalt shingle waste has a first average particle size at the inlet of the microwave dryer of 3250 microns to 6350 microns. In some embodiments, the asphalt shingle waste has a first average particle size at the inlet of the microwave dryer of 3500 microns to 6350 microns. In some embodiments, the asphalt shingle waste has a first average particle size at the inlet of the microwave dryer of 3750 microns to 6350 microns. In some embodiments, the asphalt shingle waste has a first average particle size at the inlet of the microwave dryer of 4000 microns to 6350 microns. In some embodiments, the asphalt shingle waste has a first average particle size at the inlet of the microwave dryer of 4250 microns to 6350 microns. In some embodiments, the asphalt shingle waste has a first average particle size at the inlet of the microwave dryer of 4500 microns to 6350 microns. In some embodiments, the asphalt shingle waste has a first average particle size at the inlet of the microwave dryer of 4750 microns to 6350 microns. In some embodiments, the asphalt shingle waste has a first average particle size at the inlet of the microwave dryer of 5000 microns to 6350 microns. In some embodiments, the asphalt shingle waste has a first average particle size at the inlet of the microwave dryer of 5250 microns to 6350 microns. In some embodiments, the asphalt shingle waste has a first average particle size at the inlet of the microwave dryer of 5500 microns to 6350 microns. In some embodiments, the asphalt shingle waste has a first average particle size at the inlet of the microwave dryer of 5750 microns to 6350 microns. In some embodiments, the asphalt shingle waste has a first average particle size at the inlet of the microwave dryer of 6000 microns to 6350 microns.

In some embodiments, the asphalt shingle waste has a second average particle size at the outlet of the microwave dryer. In some embodiments, the asphalt shingle waste has a second average particle size at the outlet of the microwave dryer of at least 425 microns. In some embodiments, the asphalt shingle waste has a second average particle size at the outlet of the microwave dryer of at least 500 microns. In some embodiments, the asphalt shingle waste has a second average particle size at the outlet of the microwave dryer of at least 750 microns. In some embodiments, the asphalt shingle waste has a second average particle size at the outlet of the microwave dryer of at least 1000 microns. In some embodiments, the asphalt shingle waste has a second average particle size at the outlet of the microwave dryer of at least 1250 microns. In some embodiments, the asphalt shingle waste has a second average particle size at the outlet of the microwave dryer of at least 1500 microns. In some embodiments, the asphalt shingle waste has a second average particle size at the outlet of the microwave dryer of at least 1750 microns. In some embodiments, the asphalt shingle waste has a second average particle size at the outlet of the microwave dryer of at least 2000 microns. In some embodiments, the asphalt shingle waste has a second average particle size at the outlet of the microwave dryer of at least 2250 microns. In some embodiments, the asphalt shingle waste has a second average particle size at the outlet of the microwave dryer of at least 2500 microns. In some embodiments, the asphalt shingle waste has a second average particle size at the outlet of the microwave dryer of at least 2750 microns. In some embodiments, the asphalt shingle waste has a second average particle size at the outlet of the microwave dryer of at least 3000 microns.

In some embodiments, the asphalt shingle waste has a second average particle size at the outlet of the microwave dryer of at least 3250 microns. In some embodiments, the asphalt shingle waste has a second average particle size at the outlet of the microwave dryer of at least 3500 microns. In some embodiments, the asphalt shingle waste has a second average particle size at the outlet of the microwave dryer of at least 3750 microns. In some embodiments, the asphalt shingle waste has a second average particle size at the outlet of the microwave dryer of at least 4000 microns. In some embodiments, the asphalt shingle waste has a second average particle size at the outlet of the microwave dryer of at least 4250 microns. In some embodiments, the asphalt shingle waste has a second average particle size at the outlet of the microwave dryer of at least 4500 microns. In some embodiments, the asphalt shingle waste has a second average particle size at the outlet of the microwave dryer of at least 4750 microns. In some embodiments, the asphalt shingle waste has a second average particle size at the outlet of the microwave dryer of at least 5000 microns. In some embodiments, the asphalt shingle waste has a second average particle size at the outlet of the microwave dryer of at least 5250 microns. In some embodiments, the asphalt shingle waste has a second average particle size at the outlet of the microwave dryer of at least 5500 microns. In some embodiments, the asphalt shingle waste has a second average particle size at the outlet of the microwave dryer of at least 5750 microns. In some embodiments, the asphalt shingle waste has a second average particle size at the outlet of the microwave dryer of at least 6000 microns.

In some embodiments, the asphalt shingle waste has a second average particle size at the outlet of the microwave dryer of 425 microns to 6350 microns. In some embodiments, the asphalt shingle waste has a second average particle size at the outlet of the microwave dryer of 425 microns to 6250 microns. In some embodiments, the asphalt shingle waste has a second average particle size at the outlet of the microwave dryer of 425 microns to 6000 microns. In some embodiments, the asphalt shingle waste has a second average particle size at the outlet of the microwave dryer of 425 microns to 5750 microns. In some embodiments, the asphalt shingle waste has a second average particle size at the outlet of the microwave dryer of 425 microns to 5500 microns. In some embodiments, the asphalt shingle waste has a second average particle size at the outlet of the microwave dryer of 425 microns to 5250 microns. In some embodiments, the asphalt shingle waste has a second average particle size at the outlet of the microwave dryer of 425 microns to 5000 microns. In some embodiments, the asphalt shingle waste has a second average particle size at the outlet of the microwave dryer of 425 microns to 4750 microns. In some embodiments, the asphalt shingle waste has a second average particle size at the outlet of the microwave dryer of 425 microns to 4500 microns. In some embodiments, the asphalt shingle waste has a second average particle size at the outlet of the microwave dryer of 425 microns to 4250 microns. In some embodiments, the asphalt shingle waste has a second average particle size at the outlet of the microwave dryer of 425 microns to 4000 microns.

In some embodiments, the asphalt shingle waste has a second average particle size at the outlet of the microwave dryer of 425 microns to 3750 microns. In some embodiments, the asphalt shingle waste has a second average particle size at the outlet of the microwave dryer of 425 microns to 3500 microns. In some embodiments, the asphalt shingle waste has a second average particle size at the outlet of the microwave dryer of 425 microns to 3250 microns. In some embodiments, the asphalt shingle waste has a second average particle size at the outlet of the microwave dryer of 425 microns to 3000 microns. In some embodiments, the asphalt shingle waste has a second average particle size at the outlet of the microwave dryer of 425 microns to 2750 microns. In some embodiments, the asphalt shingle waste has a second average particle size at the outlet of the microwave dryer of 425 microns to 2500 microns. In some embodiments, the asphalt shingle waste has a second average particle size at the outlet of the microwave dryer of 425 microns to 2250 microns. In some embodiments, the asphalt shingle waste has a second average particle size at the outlet of the microwave dryer of 425 microns to 2000 microns. In some embodiments, the asphalt shingle waste has a second average particle size at the outlet of the microwave dryer of 425 microns to 1750 microns. In some embodiments, the asphalt shingle waste has a second average particle size at the outlet of the microwave dryer of 425 microns to 1500 microns. In some embodiments, the asphalt shingle waste has a second average particle size at the outlet of the microwave dryer of 425 microns to 1250 microns. In some embodiments, the asphalt shingle waste has a second average particle size at the outlet of the microwave dryer of 425 microns to 1000 microns. In some embodiments, the asphalt shingle waste has a second average particle size at the outlet of the microwave dryer of 425 microns to 750 microns. In some embodiments, the asphalt shingle waste has a second average particle size at the outlet of the microwave dryer of 425 microns to 500 microns.

In some embodiments, the asphalt shingle waste has a second average particle size at the outlet of the microwave dryer of 425 microns to 6250 microns. In some embodiments, the asphalt shingle waste has a second average particle size at the outlet of the microwave dryer of 500 microns to 6350 microns. In some embodiments, the asphalt shingle waste has a second average particle size at the outlet of the microwave dryer of 750 microns to 6350 microns. In some embodiments, the asphalt shingle waste has a second average particle size at the outlet of the microwave dryer of 1000 microns to 6350 microns. In some embodiments, the asphalt shingle waste has a second average particle size at the outlet of the microwave dryer of 1250 microns to 6350 microns. In some embodiments, the asphalt shingle waste has a second average particle size at the outlet of the microwave dryer of 1500 microns to 6350 microns. In some embodiments, the asphalt shingle waste has a second average particle size at the outlet of the microwave dryer of 1750 microns to 6350 microns. In some embodiments, the asphalt shingle waste has a second average particle size at the outlet of the microwave dryer of 2000 microns to 6350 microns. In some embodiments, the asphalt shingle waste has a second average particle size at the outlet of the microwave dryer of 2250 microns to 6350 microns. In some embodiments, the asphalt shingle waste has a second average particle size at the outlet of the microwave dryer of 2500 microns to 6350 microns. In some embodiments, the asphalt shingle waste has a second average particle size at the outlet of the microwave dryer of 2750 microns to 6350 microns. In some embodiments, the asphalt shingle waste has a second average particle size at the outlet of the microwave dryer of 3000 microns to 6350 microns.

In some embodiments, the asphalt shingle waste has a second average particle size at the outlet of the microwave dryer of 3250 microns to 6350 microns. In some embodiments, the asphalt shingle waste has a second average particle size at the outlet of the microwave dryer of 3500 microns to 6350 microns. In some embodiments, the asphalt shingle waste has a second average particle size at the outlet of the microwave dryer of 3750 microns to 6350 microns. In some embodiments, the asphalt shingle waste has a second average particle size at the outlet of the microwave dryer of 4000 microns to 6350 microns. In some embodiments, the asphalt shingle waste has a second average particle size at the outlet of the microwave dryer of 4250 microns to 6350 microns. In some embodiments, the asphalt shingle waste has a second average particle size at the outlet of the microwave dryer of 4500 microns to 6350 microns. In some embodiments, the asphalt shingle waste has a second average particle size at the outlet of the microwave dryer of 4750 microns to 6350 microns. In some embodiments, the asphalt shingle waste has a second average particle size at the outlet of the microwave dryer of 5000 microns to 6350 microns. In some embodiments, the asphalt shingle waste has a second average particle size at the outlet of the microwave dryer of 5250 microns to 6350 microns. In some embodiments, the asphalt shingle waste has a second average particle size at the outlet of the microwave dryer of 5500 microns to 6350 microns. In some embodiments, the asphalt shingle waste has a second average particle size at the outlet of the microwave dryer of 5750 microns to 6350 microns. In some embodiments, the asphalt shingle waste has a second average particle size at the outlet of the microwave dryer of 6000 microns to 6350 microns.

In some embodiments, the asphalt shingle waste has an average particle size of 0.1 inches to 5 inches at an inlet of the microwave dryer. In some embodiments, the asphalt shingle waste has an average particle size of 0.1 inches to 4.5 inches at an inlet of the microwave dryer. In some embodiments, the asphalt shingle waste has an average particle size of 0.1 inches to 4 inches at an inlet of the microwave dryer. In some embodiments, the asphalt shingle waste has an average particle size of 0.1 inches to 3.5 inches at an inlet of the microwave dryer. In some embodiments, the asphalt shingle waste has an average particle size of 0.1 inches to 3 inches at an inlet of the microwave dryer. In some embodiments, the asphalt shingle waste has an average particle size of 0.1 inches to 2.5 inches at an inlet of the microwave dryer. In some embodiments, the asphalt shingle waste has an average particle size of 0.1 inches to 2 inches at an inlet of the microwave dryer. In some embodiments, the asphalt shingle waste has an average particle size of 0.1 inches to 1.5 inches at an inlet of the microwave dryer. In some embodiments, the asphalt shingle waste has an average particle size of 0.1 inches to 1 inches at an inlet of the microwave dryer. In some embodiments, the asphalt shingle waste has an average particle size of 0.1 inches to 0.5 inches at an inlet of the microwave dryer. In some embodiments, the asphalt shingle waste has an average particle size of 0.5 inches to 5 inches at an inlet of the microwave dryer. In some embodiments, the asphalt shingle waste has an average particle size of 1 inches to 5 inches at an inlet of the microwave dryer. In some embodiments, the asphalt shingle waste has an average particle size of 1.5 inches to 5 inches at an inlet of the microwave dryer. In some embodiments, the asphalt shingle waste has an average particle size of 2 inches to 5 inches at an inlet of the microwave dryer. In some embodiments, the asphalt shingle waste has an average particle size of 2.5 inches to 5 inches at an inlet of the microwave dryer. In some embodiments, the asphalt shingle waste has an average particle size of 3 inches to 5 inches at an inlet of the microwave dryer. In some embodiments, the asphalt shingle waste has an average particle size of 3.5 inches to 5 inches at an inlet of the microwave dryer. In some embodiments, the asphalt shingle waste has an average particle size of 4 inches to 5 inches at an inlet of the microwave dryer. In some embodiments, the asphalt shingle waste has an average particle size of 4.5 inches to 5 inches at an inlet of the microwave dryer.

In some embodiments, the asphalt shingle waste has an average particle size of 0.1 inches to 5 inches at an outlet of the microwave dryer. In some embodiments, the asphalt shingle waste has an average particle size of 0.1 inches to 4.5 inches at an outlet of the microwave dryer. In some embodiments, the asphalt shingle waste has an average particle size of 0.1 inches to 4 inches at an outlet of the microwave dryer. In some embodiments, the asphalt shingle waste has an average particle size of 0.1 inches to 3.5 inches at an outlet of the microwave dryer. In some embodiments, the asphalt shingle waste has an average particle size of 0.1 inches to 3 inches at an outlet of the microwave dryer. In some embodiments, the asphalt shingle waste has an average particle size of 0.1 inches to 2.5 inches at an outlet of the microwave dryer. In some embodiments, the asphalt shingle waste has an average particle size of 0.1 inches to 2 inches at an outlet of the microwave dryer. In some embodiments, the asphalt shingle waste has an average particle size of 0.1 inches to 1.5 inches at an outlet of the microwave dryer. In some embodiments, the asphalt shingle waste has an average particle size of 0.1 inches to 1 inches at an outlet of the microwave dryer. In some embodiments, the asphalt shingle waste has an average particle size of 0.1 inches to 0.5 inches at an outlet of the microwave dryer. In some embodiments, the asphalt shingle waste has an average particle size of 0.5 inches to 5 inches at an outlet of the microwave dryer. In some embodiments, the asphalt shingle waste has an average particle size of 1 inches to 5 inches at an outlet of the microwave dryer. In some embodiments, the asphalt shingle waste has an average particle size of 1.5 inches to 5 inches at an outlet of the microwave dryer. In some embodiments, the asphalt shingle waste has an average particle size of 2 inches to 5 inches at an outlet of the microwave dryer. In some embodiments, the asphalt shingle waste has an average particle size of 2.5 inches to 5 inches at an outlet of the microwave dryer. In some embodiments, the asphalt shingle waste has an average particle size of 3 inches to 5 inches at an outlet of the microwave dryer. In some embodiments, the asphalt shingle waste has an average particle size of 3.5 inches to 5 inches at an outlet of the microwave dryer. In some embodiments, the asphalt shingle waste has an average particle size of 4 inches to 5 inches at an outlet of the microwave dryer. In some embodiments, the asphalt shingle waste has an average particle size of 4.5 inches to 5 inches at an outlet of the microwave dryer.

In some embodiments, the second average particle size of the asphalt shingle waste is within 20% of the first average particle size of the asphalt shingle waste. In some embodiments, the second average particle size of the asphalt shingle waste is within 19.5% of the first average particle size of the asphalt shingle waste. In some embodiments, the second average particle size of the asphalt shingle waste is within 19% of the first average particle size of the asphalt shingle waste. In some embodiments, the second average particle size of the asphalt shingle waste is within 18.5% of the first average particle size of the asphalt shingle waste. In some embodiments, the second average particle size of the asphalt shingle waste is within 18% of the first average particle size of the asphalt shingle waste. In some embodiments, the second average particle size of the asphalt shingle waste is within 17.5% of the first average particle size of the asphalt shingle waste. In some embodiments, the second average particle size of the asphalt shingle waste is within 17% of the first average particle size of the asphalt shingle waste. In some embodiments, the second average particle size of the asphalt shingle waste is within 16.5% of the first average particle size of the asphalt shingle waste. In some embodiments, the second average particle size of the asphalt shingle waste is within 16% of the first average particle size of the asphalt shingle waste. In some embodiments, the second average particle size of the asphalt shingle waste is within 15.5% of the first average particle size of the asphalt shingle waste. In some embodiments, the second average particle size of the asphalt shingle waste is within 15% of the first average particle size of the asphalt shingle waste. In some embodiments, the second average particle size of the asphalt shingle waste is within 14.5% of the first average particle size of the asphalt shingle waste. In some embodiments, the second average particle size of the asphalt shingle waste is within 14% of the first average particle size of the asphalt shingle waste. In some embodiments, the second average particle size of the asphalt shingle waste is within 13.5% of the first average particle size of the asphalt shingle waste. In some embodiments, the second average particle size of the asphalt shingle waste is within 13% of the first average particle size of the asphalt shingle waste. In some embodiments, the second average particle size of the asphalt shingle waste is within 12.5% of the first average particle size of the asphalt shingle waste. In some embodiments, the second average particle size of the asphalt shingle waste is within 12% of the first average particle size of the asphalt shingle waste. In some embodiments, the second average particle size of the asphalt shingle waste is within 11.5% of the first average particle size of the asphalt shingle waste. In some embodiments, the second average particle size of the asphalt shingle waste is within 11% of the first average particle size of the asphalt shingle waste. In some embodiments, the second average particle size of the asphalt shingle waste is within 10.5% of the first average particle size of the asphalt shingle waste.

In some embodiments, the second average particle size of the asphalt shingle waste is within 10% of the first average particle size of the asphalt shingle waste. In some embodiments, the second average particle size of the asphalt shingle waste is within 9.5% of the first average particle size of the asphalt shingle waste. In some embodiments, the second average particle size of the asphalt shingle waste is within 9% of the first average particle size of the asphalt shingle waste. In some embodiments, the second average particle size of the asphalt shingle waste is within 8.5% of the first average particle size of the asphalt shingle waste. In some embodiments, the second average particle size of the asphalt shingle waste is within 8% of the first average particle size of the asphalt shingle waste. In some embodiments, the second average particle size of the asphalt shingle waste is within 7.5% of the first average particle size of the asphalt shingle waste. In some embodiments, the second average particle size of the asphalt shingle waste is within 7% of the first average particle size of the asphalt shingle waste. In some embodiments, the second average particle size of the asphalt shingle waste is within 6.5% of the first average particle size of the asphalt shingle waste. In some embodiments, the second average particle size of the asphalt shingle waste is within 6% of the first average particle size of the asphalt shingle waste. In some embodiments, the second average particle size of the asphalt shingle waste is within 5.5% of the first average particle size of the asphalt shingle waste. In some embodiments, the second average particle size of the asphalt shingle waste is within 5% of the first average particle size of the asphalt shingle waste. In some embodiments, the second average particle size of the asphalt shingle waste is within 4.5% of the first average particle size of the asphalt shingle waste. In some embodiments, the second average particle size of the asphalt shingle waste is within 4% of the first average particle size of the asphalt shingle waste. In some embodiments, the second average particle size of the asphalt shingle waste is within 3.5% of the first average particle size of the asphalt shingle waste. In some embodiments, the second average particle size of the asphalt shingle waste is within 3% of the first average particle size of the asphalt shingle waste. In some embodiments, the second average particle size of the asphalt shingle waste is within 2.5% of the first average particle size of the asphalt shingle waste. In some embodiments, the second average particle size of the asphalt shingle waste is within 2% of the first average particle size of the asphalt shingle waste. In some embodiments, the second average particle size of the asphalt shingle waste is within 1.5% of the first average particle size of the asphalt shingle waste. In some embodiments, the second average particle size of the asphalt shingle waste is within 1% of the first average particle size of the asphalt shingle waste. In some embodiments, the second average particle size of the asphalt shingle waste is within 0.5% of the first average particle size of the asphalt shingle waste. In some embodiments, the second average particle size of the asphalt shingle waste is within 0.1% of the first average particle size of the asphalt shingle waste.

In some embodiments, the second average particle size of the asphalt shingle waste is within 0.1% to 20% of the first average particle size of the asphalt shingle waste. In some embodiments, the second average particle size of the asphalt shingle waste is within 0.1% to 19.5% of the first average particle size of the asphalt shingle waste. In some embodiments, the second average particle size of the asphalt shingle waste is within 0.1% to 19% of the first average particle size of the asphalt shingle waste. In some embodiments, the second average particle size of the asphalt shingle waste is within 0.1% to 18.5% of the first average particle size of the asphalt shingle waste. In some embodiments, the second average particle size of the asphalt shingle waste is within 0.1% to 18% of the first average particle size of the asphalt shingle waste. In some embodiments, the second average particle size of the asphalt shingle waste is within 0.1% to 17.5% of the first average particle size of the asphalt shingle waste. In some embodiments, the second average particle size of the asphalt shingle waste is within 0.1% to 17% of the first average particle size of the asphalt shingle waste. In some embodiments, the second average particle size of the asphalt shingle waste is within 0.1% to 16.5% of the first average particle size of the asphalt shingle waste. In some embodiments, the second average particle size of the asphalt shingle waste is within 0.1% to 16% of the first average particle size of the asphalt shingle waste. In some embodiments, the second average particle size of the asphalt shingle waste is within 0.1% to 15.5% of the first average particle size of the asphalt shingle waste. In some embodiments, the second average particle size of the asphalt shingle waste is within 0.1% to 15% of the first average particle size of the asphalt shingle waste. In some embodiments, the second average particle size of the asphalt shingle waste is within 0.1% to 14.5% of the first average particle size of the asphalt shingle waste. In some embodiments, the second average particle size of the asphalt shingle waste is within 0.1% to 14% of the first average particle size of the asphalt shingle waste. In some embodiments, the second average particle size of the asphalt shingle waste is within 0.1% to 13.5% of the first average particle size of the asphalt shingle waste. In some embodiments, the second average particle size of the asphalt shingle waste is within 0.1% to 13% of the first average particle size of the asphalt shingle waste. In some embodiments, the second average particle size of the asphalt shingle waste is within 0.1% to 12.5% of the first average particle size of the asphalt shingle waste. In some embodiments, the second average particle size of the asphalt shingle waste is within 0.1% to 12% of the first average particle size of the asphalt shingle waste. In some embodiments, the second average particle size of the asphalt shingle waste is within 0.1% to 11.5% of the first average particle size of the asphalt shingle waste. In some embodiments, the second average particle size of the asphalt shingle waste is within 0.1% to 11% of the first average particle size of the asphalt shingle waste. In some embodiments, the second average particle size of the asphalt shingle waste is within 0.1% to 10.5% of the first average particle size of the asphalt shingle waste. In some embodiments, the second average particle size of the asphalt shingle waste is within 0.1% to 10% of the first average particle size of the asphalt shingle waste.

In some embodiments, the second average particle size of the asphalt shingle waste is within 0.1% to 9.5% of the first average particle size of the asphalt shingle waste. In some embodiments, the second average particle size of the asphalt shingle waste is within 0.1% to 9% of the first average particle size of the asphalt shingle waste. In some embodiments, the second average particle size of the asphalt shingle waste is within 0.1% to 8.5% of the first average particle size of the asphalt shingle waste. In some embodiments, the second average particle size of the asphalt shingle waste is within 0.1% to 8% of the first average particle size of the asphalt shingle waste. In some embodiments, the second average particle size of the asphalt shingle waste is within 0.1% to 7.5% of the first average particle size of the asphalt shingle waste. In some embodiments, the second average particle size of the asphalt shingle waste is within 0.1% to 7% of the first average particle size of the asphalt shingle waste. In some embodiments, the second average particle size of the asphalt shingle waste is within 0.1% to 6.5% of the first average particle size of the asphalt shingle waste. In some embodiments, the second average particle size of the asphalt shingle waste is within 0.1% to 6% of the first average particle size of the asphalt shingle waste. In some embodiments, the second average particle size of the asphalt shingle waste is within 0.1% to 5.5% of the first average particle size of the asphalt shingle waste. In some embodiments, the second average particle size of the asphalt shingle waste is within 0.1% to 5% of the first average particle size of the asphalt shingle waste. In some embodiments, the second average particle size of the asphalt shingle waste is within 0.1% to 4.5% of the first average particle size of the asphalt shingle waste. In some embodiments, the second average particle size of the asphalt shingle waste is within 0.1% to 4% of the first average particle size of the asphalt shingle waste. In some embodiments, the second average particle size of the asphalt shingle waste is within 0.1% to 3.5% of the first average particle size of the asphalt shingle waste. In some embodiments, the second average particle size of the asphalt shingle waste is within 0.1% to 3% of the first average particle size of the asphalt shingle waste. In some embodiments, the second average particle size of the asphalt shingle waste is within 0.1% to 2.5% of the first average particle size of the asphalt shingle waste. In some embodiments, the second average particle size of the asphalt shingle waste is within 0.1% to 2% of the first average particle size of the asphalt shingle waste. In some embodiments, the second average particle size of the asphalt shingle waste is within 0.1% to 1.5% of the first average particle size of the asphalt shingle waste. In some embodiments, the second average particle size of the asphalt shingle waste is within 0.1% to 1% of the first average particle size of the asphalt shingle waste. In some embodiments, the second average particle size of the asphalt shingle waste is within 0.1% to 0.5% of the first average particle size of the asphalt shingle waste.

In some embodiments, whereas conventional systems and methods require tumbling substances in order to reduce the moisture content of the substance, the asphalt shingle waste can be conveyed on, for example, a conveyor belt, through the microwave dryer, in a static or motionless state. That is, while the asphalt shingle waste is being passed through the microwave dryer, the asphalt shingle waste is in a static state or a motionless state relative to other asphalt shingle waste similarly being passed through the microwave dryer. In some embodiments, passing the asphalt shingle waste through the microwave dryer comprises passing the asphalt shingle waste through the microwave dryer without tumbling the asphalt shingle waste. In some embodiments, passing the asphalt shingle waste through the microwave dryer comprises passing the asphalt shingle waste through the microwave dryer without agitating the asphalt shingle waste. In some embodiments, passing the asphalt shingle waste through the microwave dryer comprises passing the asphalt shingle waste through the microwave dryer without mixing the asphalt shingle waste. In some embodiments, passing the asphalt shingle waste through the microwave dryer comprises passing the asphalt shingle waste through the microwave dryer without disturbing the asphalt shingle waste. In some embodiments, passing the asphalt shingle waste through the microwave dryer comprises passing the asphalt shingle waste through the microwave dryer while the asphalt shingle waste is motionless. In some embodiments, passing the asphalt shingle waste through the microwave dryer comprises passing the asphalt shingle waste through the microwave dryer while the asphalt shingle waste is static.

At step 106, in some embodiments, the system and method 100 for processing asphalt shingle waste comprises processing the asphalt shingle waste.

It will be appreciated that any one or more of the processing steps may be performed before exposing the asphalt shingle waste to microwaves, after exposing the asphalt shingle waste to microwaves, or before exposing the asphalt shingle waste to microwaves and after exposing the asphalt shingle waste to microwaves, without departing from the scope of this disclosure. In some embodiments, for example, one or more of the processing steps is performed downstream of the exposing step 104. In some embodiments, the one or more of the processing steps is performed upstream of the exposing step 104. In some embodiments, at least one processing step is performed upstream of the exposing step 104 and at least one processing step is performed downstream of the exposing step 104. In addition, the asphalt shingle waste may be processed according to any one or more of the processes disclosed in U.S. Pat. Nos. 10,683,620; 10,858,790; and 10,697,133, each of which is hereby incorporated by reference in its entirety.

In some embodiments, processing the asphalt shingle waste comprises processing the asphalt shingle waste into an asphalt shingle waste powder. In some embodiments, processing the asphalt shingle waste comprises processing the asphalt shingle waste into a plurality of briquettes. In some embodiments, processing the asphalt shingle waste comprises processing the asphalt shingle waste into an asphalt-containing powder. In some embodiments, processing the asphalt shingle waste comprises processing the asphalt shingle waste into an asphalt shingle waste filled coating. In some embodiments, processing the asphalt shingle waste comprises processing the asphalt shingle waste into an asphalt shingle waste powder filled coating. In some embodiments, processing the asphalt shingle waste comprises processing the asphalt shingle waste into an asphalt-containing powder filled coating.

In some embodiments, processing the asphalt shingle waste comprises forming the asphalt shingle waste into an asphalt shingle waste powder. In some embodiments, processing the asphalt shingle waste comprises forming the asphalt shingle waste into a plurality of briquettes. In some embodiments, processing the asphalt shingle waste comprises forming the asphalt shingle waste into an asphalt-containing powder. In some embodiments, processing the asphalt shingle waste comprises forming the asphalt shingle waste into an asphalt shingle waste filled coating. In some embodiments, processing the asphalt shingle waste comprises forming the asphalt shingle waste into an asphalt shingle waste powder filled coating. In some embodiments, processing the asphalt shingle waste comprises forming the asphalt shingle waste into an asphalt-containing powder filled coating.

In some embodiments, processing the asphalt shingle waste comprises a step of grinding the ASW to form ground ASW. In some embodiments, the ground ASW may be stored for a period of time. In some such embodiments, the ground ASW may agglomerate. In some such embodiments, the ASW may be deagglomerated using a lump breaker.

In some embodiments, processing the asphalt shingle waste comprises screening the ground ASW with a rotary screener. In some embodiments, the rotary screener is a trommel screener. In some embodiments, processing the asphalt shingle waste does not comprise any steps of screening with a vibratory screener. In some embodiments, processing the asphalt shingle waste does not comprise any steps of screening with a screening device that comprises at least one ball tray. In some embodiments, processing the asphalt shingle waste does not comprise any steps of screening with a sizing shaker.

In some embodiments, the screening of the ground ASW with the rotary screener results in a first set of ASW particles and a second set of ASW particles.

In some embodiments, the first set of ASW particles has an average particle size of 425 microns to 6350 microns. In some embodiments, the first set of ASW particles has an average particle size of 500 microns to 6350 microns. In some embodiments, the first set of ASW particles has an average particle size of 750 microns to 6350 microns. In some embodiments, the first set of ASW particles has an average particle size of 1000 microns to 6350 microns. In some embodiments, the first set of ASW particles has an average particle size of 2000 microns to 6350 microns. In some embodiments, the first set of ASW particles has an average particle size of 5000 microns to 6350 microns. In some embodiments, the first set of ASW particles has an average particle size of 6000 microns to 6350 microns.

In some embodiments, the first set of ASW particles has an average particle size of 425 microns to 6000 microns. In some embodiments, the first set of ASW particles has an average particle size of 425 microns to 5000 microns. In some embodiments, the first set of ASW particles has an average particle size of 425 microns to 2000 microns. In some embodiments, the first set of ASW particles has an average particle size of 425 microns to 1000 microns. In some embodiments, the first set of ASW particles has an average particle size of 425 microns to 750 microns. In some embodiments, the first set of ASW particles has an average particle size of 425 microns to 500 microns.

In some embodiments, the first set of ASW particles has an average particle size of 500 microns to 6000 microns. In some embodiments, the first set of ASW particles has an average particle size of 750 microns to 5000 microns. In some embodiments, the first set of ASW particles has an average particle size of 1000 microns to 2000 microns.

In some embodiments, the second set of ASW particles has an average particle size of 2 microns to 425 microns. In some embodiments, the second set of ASW particles has an average particle size of 5 microns to 425 microns. In some embodiments, the second set of ASW particles has an average particle size of 10 microns to 425 microns. In some embodiments, the second set of ASW particles has an average particle size of 25 microns to 425 microns. In some embodiments, the second set of ASW particles has an average particle size of 50 microns to 425 microns. In some embodiments, the second set of ASW particles has an average particle size of 75 microns to 425 microns. In some embodiments, the second set of ASW particles has an average particle size of 100 microns to 425 microns. In some embodiments, the second set of ASW particles has an average particle size of 200 microns to 425 microns. In some embodiments, the second set of ASW particles has an average particle size of 300 microns to 425 microns. In some embodiments, the second set of ASW particles has an average particle size of 400 microns to 425 microns.

In some embodiments, the second set of ASW particles has an average particle size of 2 microns to 400 microns. In some embodiments, the second set of ASW particles has an average particle size of 2 microns to 300 microns. In some embodiments, the second set of ASW particles has an average particle size of 2 microns to 200 microns. In some embodiments, the second set of ASW particles has an average particle size of 2 microns to 100 microns. In some embodiments, the second set of ASW particles has an average particle size of 2 microns to 75 microns. In some embodiments, the second set of ASW particles has an average particle size of 2 microns to 50 microns. In some embodiments, the second set of ASW particles has an average particle size of 2 microns to 25 microns. In some embodiments, the second set of ASW particles has an average particle size of 2 microns to 10 microns. In some embodiments, the second set of ASW particles has an average particle size of 2 microns to 5 microns.

In some embodiments, the second set of ASW particles has an average particle size of 5 microns to 400 microns. In some embodiments, the second set of ASW particles has an average particle size of 10 microns to 300 microns. In some embodiments, the second set of ASW particles has an average particle size of 25 microns to 200 microns. In some embodiments, the second set of ASW particles has an average particle size of 75 microns to 100 microns.

In some embodiments, the first set of ASW particles has an average particle size that is greater than the average particle size of the second set of ASW particles.

In some embodiments, processing the asphalt shingle waste comprises removing at least some of the granules from at least one of the first set of ASW particles, the second set of ASW particles, or a combination thereof with a at least one granule liberator such as, but not limited to at least one rotary impact separator. In some embodiments, processing the asphalt shingle waste comprises removing all the granules from at least one of the first set of ASW particles, the second set of ASW particles, or a combination thereof with an MS.

In some embodiments, processing the asphalt shingle waste comprises removing 20% to 95% of the granules from at least one of the first set of ASW particles, the second set of ASW particles, or a combination thereof with at least one granule liberator. In some embodiments, processing the asphalt shingle waste comprises removing 40% to 95% of the granules from at least one of the first set of ASW particles, the second set of ASW particles, or a combination thereof with at least one granule liberator. In some embodiments, processing the asphalt shingle waste comprises removing 60% to 95% of the granules from at least one of the first set of ASW particles, the second set of ASW particles, or a combination thereof with at least one granule liberator. In some embodiments, processing the asphalt shingle waste comprises removing 80% to 95% of the granules from at least one of the first set of ASW particles, the second set of ASW particles, or a combination thereof with at least one granule liberator. In some embodiments, processing the asphalt shingle waste comprises removing 90% to 95% of the granules from at least one of the first set of ASW particles, the second set of ASW particles, or a combination thereof with at least one granule liberator.

In some embodiments, processing the asphalt shingle waste comprises removing 20% to 90% of the granules from at least one of the first set of ASW particles, the second set of ASW particles, or a combination thereof with at least one granule liberator. In some embodiments, processing the asphalt shingle waste comprises removing 20% to 80% of the granules from at least one of the first set of ASW particles, the second set of ASW particles, or a combination thereof with at least one granule liberator. In some embodiments, processing the asphalt shingle waste comprises removing 20% to 60% of the granules from at least one of the first set of ASW particles, the second set of ASW particles, or a combination thereof with at least one granule liberator. In some embodiments, processing the asphalt shingle waste comprises removing 20% to 40% of the granules from at least one of the first set of ASW particles, the second set of ASW particles, or a combination thereof with at least one granule liberator.

In some embodiments, processing the asphalt shingle waste comprises removing 40% to 90% of the granules from at least one of the first set of ASW particles, the second set of ASW particles, or a combination thereof with at least one granule liberator. In some embodiments, processing the asphalt shingle waste comprises removing 60% to 80% of the granules from at least one of the first set of ASW particles, the second set of ASW particles, or a combination thereof with at least one granule liberator.

In some embodiments, processing the asphalt shingle waste comprises removing at least some of the granules from at least one of the first set of ASW particles, the second set of ASW particles, or a combination thereof with two or more granule liberators. In some embodiments, the two or more granule liberators are operated in series. In yet other embodiments, the two or more granule liberators are operated in parallel.

In some embodiments, at least some of the ASW particles from at least one of the first set of ASW particles, the second set of ASW particles, or any combination thereof may remain in a mixture with the granules that are removed using at least one granule liberator. In such embodiments, at least some of the remaining ASW particles may be separated from the mixture using at least one density separation technique, at least one size separation technique, or any combination thereof. Non-limiting examples of the at least one density separation technique, the at least one size separation technique, or any combination thereof include any screening technique described herein, any air separation technique described herein (e.g., cyclone air separation, mechanical air separation), air classification, vacuum separation, the like, or any combination thereof.

In some embodiments, the at least one granule liberator may remove sand, fiberglass, backing, mat substrate, non-asphaltic materials, or any combination thereof.

In some embodiments, the at least one density separation technique, the at least one size separation technique, or any combination thereof may be used to remove at least some of the granules from at least one of the first set of ASW particles, the second set of ASW particles, or a combination thereof, in addition to or as an alternative granule liberation mechanism (i.e., other than the RIS). In some embodiments, a plurality of density separation techniques, a plurality of size separation techniques, or any combination thereof may be used to remove at least some of the granules from at least one of the first set of ASW particles, the second set of ASW particles, or a combination thereof.

In some embodiments, processing the asphalt shingle waste comprises removing at least some of the granules from at least one of the first set of ASW particles, the second set of ASW particles, or a combination thereof with a plurality of density separation techniques, a plurality of size separation techniques, or any combination thereof. In embodiments, the plurality of density separation techniques, the plurality of size separation techniques, or any combination thereof are performed in series. In yet other embodiments, the plurality of density separation techniques, the plurality of size separation techniques, or any combination thereof are performed in parallel.

In some embodiments, at least some of the granules may be reused in roofing products. In some embodiments, at least some of the granules may be reused in manufacture of one or more roofing shingles or roofing shingle components. In some non-limiting embodiments, at least some of the granules may be reused for a headlap of a roofing shingle, a backing of a roofing shingle, or any combination thereof.

In some embodiments, the first set of ASW particles is subjected to a grinding step. In some embodiments, the step of grinding the first set of ASW particles results in a third set of ASW particles.

In some embodiments, the third set of ASW particles has an average particle size of 2 microns to 425 microns. In some embodiments, the third set of ASW particles has an average particle size of 5 microns to 425 microns. In some embodiments, the third set of ASW particles has an average particle size of 10 microns to 425 microns. In some embodiments, the third set of ASW particles has an average particle size of 25 microns to 425 microns. In some embodiments, the third set of ASW particles has an average particle size of 50 microns to 425 microns. In some embodiments, the third set of ASW particles has an average particle size of 75 microns to 425 microns. In some embodiments, the third set of ASW particles has an average particle size of 100 microns to 425 microns. In some embodiments, the third set of ASW particles has an average particle size of 200 microns to 425 microns. In some embodiments, the third set of ASW particles has an average particle size of 300 microns to 425 microns. In some embodiments, the third set of ASW particles has an average particle size of 400 microns to 425 microns.

In some embodiments, the third set of ASW particles has an average particle size of 2 microns to 400 microns. In some embodiments, the third set of ASW particles has an average particle size of 2 microns to 300 microns. In some embodiments, the third set of ASW particles has an average particle size of 2 microns to 200 microns. In some embodiments, the third set of ASW particles has an average particle size of 2 microns to 100 microns. In some embodiments, the third set of ASW particles has an average particle size of 2 microns to 75 microns. In some embodiments, the third set of ASW particles has an average particle size of 2 microns to 50 microns. In some embodiments, the third set of ASW particles has an average particle size of 2 microns to 25 microns. In some embodiments, the third set of ASW particles has an average particle size of 2 microns to 10 microns. In some embodiments, the third set of ASW particles has an average particle size of 2 microns to 5 microns.

In some embodiments, the third set of ASW particles has an average particle size of 5 microns to 400 microns. In some embodiments, the third set of ASW particles has an average particle size of 10 microns to 300 microns. In some embodiments, the third set of ASW particles has an average particle size of 25 microns to 200 microns. In some embodiments, the third set of ASW particles has an average particle size of 75 microns to 100 microns.

In some embodiments, the second set of ASW particles and the third set of ASW particles are combined to form a combination of the second and third sets of ASW particles. In some embodiments, the second set of ASW particles and the third set of ASW particles are not combined.

In some embodiments, the combination of the second and third sets of ASW particles are separated using an air separator. In some embodiments, each of the second set of ASW particles and the third set of ASW particles is individually separated using the air separator. In some embodiments, the air separator is a mechanical air separator. In some embodiments, the air separator is a cyclone air separator.

In some embodiments, the separating using the air separator results in a fourth set of ASW particles and a fifth set of ASW particles.

In some embodiments, the fourth set of ASW particles has an average particle size of 250 microns to 450 microns. In some embodiments, the fourth set of ASW particles has an average particle size of 300 microns to 450 microns. In some embodiments, the fourth set of ASW particles has an average particle size of 350 microns to 450 microns. In some embodiments, the fourth set of ASW particles has an average particle size of 400 microns to 450 microns.

In some embodiments, the fourth set of ASW particles has an average particle size of 250 microns to 400 microns. In some embodiments, the fourth set of ASW particles has an average particle size of 250 microns to 350 microns. In some embodiments, the fourth set of ASW particles has an average particle size of 250 microns to 300 microns.

In some embodiments, the fourth set of ASW particles has an average particle size of 300 microns to 400 microns.

In some embodiments, the fifth set of ASW particles has an average particle size of 2 microns to 250 microns. In some embodiments, the fifth set of ASW particles has an average particle size of 5 microns to 250 microns. In some embodiments, the fifth set of ASW particles has an average particle size of 10 microns to 250 microns. In some embodiments, the fifth set of ASW particles has an average particle size of 25 microns to 250 microns. In some embodiments, the fifth set of ASW particles has an average particle size of 50 microns to 250 microns. In some embodiments, the fifth set of ASW particles has an average particle size of 75 microns to 250 microns. In some embodiments, the fifth set of ASW particles has an average particle size of 100 microns to 250 microns. In some embodiments, the fifth set of ASW particles has an average particle size of 150 microns to 250 microns. In some embodiments, the fifth set of ASW particles has an average particle size of 200 microns to 250 microns.

In some embodiments, the fifth set of ASW particles has an average particle size of 2 microns to 200 microns. In some embodiments, the fifth set of ASW particles has an average particle size of 2 microns to 150 microns. In some embodiments, the fifth set of ASW particles has an average particle size of 2 microns to 100 microns. In some embodiments, the fifth set of ASW particles has an average particle size of 2 microns to 75 microns. In some embodiments, the fifth set of ASW particles has an average particle size of 2 microns to 50 microns. In some embodiments, the fifth set of ASW particles has an average particle size of 2 microns to 25 microns. In some embodiments, the fifth set of ASW particles has an average particle size of 2 microns to 10 microns. In some embodiments, the fifth set of ASW particles has an average particle size of 2 microns to 5 microns.

In some embodiments, the fourth set of ASW particles has an average particle size that is greater than the average particle size of the fifth set of ASW particles.

In some embodiments, processing the asphalt shingle waste comprises grinding the fourth set of ASW particles. In some embodiments, the grinding of the fourth set of ASW particles results in a sixth set of ASW particles.

In some embodiments, the sixth set of ASW particles has an average particle size of 2 microns to 250 microns. In some embodiments, the sixth set of ASW particles has an average particle size of 5 microns to 250 microns. In some embodiments, the sixth set of ASW particles has an average particle size of 10 microns to 250 microns. In some embodiments, the sixth set of ASW particles has an average particle size of 25 microns to 250 microns. In some embodiments, the sixth set of ASW particles has an average particle size of 50 microns to 250 microns. In some embodiments, the sixth set of ASW particles has an average particle size of 75 microns to 250 microns. In some embodiments, the sixth set of ASW particles has an average particle size of 100 microns to 250 microns. In some embodiments, the sixth set of ASW particles has an average particle size of 150 microns to 250 microns. In some embodiments, the sixth set of ASW particles has an average particle size of 200 microns to 250 microns.

In some embodiments, the sixth set of ASW particles has an average particle size of 2 microns to 200 microns. In some embodiments, the sixth set of ASW particles has an average particle size of 2 microns to 150 microns. In some embodiments, the sixth set of ASW particles has an average particle size of 2 microns to 100 microns. In some embodiments, the sixth set of ASW particles has an average particle size of 2 microns to 75 microns. In some embodiments, the sixth set of ASW particles has an average particle size of 2 microns to 50 microns. In some embodiments, the sixth set of ASW particles has an average particle size of 2 microns to 25 microns. In some embodiments, the sixth set of ASW particles has an average particle size of 2 microns to 10 microns. In some embodiments, the sixth set of ASW particles has an average particle size of 2 microns to 5 microns.

In some embodiments, the fifth set of ASW particles and the sixth set of ASW particles are combined. In some embodiments, the fifth set of ASW particles and the sixth set of ASW particles are not combined.

In some embodiments, the combining of the fifth set of ASW particles and the sixth set of ASW particles results in an ASW powder. In some embodiments, each of the fifth set of ASW particles and the sixth set of ASW particles is an ASW powder.

In some embodiments, at least one of: the second set of ASW particles, the third set of ASW particles, the fourth set of ASW particles, the fifth set of ASW particles, the sixth set of ASW particles, or any combination thereof comprises the ASW powder. In some such embodiments, the ASW powder may be separated from at least one of: the second set of ASW particles, the third set of ASW particles, the fourth set of ASW particles, the fifth set of ASW particles, the sixth set of ASW particles or any combination thereof using any separation technique (e.g., screening, density separation, size separation) described herein or any combination of separation techniques described herein.

In some embodiments, the ASW powder is combined with an asphalt coating (e.g., an oxidized asphalt coating or a polymer modified asphalt coating) to form a partially filled asphalt coating. In some embodiments, limestone or at least one other filler material may be added to the partially filled asphalt coating to form a filled asphalt coating. In some embodiments, the filled asphalt coating is incorporated into a roofing shingle.

In some embodiments, the ASW powder comprises 5 wt % to 40 wt % asphalt based on a total weight of the ASW powder. In some embodiments, the ASW powder comprises 10 wt % to 40 wt % asphalt based on a total weight of the ASW powder. In some embodiments, the ASW powder comprises 15 wt % to 40 wt % asphalt based on a total weight of the ASW powder. In some embodiments, the ASW powder comprises 20 wt % to 40 wt % asphalt based on a total weight of the ASW powder. In some embodiments, the ASW powder comprises 25 wt % to 40 wt % asphalt based on a total weight of the ASW powder. In some embodiments, the ASW powder comprises 30 wt % to 40 wt % asphalt based on a total weight of the ASW powder. In some embodiments, the ASW powder comprises 35 wt % to 40 wt % asphalt based on a total weight of the ASW powder.

In some embodiments, the ASW powder comprises 5 wt % to 35 wt % asphalt based on a total weight of the ASW powder. In some embodiments, the ASW powder comprises 5 wt % to 30 wt % asphalt based on a total weight of the ASW powder. In some embodiments, the ASW powder comprises 5 wt % to 20 wt % asphalt based on a total weight of the ASW powder. In some embodiments, the ASW powder comprises 5 wt % to 15 wt % asphalt based on a total weight of the ASW powder. In some embodiments, the ASW powder comprises 5 wt % to 10 wt % asphalt based on a total weight of the ASW powder.

In some embodiments, the ASW powder comprises 10 wt % to 35 wt % asphalt based on a total weight of the ASW powder. In some embodiments, the ASW powder comprises 15 wt % to 30 wt % asphalt based on a total weight of the ASW powder. In some embodiments, the ASW powder comprises 20 wt % to 25 wt % asphalt based on a total weight of the ASW powder.

In some embodiments, the ASW powder comprises 60 wt % to 95 wt % of limestone, granules, and impurities based on the total weight of the ASW powder. In some embodiments, the ASW powder comprises 65 wt % to 95 wt % of limestone, granules, and impurities based on the total weight of the ASW powder. In some embodiments, the ASW powder comprises 70 wt % to 95 wt % of limestone, granules, and impurities based on the total weight of the ASW powder. In some embodiments, the ASW powder comprises 75 wt % to 95 wt % of limestone, granules, and impurities based on the total weight of the ASW powder. In some embodiments, the ASW powder comprises 80 wt % to 95 wt % of limestone, granules, and impurities based on the total weight of the ASW powder. In some embodiments, the ASW powder comprises 85 wt % to 95 wt % of limestone, granules, and impurities based on the total weight of the ASW powder. In some embodiments, the ASW powder comprises 90 wt % to 95 wt % of limestone, granules, and impurities based on the total weight of the ASW powder.

In some embodiments, the ASW powder comprises 60 wt % to 90 wt % of limestone, granules, and impurities based on the total weight of the ASW powder. In some embodiments, the ASW powder comprises 60 wt % to 85 wt % of limestone, granules, and impurities based on the total weight of the ASW powder. In some embodiments, the ASW powder comprises 60 wt % to 80 wt % of limestone, granules, and impurities based on the total weight of the ASW powder. In some embodiments, the ASW powder comprises 60 wt % to 75 wt % of limestone, granules, and impurities based on the total weight of the ASW powder. In some embodiments, the ASW powder comprises 60 wt % to 70 wt % of limestone, granules, and impurities based on the total weight of the ASW powder. In some embodiments, the ASW powder comprises 60 wt % to 65 wt % of limestone, granules, and impurities based on the total weight of the ASW powder.

In some embodiments, the ASW powder comprises 65 wt % to 90 wt % of limestone, granules, and impurities based on the total weight of the ASW powder. In some embodiments, the ASW powder comprises 70 wt % to 85 wt % of limestone, granules, and impurities based on the total weight of the ASW powder. In some embodiments, the ASW powder comprises 75 wt % to 80 wt % of limestone, granules, and impurities based on the total weight of the ASW powder.

In some embodiments, the ASW powder comprises 5 wt % to 40 wt % asphalt based on a total weight of the ASW powder with the remainder limestone, granules, and impurities. In some embodiments, the ASW powder comprises 10 wt % to 40 wt % asphalt based on a total weight of the ASW powder with the remainder limestone, granules, and impurities. In some embodiments, the ASW powder comprises 15 wt % to 40 wt % asphalt based on a total weight of the ASW powder with the remainder limestone, granules, and impurities. In some embodiments, the ASW powder comprises 20 wt % to 40 wt % asphalt based on a total weight of the ASW powder with the remainder limestone, granules, and impurities. In some embodiments, the ASW powder comprises 25 wt % to 40 wt % asphalt based on a total weight of the ASW powder with the remainder limestone, granules, and impurities. In some embodiments, the ASW powder comprises 30 wt % to 40 wt % asphalt based on a total weight of the ASW powder with the remainder limestone, granules, and impurities. In some embodiments, the ASW powder comprises 35 wt % to 40 wt % asphalt based on a total weight of the ASW powder with the remainder limestone, granules, and impurities.

In some embodiments, the ASW powder comprises 5 wt % to 35 wt % asphalt based on a total weight of the ASW powder with the remainder limestone, granules, and impurities. In some embodiments, the ASW powder comprises 5 wt % to 30 wt % asphalt based on a total weight of the ASW powder with the remainder limestone, granules, and impurities. In some embodiments, the ASW powder comprises 5 wt % to 20 wt % asphalt based on a total weight of the ASW powder with the remainder limestone, granules, and impurities. In some embodiments, the ASW powder comprises 5 wt % to 15 wt % asphalt based on a total weight of the ASW powder with the remainder limestone, granules, and impurities. In some embodiments, the ASW powder comprises 5 wt % to 10 wt % asphalt based on a total weight of the ASW powder with the remainder limestone, granules, and impurities.

In some embodiments, processing the asphalt shingle waste comprises does not comprise a wet extraction step.

In some embodiments, processing the asphalt shingle waste comprises an air stripping step before one or more of the screening steps detailed herein.

In some embodiments, one or more dust collection steps may be performed at any stage of the method (i.e., before, during, after, or between any step(s) of the method disclosed herein) without departing from the scope of the present disclosure. In some embodiments, residual waste products from the ASW may be removed at any stage of the process (i.e., before, during, after, or between any step(s) of the method disclosed herein) without departing from the scope of the present disclosure. A non-limiting example of a residual waste product is a residual plastic material from the asphalt shingles, such as, but not limited to, residual portions of fiberglass mat.

In some embodiments, at least one aeration device may be added at any stage of the process (i.e., before, during, after, or between any step(s) of the methods disclosed herein) without departing from the scope of the present disclosure. In some embodiments, the at least one aeration device includes, but is not limited to, at least one air separator described herein, at least one aspirator, or any combination thereof.

In some embodiments, the steps of the method disclosed herein may be performed in any order.

In some embodiments, processing the asphalt shingle waste comprises forming steps in the following order: (a) obtaining the ASW; (b) grinding the ASW to form ground ASW; (c) screening the ground ASW with the rotary screener to form the first set of ASW particles and the second set of ASW particles; (d) removing at least some of the granules of the ASW from at least one of the first set of ASW particles, the second set of ASW particles, or a combination thereof with at least one granule liberator, such as at least one rotary impact separator; (e) grinding the first set of ASW particles to result in a third set of particles; (f) separating the combination of the second and third sets of ASW particles using an air separator to result in a fourth set of ASW particles and a fifth set of ASW particles; (g) grinding the fourth set of ASW particles to result in a sixth set of particles.

In some embodiments, processing the asphalt shingle waste does not comprise a grinding step after step (g). In some embodiments, processing the asphalt shingle waste does not comprise any grinding steps other than steps (b), (e), and (g). In some embodiments, processing the asphalt shingle waste does not comprise a screening step after step (f).

In some embodiments, processing the asphalt shingle waste may comprise one or more of the following steps: In some embodiments, the asphalt shingle waste (ASW) may be obtained. In some embodiments, the ASW is subjected to a grinding step to form ground ASW particles. In some embodiments, the ground ASW particles are subjected to a screening step to form a first set of ASW particles and a second set of ASW particles. In some embodiments, the screening step is performed with a rotary screener. In some embodiments, some or all of the granules are removed from the first set of ASW particles using rotary impact separator. In some embodiments, a rotary impact separator may also remove some or all of the granules from the second set of ASW particles. In some embodiments, the first set of particles is subjected to a grinding step, so as to form a third set of ASW particles. In some embodiments the second set of ASW particles and the third set of ASW particles may be combined to form a combination of the second and third sets of ASW particles. In some embodiments, the combination of the second and third sets of ASW particles is fed into an air separator, where the combination of the second and third sets of ASW particles are separated into a fourth set of ASW particles and a fifth set of ASW particles. In some embodiments, the fourth set of ASW particles is subjected to a grinding step, so as to form a sixth set of ASW particles. In some embodiments, the fifth set of ASW particles and the sixth set of ASW particles are combined to form ASW powder. In some embodiments, ASW powder is combined with an asphalt coating to form a partially filled asphalt coating. In some embodiments, limestone or other filler material may be added to the partially filled asphalt coating to form a filled asphalt coating. In some embodiments, the filled asphalt coating (not shown) is incorporated into a roofing shingle (not shown).

In some embodiments, the ASW powder is formed into a plurality of briquettes. In some embodiments, each briquette of the plurality of briquettes comprises the ASW powder. In some embodiments, some of the plurality of briquettes comprises the ASW powder.

In some embodiments, each briquette of the plurality of briquettes comprises at least one of: the ASW powder, AC powder (as described herein), or any combination thereof. In some embodiments, some of the plurality of briquettes comprises the ASW powder, the AC powder, or any combination thereof. In some embodiments, the plurality of briquettes is formed after performing the grinding steps and screening steps (described herein) on the ASW to result in the ASW powder.

In some embodiments, limestone powder or other filler is added to at least one of: the ASW powder the AC powder, or any combination thereof to form the plurality of briquettes. In some embodiments, the plurality of briquettes may be obtained (e.g., delivered, purchased, obtained from storage, formed, compressed, or any combination thereof).

In some embodiments, the plurality of briquettes is formed by compressing the ASW powder and the limestone powder and at a pressure sufficient to form the plurality of briquettes. In some embodiments, the plurality of briquettes is formed by compressing the ASW powder at a pressure sufficient to form the plurality of briquettes. Any suitable compression device may be used, including but not limited to, a piston, a briquetting machine, a plurality of compression wheels, or any combination thereof.

In some embodiments, the pressure sufficient to form the plurality of briquettes ranges from 200 psi to 20,000 psi. In some embodiments, the pressure sufficient to form the plurality of briquettes ranges from 500 psi to 20,000 psi. In some embodiments, the pressure sufficient to form the plurality of briquettes ranges from 1,000 psi to 20,000 psi. In some embodiments, the pressure sufficient to form the plurality of briquettes ranges from 5,000 psi to 20,000 psi. In some embodiments, the pressure sufficient to form the plurality of briquettes ranges from 10,000 psi to 20,000 psi. In some embodiments, the pressure sufficient to form the plurality of briquettes ranges from 15,000 psi to 20,000 psi.

In some embodiments, the pressure sufficient to form the plurality of briquettes ranges from 200 psi to 15,000 psi. In some embodiments, the pressure sufficient to form the plurality of briquettes ranges from 200 psi to 10,000 psi. In some embodiments, the pressure sufficient to form the plurality of briquettes ranges from 200 psi to 5,000 psi. In some embodiments, the pressure sufficient to form the plurality of briquettes ranges from 200 psi to 1,000 psi. In some embodiments, the pressure sufficient to form the plurality of briquettes ranges from 200 psi to 5000 psi.

In some embodiments, the pressure sufficient to form the plurality of briquettes ranges from 500 psi to 15,000 psi. In some embodiments, the pressure sufficient to form the plurality of briquettes ranges from 1,000 psi to 10,000 psi. In some embodiments, the pressure sufficient to form the plurality of briquettes is 500 psi.

The plurality of briquettes may be any shape. In some embodiments, each briquette the plurality of briquettes is spherical. In some embodiments, each briquette of the plurality of briquettes is an oblate spheroid (i.e., an ellipsoid). In some embodiments the plurality of briquettes may include briquettes having at least one of the following non-limiting shapes: a rectangular prism, a cube, a cone, a tetrahedron, an pentahedron, a hexahedron, a dodecahedron, a torus, or any combination thereof.

The plurality of briquettes may have any size. In some embodiments, each briquette of the plurality of briquettes may be spherical with a diameter in a range of 0.5 inches to 2 inches. In some embodiments, each briquette of the plurality of briquettes may be spherical with a diameter in a range of 1 inch to 2 inches. In some embodiments, each briquette of the plurality of briquettes may be spherical with a diameter in a range of 1.5 inches to 2 inches. In some embodiments, each briquette of the plurality of briquettes may be spherical with a diameter in a range of 0.5 inches to 1.5 inches. In some embodiments, each briquette of the plurality of briquettes may be spherical with a diameter in a range of 0.5 inches to 1 inch. In some embodiments, each briquette of the plurality of briquettes may be spherical with a diameter in a range of 1 inch to 1.5 inches.

In some embodiments, each briquette of the plurality of briquettes may be an oblate spheroid with at least one of: a first diameter, a second diameter, or any combination thereof having a range of 0.5 inches to 2 inches. In some embodiments, each briquette of the plurality of briquettes may be an oblate spheroid with at least one of: a first diameter, a second diameter, or any combination thereof having a range of 1 inch to 2 inches. In some embodiments, each briquette of the plurality of briquettes may be an oblate spheroid with at least one of: a first diameter, a second diameter, or any combination thereof having a range of 1.5 inches to 2 inches. In some embodiments, each briquette of the plurality of briquettes may be an oblate spheroid with at least one of: a first diameter, a second diameter, or any combination thereof having a range of 0.5 inches to 1.5 inches In some embodiments, each briquette of the plurality of briquettes may be an oblate spheroid with at least one of: a first diameter, a second diameter, or any combination thereof having a range of 0.5 inches to 1 inch. In some embodiments, each briquette of the plurality of briquettes may be an oblate spheroid with at least one of: a first diameter, a second diameter, or any combination thereof having a range of 1 inch to 1.5 inches.

In some embodiments, the plurality of briquettes comprises at least two briquettes. In some embodiments, the plurality of briquettes comprises 2 briquettes to 10,000 briquettes. In some embodiments, the plurality of briquettes comprises 2 briquettes to 9,000 briquettes. In some embodiments, the plurality of briquettes comprises 2 briquettes to 8,000 briquettes. In some embodiments, the plurality of briquettes comprises 2 briquettes to 7,000 briquettes. In some embodiments, the plurality of briquettes comprises 2 briquettes to 6,000 briquettes. In some embodiments, the plurality of briquettes comprises 2 briquettes to 5,000 briquettes. In some embodiments, the plurality of briquettes comprises 2 briquettes to 4,000 briquettes. In some embodiments, the plurality of briquettes comprises 2 briquettes to 3,000 briquettes. In some embodiments, the plurality of briquettes comprises 2 briquettes to 2,000 briquettes. In some embodiments, the plurality of briquettes comprises 2 briquettes to 1,000 briquettes. In some embodiments, the plurality of briquettes comprises 2 briquettes to 750 briquettes. In some embodiments, the plurality of briquettes comprises 2 briquettes to 500 briquettes. In some embodiments, the plurality of briquettes comprises 2 briquettes to 250 briquettes. In some embodiments, the plurality of briquettes comprises 2 briquettes to 100 briquettes. In some embodiments, the plurality of briquettes comprises 2 briquettes to 50 briquettes. In some embodiments, the plurality of briquettes comprises 2 briquettes to 25 briquettes.

In some embodiments, the plurality of briquettes comprises 25 briquettes to 10,000 briquettes. In some embodiments, the plurality of briquettes comprises 50 briquettes to 10,000 briquettes. In some embodiments, the plurality of briquettes comprises 100 briquettes to 10,000 briquettes. In some embodiments, the plurality of briquettes comprises 250 briquettes to 10,000 briquettes. In some embodiments, the plurality of briquettes comprises 500 briquettes to 10,000 briquettes. In some embodiments, the plurality of briquettes comprises 750 briquettes to 10,000 briquettes. In some embodiments, the plurality of briquettes comprises 1000 briquettes to 10,000 briquettes. In some embodiments, the plurality of briquettes comprises 2000 briquettes to 10,000 briquettes. In some embodiments, the plurality of briquettes comprises 3000 briquettes to 10,000 briquettes. In some embodiments, the plurality of briquettes comprises 4000 briquettes to 10,000 briquettes. In some embodiments, the plurality of briquettes comprises 5000 briquettes to 10,000 briquettes. In some embodiments, the plurality of briquettes comprises 6000 briquettes to 10,000 briquettes. In some embodiments, the plurality of briquettes comprises 7000 briquettes to 10,000 briquettes. In some embodiments, the plurality of briquettes comprises 8000 briquettes to 10,000 briquettes. In some embodiments, the plurality of briquettes comprises 9000 briquettes to 10,000 briquettes.

It will be appreciated the plurality of briquettes may comprise more than 10,000 briquettes, for example, in a continuous process which is capable of producing briquettes on a continuous ongoing basis.

In some embodiments, during the feeding of at least one of: the AC powder, the ASW powder, or any combination thereof into the at least one first mixer (as described herein, infra), at least a portion of the AC powder or the ASW powder is in the form of a briquette. In some embodiments, during the feeding of into the at least one first mixer, all of the AC powder, all of the ASW powder, or all of both is in the form of a briquette.

In some embodiments, processing the asphalt shingle waste comprises forming asphalt shingle waste powder filled coatings from asphalt shingle waste. In some embodiments, any steps of forming asphalt shingle waste powder described herein, any steps of forming briquettes described herein, or any combination thereof, may be combined with any of the methods of forming asphalt shingle waste powder filled coatings described herein. In some embodiments, the method is a continuous process. In some embodiments, the method is a batch process. In some embodiments, the method is a semi-continuous process. In some embodiments, the method is a semi-batch process.

In some embodiments, sufficient dry grinding and screening steps (including but not limited to any dry grinding and screening steps defined herein, supra) are performed on the ASW to result in ASW powder having an average particle size of 2 microns to 425 microns. In some embodiments, sufficient dry grinding and screening steps are performed on the ASW to result in ASW powder having an average particle size of 2 microns to 325 microns. In some embodiments, sufficient dry grinding and screening steps are performed on the ASW to result in ASW powder having an average particle size of 2 microns to 225 microns. In some embodiments, sufficient dry grinding and screening steps are performed on the ASW to result in ASW powder having an average particle size of 2 microns to 125 microns. In some embodiments, sufficient dry grinding and screening steps are performed on the ASW to result in ASW powder having an average particle size of 2 microns to 100 microns. In some embodiments, sufficient dry grinding and screening steps are performed on the ASW to result in ASW powder having an average particle size of 2 microns to 75 microns. In some embodiments, sufficient dry grinding and screening steps are performed on the ASW to result in ASW powder having an average particle size of 2 microns to 50 microns. In some embodiments, sufficient dry grinding and screening steps are performed on the ASW to result in ASW powder having an average particle size of 2 microns to 25 microns. In some embodiments, sufficient dry grinding and screening steps are performed on the ASW to result in ASW powder having an average particle size of 2 microns to 20 microns. In some embodiments, sufficient dry grinding and screening steps are performed on the ASW to result in ASW powder having an average particle size of 2 microns to 15 microns. In some embodiments, sufficient dry grinding and screening steps are performed on the ASW to result in ASW powder having an average particle size of 2 microns to 10 microns. In some embodiments, sufficient dry grinding and screening steps are performed on the ASW to result in ASW powder having an average particle size of 2 microns to 5 microns.

In some embodiments, sufficient dry grinding and screening steps are performed on the ASW to result in ASW powder having an average particle size of 5 microns to 425 microns. In some embodiments, sufficient dry grinding and screening steps are performed on the ASW to result in ASW powder having an average particle size of 10 microns to 425 microns. In some embodiments, sufficient dry grinding and screening steps are performed on the ASW to result in ASW powder having an average particle size of 15 microns to 425 microns. In some embodiments, sufficient dry grinding and screening steps are performed on the ASW to result in ASW powder having an average particle size of 20 microns to 425 microns. In some embodiments, sufficient dry grinding and screening steps are performed on the ASW to result in ASW powder having an average particle size of 25 microns to 425 microns. In some embodiments, sufficient dry grinding and screening steps are performed on the ASW to result in ASW powder having an average particle size of 50 microns to 425 microns. In some embodiments, sufficient dry grinding and screening steps are performed on the ASW to result in ASW powder having an average particle size of 75 microns to 425 microns. In some embodiments, sufficient dry grinding and screening steps are performed on the ASW to result in ASW powder having an average particle size of 100 microns to 425 microns. In some embodiments, sufficient dry grinding and screening steps are performed on the ASW to result in ASW powder having an average particle size of 125 microns to 425 microns. In some embodiments, sufficient dry grinding and screening steps are performed on the ASW to result in ASW powder having an average particle size of 225 microns to 425 microns. In some embodiments, sufficient dry grinding and screening steps are performed on the ASW to result in ASW powder having an average particle size of 325 microns to 425 microns.

In some embodiments, sufficient dry grinding and screening steps are performed on the ASW to result in ASW powder having an average particle size of 5 microns to 325 microns. In some embodiments, sufficient dry grinding and screening steps are performed on the ASW to result in ASW powder having an average particle size of 10 microns to 225 microns. In some embodiments, sufficient dry grinding and screening steps are performed on the ASW to result in ASW powder having an average particle size of 25 microns to 125 microns. In some embodiments, sufficient dry grinding and screening steps are performed on the ASW to result in ASW powder having an average particle size of 50 microns to 100 microns.

In some embodiments, sufficient dry grinding and screening steps are performed on the ASW to result in ASW powder having an average particle size of 10 microns to 250 microns. In some embodiments, sufficient dry grinding and screening steps are performed on the ASW to result in ASW powder having an average particle size of 10 microns to 200 microns. In some embodiments, sufficient dry grinding and screening steps are performed on the ASW to result in ASW powder having an average particle size of 10 microns to 150 microns. In some embodiments, sufficient dry grinding and screening steps are performed on the ASW to result in ASW powder having an average particle size of 10 microns to 100 microns. In some embodiments, sufficient dry grinding and screening steps are performed on the ASW to result in ASW powder having an average particle size of 10 microns to 75 microns. In some embodiments, sufficient dry grinding and screening steps are performed on the ASW to result in ASW powder having an average particle size of 10 microns to 50 microns. In some embodiments, sufficient dry grinding and screening steps are performed on the ASW to result in ASW powder having an average particle size of 10 microns to 25 microns. In some embodiments, sufficient dry grinding and screening steps are performed on the ASW to result in ASW powder having an average particle size of 10 microns to 20 microns. In some embodiments, sufficient dry grinding and screening steps are performed on the ASW to result in ASW powder having an average particle size of 10 microns to 15 microns.

In some embodiments, sufficient dry grinding and screening steps are performed on the ASW to result in ASW powder having an average particle size of 15 microns to 250 microns. In some embodiments, sufficient dry grinding and screening steps are performed on the ASW to result in ASW powder having an average particle size of 20 microns to 250 microns. In some embodiments, sufficient dry grinding and screening steps are performed on the ASW to result in ASW powder having an average particle size of 25 microns to 250 microns. In some embodiments, sufficient dry grinding and screening steps are performed on the ASW to result in ASW powder having an average particle size of 50 microns to 250 microns. In some embodiments, sufficient dry grinding and screening steps are performed on the ASW to result in ASW powder having an average particle size of 75 microns to 250 microns. In some embodiments, sufficient dry grinding and screening steps are performed on the ASW to result in ASW powder having an average particle size of 100 microns to 250 microns. In some embodiments, sufficient dry grinding and screening steps are performed on the ASW to result in ASW powder having an average particle size of 150 microns to 250 microns. In some embodiments, sufficient dry grinding and screening steps are performed on the ASW to result in ASW powder having an average particle size of 200 microns to 250 microns.

In some embodiments, sufficient dry grinding and screening steps are performed on the ASW to result in ASW powder having an average particle size of 20 microns to 200 microns. In some embodiments, sufficient dry grinding and screening steps are performed on the ASW to result in ASW powder having an average particle size of 40 microns to 100 microns. In some embodiments, sufficient dry grinding and screening steps are performed on the ASW to result in ASW powder having an average particle size of 80 microns to 90 microns.

In some embodiments, sufficient dry grinding and screening steps are performed on the ASW to result in ASW powder having 5 wt % to 40 wt % asphalt based on a total weight of the powder. In some embodiments, sufficient dry grinding and screening steps are performed on the ASW to result in ASW powder having 10 wt % to 40 wt % asphalt based on a total weight of the powder. In some embodiments, sufficient dry grinding and screening steps are performed on the ASW to result in ASW powder having 15 wt % to 40 wt % asphalt based on a total weight of the powder. In some embodiments, sufficient dry grinding and screening steps are performed on the ASW to result in ASW powder having 20 wt % to 40 wt % asphalt based on a total weight of the ASW powder. In some embodiments, sufficient dry grinding and screening steps are performed on the ASW to result in ASW powder having 25 wt % to 40 wt % asphalt based on a total weight of the ASW powder. In some embodiments, sufficient dry grinding and screening steps are performed on the ASW to result in ASW powder having 30 wt % to 40 wt % asphalt based on a total weight of the ASW powder. In some embodiments, sufficient dry grinding and screening steps are performed on the ASW to result in ASW powder having 35 wt % to 40 wt % asphalt based on a total weight of the ASW powder.

In some embodiments, sufficient dry grinding and screening steps are performed on the ASW to result in ASW powder having 5 wt % to 35 wt % asphalt based on a total weight of the ASW powder. In some embodiments, sufficient dry grinding and screening steps are performed on the ASW to result in ASW powder having 5 wt % to 30 wt % asphalt based on a total weight of the ASW powder. In some embodiments, sufficient dry grinding and screening steps are performed on the ASW to result in ASW powder having 5 wt % to 25 wt % asphalt based on a total weight of the ASW powder. In some embodiments, sufficient dry grinding and screening steps are performed on the ASW to result in ASW powder having 5 wt % to 20 wt % asphalt based on a total weight of the ASW powder. In some embodiments, sufficient dry grinding and screening steps are performed on the ASW to result in ASW powder having 5 wt % to 15 wt % asphalt based on a total weight of the ASW powder. In some embodiments, sufficient dry grinding and screening steps are performed on the ASW to result in ASW powder having 5 wt % to 10 wt % asphalt based on a total weight of the ASW powder.

In some embodiments, sufficient dry grinding and screening steps are performed on the ASW to result in ASW powder having 10 wt % to 35 wt % asphalt based on a total weight of the powder. In some embodiments, sufficient dry grinding and screening steps are performed on the ASW to result in ASW powder having 15 wt % to 30 wt % asphalt based on a total weight of the powder. In some embodiments, sufficient dry grinding and screening steps are performed on the ASW to result in ASW powder having 20 wt % to 25 wt % asphalt based on a total weight of the powder.

In some embodiments, sufficient dry grinding and screening steps are performed on the ASW to result in ASW powder having 60 wt % to 95 wt % limestone powder, granules, and impurities based on the total weight of the ASW powder. In some embodiments, sufficient dry grinding and screening steps are performed on the ASW to result in ASW powder having 65 wt % to 95 wt % limestone powder, granules, and impurities based on the total weight of the ASW powder. In some embodiments, sufficient dry grinding and screening steps are performed on the ASW to result in ASW powder having 70 wt % to 95 wt % limestone powder, granules, and impurities based on the total weight of the ASW powder. In some embodiments, sufficient dry grinding and screening steps are performed on the ASW to result in ASW powder having 75 wt % to 95 wt % limestone powder, granules, and impurities based on the total weight of the ASW powder. In some embodiments, sufficient dry grinding and screening steps are performed on the ASW to result in ASW powder having 80 wt % to 95 wt % limestone powder, granules, and impurities based on the total weight of the ASW powder. In some embodiments, sufficient dry grinding and screening steps are performed on the ASW to result in ASW powder having 85 wt % to 95 wt % limestone powder, granules, and impurities based on the total weight of the ASW powder. In some embodiments, sufficient dry grinding and screening steps are performed on the ASW to result in ASW powder having 90 wt % to 95 wt % limestone powder, granules, and impurities based on the total weight of the ASW powder.

In some embodiments, sufficient dry grinding and screening steps are performed on the ASW to result in ASW powder having 60 wt % to 90 wt % limestone powder, granules, and impurities based on the total weight of the ASW powder. In some embodiments, sufficient dry grinding and screening steps are performed on the ASW to result in ASW powder having 60 wt % to 85 wt % limestone powder, granules, and impurities based on the total weight of the ASW powder. In some embodiments, sufficient dry grinding and screening steps are performed on the ASW to result in ASW powder having 60 wt % to 80 wt % limestone powder, granules, and impurities based on the total weight of the ASW powder. In some embodiments, sufficient dry grinding and screening steps are performed on the ASW to result in ASW powder having 60 wt % to 75 wt % limestone powder, granules, and impurities based on the total weight of the ASW powder. In some embodiments, sufficient dry grinding and screening steps are performed on the ASW to result in ASW powder having 60 wt % to 70 wt % limestone powder, granules, and impurities based on the total weight of the ASW powder. In some embodiments, sufficient dry grinding and screening steps are performed on the ASW to result in ASW powder having 60 wt % to 65 wt % limestone powder, granules, and impurities based on the total weight of the ASW powder.

In some embodiments, sufficient dry grinding and screening steps are performed on the ASW to result in ASW powder having 65 wt % to 90 wt % limestone powder, granules, and impurities based on the total weight of the ASW powder. In some embodiments, sufficient dry grinding and screening steps are performed on the ASW to result in ASW powder having 70 wt % to 85 wt % limestone powder, granules, and impurities based on the total weight of the ASW powder. In some embodiments, sufficient dry grinding and screening steps are performed on the ASW to result in ASW powder having 75 wt % to 80 wt % limestone powder, granules, and impurities based on the total weight of the ASW powder.

In some embodiments, the grinding steps and screening steps do not comprise wet extraction steps.

In some embodiments, a sufficient amount of the ASW powder and a sufficient amount of an asphalt coating are added to at least one first mixer to form a mixture of the ASW powder and the asphalt coating that comprises 0.1 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 1 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 2 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 10 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 20 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 30 wt % to 50 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 40 wt % to 50 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 0.1 wt % to 40 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 30 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 20 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 10 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 5 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 2 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 0.1 wt % to 1 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 1 wt % to 40 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 2 wt % to 30 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 5 wt % to 20 wt % of ASW powder based on a total weight of the mixture. In some embodiments, a sufficient amount of the ASW powder and a sufficient amount of an asphalt coating are added to at least one first mixer to form a mixture of the ASW powder and the asphalt coating that comprises 10 wt % to 15 wt % of ASW powder based on a total weight of the mixture.

In some embodiments, a sufficient amount of the ASW powder and a sufficient amount of an asphalt coating are added to at least one first mixer to form a mixture of the ASW powder and the asphalt coating that comprises 50 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 60 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 70 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 80 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 90 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 95 wt % to 99.9 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 99 wt % to 99.9 wt % of the asphalt coating based on a total weight of the mixture.

In some embodiments, a sufficient amount of the ASW powder and a sufficient amount of an asphalt coating are added to at least one first mixer to form a mixture of the ASW powder and the asphalt coating that comprises 50 wt % to 99 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 95 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 90 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 80 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 70 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 50 wt % to 60 wt % of the asphalt coating based on a total weight of the mixture.

In some embodiments, a sufficient amount of the ASW powder and a sufficient amount of an asphalt coating are added to at least one first mixer to form a mixture of the ASW powder and the asphalt coating that comprises 60 wt % to 99 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 70 wt % to 95 wt % of the asphalt coating based on a total weight of the mixture. In some embodiments, a sufficient amount of the ASW powder and a sufficient amount of an asphalt coating are added to at least one first mixer to form a mixture of the ASW powder and the asphalt coating that comprises 80 wt % to 90 wt % of the asphalt coating based on a total weight of the mixture.

In some embodiments, the mixture of the ASW powder and the asphalt coating is not subjected to grinding or screening steps. In some embodiments, the mixture of the ASW powder and the asphalt coating is not subjected to grinding steps. In some embodiments, the mixture of the ASW powder and the asphalt coating is not subjected to screening steps.

In some embodiments, asphalt containing (AC) powder is obtained. In some embodiments, the AC powder comprises ASW powder. In some embodiments the AC powder does not comprise ASW powder. In some embodiments, the AC powder comprises a mixture of ASW powder and non-ASW powder. In some embodiments, the AC powder is formed into briquettes as described herein. In some embodiments, the AC powder is obtained as a pre-formed briquette.

In some embodiments, a sufficient amount of the AC powder and a sufficient amount of an asphalt coating are added to at least one first mixer to form a mixture of the AC powder and the asphalt coating that comprises 0.1 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 1 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 2 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 5 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 10 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 20 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 30 wt % to 50 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 40 wt % to 50 wt % of AC powder based on a total weight of the mixture.

In some embodiments, a sufficient amount of the AC powder and a sufficient amount of an asphalt coating are added to at least one first mixer to form a mixture of the AC powder and the asphalt coating that comprises 0.1 wt % to 40 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 30 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 20 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 10 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 5 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 2 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 0.1 wt % to 1 wt % of AC powder based on a total weight of the mixture.

In some embodiments, a sufficient amount of the AC powder and a sufficient amount of an asphalt coating are added to at least one first mixer to form a mixture of the AC powder and the asphalt coating that comprises 1 wt % to 40 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 2 wt % to 30 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 5 wt % to 20 wt % of AC powder based on a total weight of the mixture. In some embodiments, a sufficient amount of the AC powder and a sufficient amount of an asphalt coating are added to at least one first mixer to form a mixture of the AC powder and the asphalt coating that comprises 10 wt % to 15 wt % of AC powder based on a total weight of the mixture.

In some embodiments, a sufficient amount of the AC powder and a sufficient amount of an asphalt coating are added to at least one first mixer to form a mixture of the AC powder and the asphalt coating that comprises 50 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 60 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 70 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 80 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 90 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 95 wt % to 99.9 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 99 wt % to 99.9 wt % of the asphalt coating based on a total weight of the mixture.

In some embodiments, a sufficient amount of the AC powder and a sufficient amount of an asphalt coating are added to at least one first mixer to form a mixture of the AC powder and the asphalt coating that comprises 50 wt % to 99 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 95 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 90 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 80 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 70 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 50 wt % to 60 wt % of the asphalt coating based on a total weight of the mixture.

In some embodiments, a sufficient amount of the AC powder and a sufficient amount of an asphalt coating are added to at least one first mixer to form a mixture of the AC powder and the asphalt coating that comprises 60 wt % to 99 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 70 wt % to 95 wt % of the asphalt coating based on a total weight of the mixture. In some embodiments, a sufficient amount of the AC powder and a sufficient amount of an asphalt coating are added to at least one first mixer to form a mixture of the AC powder and the asphalt coating that comprises 80 wt % to 90 wt % of the asphalt coating based on a total weight of the mixture.

Non-limiting examples of mixers that can be used as the at least first one mixer include, but are not limited to, vertically or horizontally agitated tanks, high or low shear tubular mixers, horizontal paddle mixers, screw transport mixers, continuous high shear mixers, progressive cavity mixing pumps or any combination thereof.

In some embodiments, the at least one first mixer comprises a plurality of first mixers. In some embodiments, the at least one first mixer comprises at least two first mixers. In some embodiments, the at least one first mixer comprises at least three first mixers. In some embodiments, the at least one first mixer comprises at least four first mixers. In some embodiments, the at least one first mixer comprises at least five first mixers. In some embodiments, the at least one first mixer comprises at least ten first mixers. In some embodiments, the at least one first mixer comprises at least twenty first mixers. In some embodiments, the at least one first mixer comprises at least fifty first mixers. In some embodiments, the at least one first mixer comprises at least one-hundred first mixers.

In some embodiments, the at least one first mixer consists of a single mixer. In some embodiments, the at least one first mixer consists of two first mixers. In some embodiments, the at least one first mixer consists of three first mixers. In some embodiments, the at least one first mixer consists of four first mixers. In some embodiments, the at least one first mixer consists of five first mixers. In some embodiments, the at least one first mixer consists of ten first mixers. In some embodiments, the at least one first mixer consists of twenty first mixers. In some embodiments, the at least one first mixer consists of fifty first mixers. In some embodiments, the at least one first mixer consists of one-hundred first mixers.

In some embodiments, the asphalt coating comprises at least one of: oxidized asphalt coating, polymer modified asphalt coating, or mixtures thereof.

In some embodiments, the oxidized asphalt coating is obtained using an asphalt oxidation process. Non-limiting examples of suitable asphalt oxidation processes are described herein, infra. In some embodiments, the oxidized asphalt coating is fed directly from an oxidation process into the at least one first mixer. In some embodiments, the oxidized asphalt coating is oxidized "off-site" and fed from a storage tank into the at least one first mixer.

In some embodiments, the oxidized asphalt coating has a softening point of 190° F. to 250° F. In some embodiments, the oxidized asphalt coating has a softening point of 200° F. to 250° F. In some embodiments, the oxidized asphalt coating has a softening point of 210° F. to 250° F. In some embodiments, the oxidized asphalt coating has a softening point of 220° F. to 250° F. In some embodiments, the oxidized asphalt coating has a softening point of 230° F. to 250° F. In some embodiments, the oxidized asphalt coating has a softening point of 240° F. to 250° F.

In some embodiments, the oxidized asphalt coating has a softening point of 190° F. to 240° F. In some embodiments, the oxidized asphalt coating has a softening point of 190° F. to 230° F. In some embodiments, the oxidized asphalt coating has a softening point of 190° F. to 220° F. In some embodiments, the oxidized asphalt coating has a softening point of 190° F. to 210° F. In some embodiments, the oxidized asphalt coating has a softening point of 190° F. to 200° F.

In some embodiments, the oxidized asphalt coating has a softening point of 200° F. to 240° F. In some embodiments, the oxidized asphalt coating has a softening point of 210° F. to 230° F.

In some embodiments, the oxidized asphalt coating has a penetration point of 15 mm to 45 mm. In some embodiments, the oxidized asphalt coating has a penetration point of 20 mm to 45 mm. In some embodiments, the oxidized asphalt coating has a penetration point of 25 mm to 45 mm. In some embodiments, the oxidized asphalt coating has a penetration point of 30 mm to 45 mm. In some embodiments, the oxidized asphalt coating has a penetration point of 35 mm to 45 mm. In some embodiments, the oxidized asphalt coating has a penetration point of 40 mm to 45 mm.

In some embodiments, the oxidized asphalt coating has a penetration point of 15 mm to 40 mm. In some embodiments, the oxidized asphalt coating has a penetration point of 15 mm to 35 mm. In some embodiments, the oxidized asphalt coating has a penetration point of 15 mm to 30 mm. In some embodiments, the oxidized asphalt coating has a penetration point of 15 mm to 25 mm. In some embodiments, the oxidized asphalt coating has a penetration point of 15 mm to 20 mm.

In some embodiments, the oxidized asphalt coating has a penetration point of 20 mm to 40 mm. In some embodiments, the oxidized asphalt coating has a penetration point of 25 mm to 35 mm.

In some embodiments, the oxidized asphalt coating has a viscosity of 200 cP to 1,000 cP. In some embodiments, the oxidized asphalt coating has a viscosity of 300 cP to 1,000 cP. In some embodiments, the oxidized asphalt coating has a viscosity of 400 cP to 1,000 cP. In some embodiments, the oxidized asphalt coating has a viscosity of 500 cP to 1,000 cP. In some embodiments, the oxidized asphalt coating has a viscosity of 600 cP to 1,000 cP. In some embodiments, the oxidized asphalt coating has a viscosity of 700 cP to 1,000 cP. In some embodiments, the oxidized asphalt coating has a viscosity of 800 cP to 1,000 cP. In some embodiments, the oxidized asphalt coating has a viscosity of 900 cP to 1,000 cP.

In some embodiments, the oxidized asphalt coating has a viscosity of 200 cP to 1,000 cP. In some embodiments, the oxidized asphalt coating has a viscosity of 200 cP to 900 cP. In some embodiments, the oxidized asphalt coating has a viscosity of 200 cP to 800 cP. In some embodiments, the oxidized asphalt coating has a viscosity of 200 cP to 700 cP. In some embodiments, the oxidized asphalt coating has a viscosity of 200 cP to 600 cP. In some embodiments, the oxidized asphalt coating has a viscosity of 200 cP to 500 cP. In some embodiments, the oxidized asphalt coating has a viscosity of 200 cP to 400 cP. In some embodiments, the oxidized asphalt coating has a viscosity of 200 cP to 300 cP.

In some embodiments, the oxidized asphalt coating has a viscosity of 300 cP to 900 cP. In some embodiments, the oxidized asphalt coating has a viscosity of 400 cP to 800 cP. In some embodiments, the oxidized asphalt coating has a viscosity of 500 cP to 700 cP.

In some embodiments, the polymer modified asphalt coating is a poly(styrene-butadiene-styrene) (SBS) modified asphalt coating, a poly(styrene-ethylene/butylene-styrene) (SEBS) modified asphalt coating, an atactic polypropylene (APP) modified asphalt coating, an isotactic polypropylene (IPP) modified asphalt coating, or any mixture thereof.

In some embodiments, the polymer modified asphalt coating comprises 3 wt % to 12 wt % of at least one polymer by weight of the polymer modified asphalt coating. In some embodiments, the polymer modified asphalt coating comprises 4 wt % to 12 wt % of at least one polymer by weight of the polymer modified asphalt coating. In some embodiments, the polymer modified asphalt coating comprises 5 wt % to 12 wt % of at least one polymer by weight of the polymer modified asphalt coating. In some embodiments, the polymer modified asphalt coating comprises 6 wt % to 12 wt % of at least one polymer by weight of the polymer modified asphalt coating. In some embodiments, the polymer modified asphalt coating comprises 7 wt % to 12 wt % of at least one polymer by weight of the polymer modified asphalt coating. In some embodiments, the polymer modified asphalt coating comprises 8 wt % to 12 wt % of at least one polymer by weight of the polymer modified asphalt coating. In some embodiments, the polymer modified asphalt coating comprises 9 wt % to 12 wt % of at least one polymer by weight of the polymer modified asphalt coating. In some embodiments, the polymer modified asphalt coating comprises 10 wt % to 12 wt % of at least one polymer by weight of the polymer modified asphalt coating. In some embodiments, the polymer modified asphalt coating comprises 11 wt % to 12 wt % of at least one polymer by weight of the polymer modified asphalt coating.

In some embodiments, the polymer modified asphalt coating comprises 3 wt % to 11 wt % of at least one polymer by weight of the polymer modified asphalt coating. In some embodiments, the polymer modified asphalt coating comprises 3 wt % to 10 wt % of at least one polymer by weight of the polymer modified asphalt coating. In some embodiments, the polymer modified asphalt coating comprises 3 wt % to 9 wt % of at least one polymer by weight of the polymer modified asphalt coating. In some embodiments, the polymer modified asphalt coating comprises 3 wt % to 8 wt % of at least one polymer by weight of the polymer modified asphalt coating. In some embodiments, the polymer modified asphalt coating comprises 3 wt % to 7 wt % of at least one polymer by weight of the polymer modified asphalt coating. In some embodiments, the polymer modified asphalt coating comprises 3 wt % to 6 wt % of at least one polymer by weight of the polymer modified asphalt coating. In some embodiments, the polymer modified asphalt coating comprises 3 wt % to 5 wt % of at least one polymer by weight of the polymer modified asphalt coating. In some embodiments, the polymer modified asphalt coating comprises 3 wt % to 4 wt % of at least one polymer by weight of the polymer modified asphalt coating.

In some embodiments, the polymer modified asphalt coating comprises 4 wt % to 11 wt % of at least one polymer by weight of the polymer modified asphalt coating. In some embodiments, the polymer modified asphalt coating comprises 5 wt % to 10 wt % of at least one polymer by weight of the polymer modified asphalt coating. In some embodiments, the polymer modified asphalt coating comprises 6 wt % to 9 wt % of at least one polymer by weight of the polymer modified asphalt coating. In some embodiments, the polymer modified asphalt coating comprises 7 wt % to 8 wt % of at least one polymer by weight of the polymer modified asphalt coating.

In some embodiments, the polymer modified asphalt coating has a softening point of 190° F. to 250° F. In some embodiments, the polymer modified asphalt coating has a softening point of 200° F. to 250° F. In some embodiments, the polymer modified asphalt coating has a softening point of 210° F. to 250° F. In some embodiments, the polymer modified asphalt coating has a softening point of 220° F. to 250° F. In some embodiments, the polymer modified asphalt coating has a softening point of 230° F. to 250° F. In some embodiments, the polymer modified asphalt coating has a softening point of 240° F. to 250° F.

In some embodiments, the polymer modified asphalt coating has a softening point of 190° F. to 240° F. In some embodiments, the polymer modified asphalt coating has a softening point of 190° F. to 230° F. In some embodiments, the polymer modified asphalt coating has a softening point of 190° F. to 220° F. In some embodiments, the polymer modified asphalt coating has a softening point of 190° F. to 210° F. In some embodiments, the polymer modified asphalt coating has a softening point of 190° F. to 200° F.

In some embodiments, the polymer modified asphalt coating has a softening point of 200° F. to 240° F. In some embodiments, the polymer modified asphalt coating has a softening point of 210° F. to 230° F.

In some embodiments, the polymer modified asphalt coating has a penetration point of 15 mm to 45 mm. In some embodiments, the polymer modified asphalt coating has a penetration point of 20 mm to 45 mm. In some embodiments, the polymer modified asphalt coating has a penetration point of 25 mm to 45 mm. In some embodiments, the polymer modified asphalt coating has a penetration point of 30 mm to 45 mm. In some embodiments, the polymer modified asphalt coating has a penetration point of 35 mm to 45 mm. In some embodiments, the polymer modified asphalt coating has a penetration point of 40 mm to 45 mm.

In some embodiments, the polymer modified asphalt coating has a penetration point of 15 mm to 40 mm. In some embodiments, the polymer modified asphalt coating has a penetration point of 15 mm to 35 mm. In some embodiments, the polymer modified asphalt coating has a penetration point of 15 mm to 30 mm. In some embodiments, the polymer modified asphalt coating has a penetration point of 15 mm to 25 mm. In some embodiments, the polymer modified asphalt coating has a penetration point of 15 mm to 20 mm.

In some embodiments, the polymer modified asphalt coating has a penetration point of 20 mm to 40 mm. In some embodiments, the polymer modified asphalt coating has a penetration point of 25 mm to 35 mm.

In some embodiments, the polymer modified asphalt coating has a viscosity of 200 cP to 1,000 cP. In some embodiments, the polymer modified asphalt coating has a viscosity of 300 cP to 1,000 cP. In some embodiments, the polymer modified asphalt coating has a viscosity of 400 cP to 1,000 cP. In some embodiments, the polymer modified asphalt coating has a viscosity of 500 cP to 1,000 cP. In some embodiments, the polymer modified asphalt coating has a viscosity of 600 cP to 1,000 cP. In some embodiments, the polymer modified asphalt coating has a viscosity of 700 cP to 1,000 cP. In some embodiments, the polymer modified asphalt coating has a viscosity of 800 cP to 1,000 cP. In some embodiments, the polymer modified asphalt coating has a viscosity of 900 cP to 1,000 cP.

In some embodiments, the polymer modified asphalt coating has a viscosity of 200 cP to 1,000 cP. In some embodiments, the polymer modified asphalt coating has a viscosity of 200 cP to 900 cP. In some embodiments, the polymer modified asphalt coating has a viscosity of 200 cP to 800 cP. In some embodiments, the polymer modified asphalt coating has a viscosity of 200 cP to 700 cP. In some embodiments, the polymer modified asphalt coating has a viscosity of 200 cP to 600 cP. In some embodiments, the polymer modified asphalt coating has a viscosity of 200 cP to 500 cP. In some embodiments, the polymer modified asphalt coating has a viscosity of 200 cP to 400 cP. In some embodiments, the polymer modified asphalt coating has a viscosity of 200 cP to 300 cP.

In some embodiments, the polymer modified asphalt coating has a viscosity of 300 cP to 900 cP. In some embodiments, the polymer modified asphalt coating has a viscosity of 400 cP to 800 cP. In some embodiments, the polymer modified asphalt coating has a viscosity of 500 cP to 700 cP.

In some embodiments, the mixture of: the ASW powder, the AC powder, or any combination thereof; and the asphalt coating is heated to form a heated mixture. Non-limiting examples of heaters that can be used to form the heated mixture include heat exchangers, horizontal or vertical direct fired heaters, horizontal or vertical indirect-fired (convection) heaters, fire-tube heaters, fluid tube heaters or any combination thereof. Non-limiting examples of heat exchangers include shell and tube heat exchangers with asphalt on either the shell or tube side, plate heat exchangers, heat recovery heat exchangers or any combination thereof.

In some embodiments, the mixture of: the ASW powder, the AC powder, or any combination thereof and the asphalt coating is heated using at least one heater to form the heated mixture. In some embodiments, the mixture of: the ASW powder, the AC powder, or any combination thereof and the asphalt coating is heated using a plurality of heaters to form the heated mixture. In some embodiments, the mixture of: the ASW powder, the AC powder, or any combination thereof and the asphalt coating is heated using at least two heaters to form the heated mixture. In some embodiments, the mixture of: the ASW powder, the AC powder, or any combination thereof; and the asphalt coating is heated using at least three heaters to form the heated mixture. In some embodiments, the mixture of: the ASW powder, the AC powder, or any combination thereof; and the asphalt coating is heated using at least four heaters to form the heated mixture. In some embodiments, the mixture of: the ASW powder, the AC powder, or any combination thereof; and the asphalt coating is heated using at least five heaters to form the heated mixture. In some embodiments, the mixture of: the ASW powder, the AC powder, or any combination thereof; and the asphalt coating is heated using at least ten heaters to form the heated mixture. In some embodiments, the mixture of: the ASW powder, the AC powder, or any combination thereof; and the asphalt coating is heated using at least twenty heaters to form the heated mixture. In some embodiments, the mixture of: the ASW powder, the AC powder, or any combination thereof; and the asphalt coating is heated in at least fifty heaters to form the heated mixture. In some embodiments, the mixture of: the ASW powder, the AC powder, or any combination thereof; and the asphalt coating is heated using at least one-hundred heaters to form the heated mixture. In some embodiments, the mixture of: the ASW powder, the AC powder, or any combination thereof; and the asphalt coating is heated using one heater to form the heated mixture. In some embodiments, the mixture of: the ASW powder, the AC powder, or any combination thereof; and the asphalt coating is heated using two heaters to form the heated mixture. In some embodiments, the mixture of: the ASW powder, the AC powder, or any combination thereof; and the asphalt coating is heated using three heaters to form the heated mixture. In some embodiments, the mixture of: the ASW powder, the AC powder, or any combination thereof; and the asphalt coating is heated using four heaters to form the heated mixture. In some embodiments, the mixture of: the ASW powder, the AC powder, or any combination thereof; and the asphalt coating is heated using five heaters to form the heated mixture. In some embodiments, the mixture of: the ASW powder, the AC powder, or any combination thereof; and the asphalt coating is heated using ten heaters to form the heated mixture. In some embodiments, the mixture of: the ASW powder, the AC powder, or any combination thereof; and the asphalt coating is heated using twenty heaters to form the heated mixture. In some embodiments, the mixture of: the ASW powder, the AC powder, or any combination thereof; and the asphalt coating is heated using fifty heaters to form the heated mixture. In some embodiments, the mixture of: the ASW powder, the AC powder, or any combination thereof; and the asphalt coating is heated using one-hundred heaters to form the heated mixture.

In some embodiments, the heated mixture has a temperature in a range of 400° F. to 500° F. In some embodiments, the heated mixture has a temperature in a range of 410° F. to 500° F. In some embodiments, the heated mixture has a temperature in a range of 410° F. to 500° F. In some embodiments, the heated mixture has a temperature in a range of 420° F. to 500° F. In some embodiments, the heated mixture has a temperature in a range of 430° F. to 500° F. In some embodiments, the heated mixture has a temperature in a range of 440° F. to 500° F. In some embodiments, the heated mixture has a temperature in a range of 450° F. to 500° F. In some embodiments, the heated mixture has a temperature in a range of 460° F. to 500° F. In some embodiments, the heated mixture has a temperature in a range of 470° F. to 500° F. In some embodiments, the heated mixture has a temperature in a range of 480° F. to 500° F. In some embodiments, the heated mixture has a temperature in a range of 490° F. to 500° F.

In some embodiments, the heated mixture has a temperature in a range of 400° F. to 490° F. In some embodiments, the heated mixture has a temperature in a range of 400° F. to 480° F. In some embodiments, the heated mixture has a temperature in a range of 400° F. to 470° F. In some embodiments, the heated mixture has a temperature in a range of 400° F. to 460° F. In some embodiments, the heated mixture has a temperature in a range of 400° F. to 450° F. In some embodiments, the heated mixture has a temperature in a range of 400° F. to 440° F. In some embodiments, the heated mixture has a temperature in a range of 400° F. to 430° F. In some embodiments, the heated mixture has a temperature in a range of 400° F. to 420° F. In some embodiments, the heated mixture has a temperature in a range of 400° F. to 410° F.

In some embodiments, the heated mixture has a temperature in a range of 410° F. to 490° F. In some embodiments, the heated mixture has a temperature in a range of 420° F. to 480° F. In some embodiments, the heated mixture has a temperature in a range of 430° F. to 470° F. In some embodiments, the heated mixture has a temperature in a range of 440° F. to 460° F.

In some embodiments, the mixture of: the ASW powder, the AC powder, or any combination thereof; and the asphalt coating is homogenized, using at least one homogenizer, before heating, after heating, or any combination thereof. In some embodiments, the mixture of: the ASW powder, the AC powder, or any combination thereof; and the asphalt coating is homogenized, using a plurality of homogenizers, before heating, after heating, or any combination thereof.

In some embodiments, the mixture of: the ASW powder, the AC powder, or any combination thereof; and the asphalt coating is homogenized, using at least two homogenizers, before heating, after heating, or any combination thereof. In some embodiments, the mixture of: the ASW powder, the AC powder, or any combination thereof; and the asphalt coating is homogenized, using at least three homogenizers, before heating, after heating, or any combination thereof. In some embodiments, the mixture of: the ASW powder, the AC powder, or any combination thereof; and the asphalt coating is homogenized, using at least four homogenizers, before heating, after heating, or any combination thereof. In some embodiments, the mixture of the mixture of: the ASW powder, the AC powder, or any combination thereof; and the asphalt coating is homogenized, using at least five homogenizers, before heating, after heating, or any combination thereof. In some embodiments, the mixture of: the ASW powder, the AC powder, or any combination thereof and the asphalt coating is homogenized, using at least ten homogenizers, before heating, after heating, or any combination thereof. In some embodiments, the mixture of: the ASW powder, the AC powder, or any combination thereof; and the asphalt coating is homogenized, using at least twenty homogenizers, before heating, after heating, or any combination thereof. In some embodiments, the mixture of: the ASW powder, the AC powder, or any combination thereof; and the asphalt coating is homogenized, using at least fifty homogenizers, before heating, after heating, or any combination thereof. In some embodiments, the mixture of: the ASW powder, the AC powder, or any combination thereof; and the asphalt coating is homogenized, using at least one-hundred homogenizers, before heating, after heating, or any combination thereof.

In some embodiments, the mixture of: the ASW powder, the AC powder, or any combination thereof; and the asphalt coating is homogenized, using one homogenizer, before heating, after heating, or any combination thereof. In some embodiments the mixture of: the ASW powder, the AC powder, or any combination thereof; and the asphalt coating is homogenized, using two homogenizers, before heating, after heating, or any combination thereof. In some embodiments, the mixture of: the ASW powder, the AC powder, or any combination thereof; and the asphalt coating is homogenized, using three homogenizers, before heating, after heating, or any combination thereof. In some embodiments, the mixture of: the ASW powder, the AC powder, or any combination thereof; and the asphalt coating is homogenized, using four homogenizers, before heating, after heating, or any combination thereof. In some embodiments, the mixture of: the ASW powder, the AC powder, or any combination thereof; and the asphalt coating is homogenized, using five homogenizers, before heating, after heating, or any combination thereof. In some embodiments, the mixture of: the ASW powder, the AC powder, or any combination thereof and the asphalt coating is homogenized, using ten homogenizers, before heating, after heating, or any combination thereof. In some embodiments, the mixture of: the ASW powder, the AC powder, or any combination thereof; and the asphalt coating is homogenized, using twenty homogenizers, before heating, after heating, or any combination thereof. In some embodiments, the mixture of: the ASW powder, the AC powder, or any combination thereof; and the asphalt coating is homogenized, using fifty homogenizers, before heating, after heating, or any combination thereof. In some embodiments, the mixture of: the ASW powder, the AC powder, or any combination thereof; and the asphalt coating is homogenized, using one-hundred homogenizers, before heating, after heating, or any combination thereof.

In some embodiments, any number of heaters may be located upstream from any number of homogenizers, downstream from any number of homogenizers, or any combination thereof.

In some embodiments, the heated mixture of: the ASW powder, the AC powder, or any combination thereof and the asphalt coating is conveyed to at least one second mixer. In some embodiments, the at least one second mixer is of the same type as the at least one first mixer. In some embodiments, the at least one second mixer is of a different type than the at least one first mixer Non-limiting examples of mixers that can be used as the at least one second mixer include, vertically or horizontally agitated tanks, high or low shear tubular mixers, horizontal paddle mixers, screw transport mixers, continuous high shear mixers, progressive cavity mixing pumps or any combination thereof.

In some embodiments, the at least one second mixer comprises a plurality of second mixers. In some embodiments, the at least one second mixer comprises at least two second mixers. In some embodiments, the at least one second mixer comprises at least three second mixers. In some embodiments, the at least one second mixer comprises at least four second mixers. In some embodiments, the at least one second mixer comprises at least five second mixers. In some embodiments, the at least one second mixer comprises at least ten second mixers. In some embodiments, the at least one second mixer comprises at least twenty second mixers. In some embodiments, the at least one second mixer comprises at least fifty second mixers. In some embodiments, the at least one second mixer comprises at least one-hundred second mixers.

In some embodiments, the at least one second mixer consists of a single second mixer. In some embodiments, the at least one second mixer consists of two second mixers. In some embodiments, the at least one second mixer consists of three second mixers. In some embodiments, the at least one second mixer consists of four second mixers. In some embodiments, the at least one second mixer consists of five second mixers. In some embodiments, the at least one second mixer consists of ten second mixers. In some embodiments, the at least one second mixer consists of twenty second mixers. In some embodiments, the at least one second mixer consists of fifty second mixers. In some embodiments, the at least one second mixer consists of one-hundred second mixers.

In some embodiments, a sufficient amount of at least one filler material is mixed with the heated mixture in the at least one second mixer to obtain an ASW powder filled coating, an AC powder filled coating, or combination thereof that comprises 30 wt % to 50 wt % asphalt based on the total weight of the ASW powder filled coating, the AC powder filled coating, or combination thereof. In some embodiments, a sufficient amount of at least one filler material is mixed with the heated mixture in the at least one second mixer to obtain a ASW powder filled coating, an AC powder filled coating, or combination thereof that comprises 35 wt % to 50 wt % asphalt based on the total weight of the ASW powder filled coating, the AC powder filled coating, or combination thereof. In some embodiments, a sufficient amount of at least one filler material is mixed with the heated mixture in the at least one second mixer to obtain an ASW powder filled coating, an AC powder filled coating, or combination thereof that comprises 40 wt % to 50 wt % asphalt based on the total weight of the ASW powder filled coating, the AC powder filled coating, or combination thereof. In some embodiments, a sufficient amount of at least one filler material is mixed with the heated mixture in the at least one second mixer to obtain an ASW powder filled coating, an AC powder filled coating, or combination thereof that comprises 45 wt % to 50 wt % asphalt based on the total weight of the ASW powder filled coating, the AC powder filled coating, or combination thereof.

In some embodiments, a sufficient amount of at least one filler material is mixed with the heated mixture in the at least one second mixer to obtain an ASW powder filled coating, an AC powder filled coating, or combination thereof that comprises 30 wt % to 45 wt % asphalt based on the total weight of the ASW powder filled coating, the AC powder filled coating, or combination thereof. In some embodiments, a sufficient amount of at least one filler material is mixed with the heated mixture in the at least one second mixer to an ASW powder filled coating, an AC powder filled coating, or combination thereof that comprises 30 wt % to 40 wt % asphalt based on the total weight of the ASW powder filled coating, the AC powder filled coating, or combination thereof. In some embodiments, a sufficient amount of at least one filler material is mixed with the heated mixture in the at least one second mixer to obtain an ASW powder filled coating, an AC powder filled coating, or combination thereof that comprises 30 wt % to 35 wt % asphalt based on the total weight of the ASW powder filled coating, the AC powder filled coating, or combination thereof.

In some embodiments, a sufficient amount of at least one filler material is mixed with the heated mixture in the at least one second mixer to obtain an ASW powder filled coating, an AC powder filled coating, or combination thereof that comprises 35 wt % to 45 wt % asphalt based on the total weight of the ASW or AC powder filled coating.

In some embodiments, a sufficient amount of at least one filler material is mixed with the heated mixture in the at least one second mixer to obtain an ASW powder filled coating, an AC powder filled coating, or combination thereof that comprises 50 wt % to 70 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 65 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 60 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 50 wt % to 55 wt % of: limestone powder, granules, impurities, and the at least one filler material based on the total weight of the ASW powder filled coating or AC powder filled coating.

In some embodiments, a sufficient amount of at least one filler material is mixed with the heated mixture in the at least one second mixer to obtain an ASW powder filled coating, an AC powder filled coating, or combination thereof that comprises 55 wt % to 70 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 60 wt % to 70 wt % of: limestone powder, granules, impurities, and the at least one filler material based on the total weight of the ASW powder filled coating or AC powder filled coating. In some embodiments, a sufficient amount of at least one filler material is mixed with the heated mixture in the at least one second mixer to obtain an ASW powder filled coating, an AC powder filled coating, or combination thereof that comprises 65 wt % to 70 wt % of: limestone powder, granules, impurities, and the at least one filler material based on the total weight of the ASW powder filled coating, the AC powder filled coating, or combination thereof.

In some embodiments, a sufficient amount of at least one filler material is mixed with the heated mixture in the at least one second mixer to obtain an ASW powder filled coating, an AC powder filled coating, or combination thereof that comprises 55 wt % to 60 wt % of: limestone powder, granules, impurities, and the at least one filler material based on the total weight of the ASW powder filled coating or AC powder filled coating.

In some embodiments, the at least one filler material is subjected to a dust-collection step. In some embodiments, the at least one filler material is heated before the at least one filler material is added the at least one second mixer.

A non-limiting example of the at least one filler material is limestone powder. Other non-limiting examples of the at least one filler material include flyash, fiberglass particles, stone dust, and combinations thereof.

In some embodiments, the weight percentage of asphalt in the ASW powder filled coating, based on the total weight of the ASW powder filled coating, is the same as a weight percentage of asphalt in a powder filled coating that does not contain any ASW.

In some embodiments, a softening point of the ASW powder filled coating is the same as a softening point of a powder filled coating that does not contain any ASW. In some embodiments, a penetration point of the ASW powder filled coating is the same as a penetration point of a powder filled coating that does not contain any ASW.

In some embodiments, the ASW powder filled coating comprises 1 wt % to 40 wt % of the ASW powder based on the total weight of the ASW powder filled coating. In some embodiments, the ASW powder filled coating comprises 5 wt % to 40 wt % of the ASW powder based on the total weight of the ASW powder filled coating. In some embodiments, the ASW powder filled coating comprises 10 wt % to 40 wt % of the ASW powder based on the total weight of the ASW powder filled coating. In some embodiments, the ASW powder filled coating comprises 20 wt % to 40 wt % of the ASW powder based on the total weight of the ASW powder filled coating. In some embodiments, the ASW powder filled coating comprises 30 wt % to 40 wt % of the ASW powder based on the total weight of the ASW powder filled coating.

In some embodiments, the ASW powder filled coating comprises 1 wt % to 30 wt % of the ASW powder based on the total weight of the ASW powder filled coating. In some embodiments, the ASW powder filled coating comprises 1 wt % to 20 wt % of the ASW powder based on the total weight of the ASW powder filled coating. In some embodiments, the ASW powder filled coating comprises 1 wt % to 10 wt % of the ASW powder based on the total weight of the ASW powder filled coating. In some embodiments, the ASW powder filled coating comprises 1 wt % to 5 wt % of the ASW powder based on the total weight of the ASW powder filled coating.

In some embodiments, the ASW powder filled coating comprises 5 wt % to 40 wt % of the ASW powder based on the total weight of the ASW powder filled coating. In some embodiments, the ASW powder filled coating comprises 10 wt % to 30 wt % of the ASW powder based on the total weight of the ASW powder filled coating. In some embodiments, the ASW powder filled coating comprises 15 wt % to 20 wt % of the ASW powder based on the total weight of the ASW powder filled coating. In some embodiments, the ASW powder filled coating comprises 20 wt % to 25 wt % of the ASW powder based on the total weight of the ASW powder filled coating.

In some embodiments where the at least one filler material comprises limestone powder, the ASW powder filled coating, the AC powder filled coating, or combination thereof can comprise 50% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 55% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 60% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 65% to 70% of: limestone powder, granules, and impurities based on the total weight of the ASW powder filled coating, the AC powder filled coating, or combination thereof.

In some embodiments where the at least one filler material comprises limestone powder, the ASW powder filled coating, the AC powder filled coating, or combination thereof can comprise 55% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 60% to 70% of: limestone powder, granules, and impurities based on the total weight of the ASW powder filled coating, the AC powder filled coating, or combination thereof. In some embodiments where the at least one filler material comprises limestone powder, the ASW powder filled coating, the AC powder filled coating, or combination thereof can comprise 65% to 70% of: limestone powder, granules, and impurities based on the total weight of the ASW powder filled coating, the AC powder filled coating, or combination thereof.

In some embodiments where the at least one filler material comprises limestone powder, the ASW powder filled coating, the AC powder filled coating, or combination thereof can comprise 55% to 60% of: limestone powder, granules, and impurities based on the total weight of the ASW powder filled coating, the AC powder filled coating, or combination thereof.

In some embodiments, the ASW powder filled coating, the AC powder filled coating, or combination thereof may be homogenized. In some embodiments, any number of homogenizers, heaters, or mixers may be added at any stage of the method without deviating from the scope of the present disclosure.

In some embodiments, the ASW powder filled coating, the AC powder filled coating, or combination thereof has a viscosity of 100 cP to 20,000 cP. In some embodiments, the ASW powder filled coating, the AC powder filled coating, or combination thereof has a viscosity of 500 cP to 20,000 cP. In some embodiments, the ASW powder filled coating, the AC powder filled coating, or combination thereof has a viscosity of 1,000 cP to 20,000 cP. In some embodiments, the ASW powder filled coating, the AC powder filled coating, or combination thereof has a viscosity of 5,000 cP to 20,000 cP. In some embodiments, the ASW powder filled coating, the AC powder filled coating, or combination thereof has a viscosity of 10,000 cP to 20,000 cP. In some embodiments, the ASW powder filled coating, the AC powder filled coating, or combination thereof has a viscosity of 15,000 cP to 20,000 cP.

In some embodiments, the ASW powder filled coating, the AC powder filled coating, or combination thereof has a viscosity of 100 cP to 15,000 cP. In some embodiments, the ASW powder filled coating, the AC powder filled coating, or combination thereof has a viscosity of 100 cP to 10,000 cP. In some embodiments, the ASW powder filled coating, the AC powder filled coating, or combination thereof has a viscosity of 100 cP to 5,000 cP. In some embodiments, the ASW powder filled coating, the AC powder filled coating, or combination thereof has a viscosity of 100 cP to 1,000 cP. In some embodiments, the ASW powder filled coating, the AC powder filled coating, or combination thereof has a viscosity of 100 cP to 500 cP.

In some embodiments, the ASW powder filled coating, the AC powder filled coating, or combination thereof has a viscosity of 500 cP to 15,000 cP. In some embodiments, the ASW powder filled coating, the AC powder filled coating, or combination thereof has a viscosity of 1,000 cP to 10,000 cP. In some embodiments, the ASW powder filled coating, the AC powder filled coating, or combination thereof has a viscosity of 5,000 cP.

In some embodiments, the ASW powder filled coating, the AC powder filled coating, or combination thereof is applied to a fiberglass mat to form a coated fiberglass mat. In some embodiments, at least one of granules or sand are applied to the coated fiberglass mat to form an asphalt shingle.

In some embodiments, the processed asphalt shingle waste comprises at least one of an asphalt shingle waste powder, an asphalt-containing powder, a plurality of briquettes, an asphalt-containing coating, an asphalt shingle waste filled coating, an asphalt shingle waste powder filled coating, an asphalt-containing powder filled coating, or any combination thereof.

In some embodiments, the system and method 100 for drying asphalt shingle waste is a continuous process. In some embodiments, the system and method 100 for drying asphalt shingle waste is a non-continuous process. In some embodiments, the system and method 100 for drying asphalt shingle waste is a batch process. In some embodiments, the system and method 100 for drying asphalt shingle waste does not comprise a step of heating the asphalt shingle waste. In some embodiments, the system and method 100 for drying asphalt shingle waste does not comprise a step of cooling the asphalt shingle waste. In some embodiments, the system and method 100 for drying asphalt shingle waste does not comprise a tumble dryer.

Figure 2:
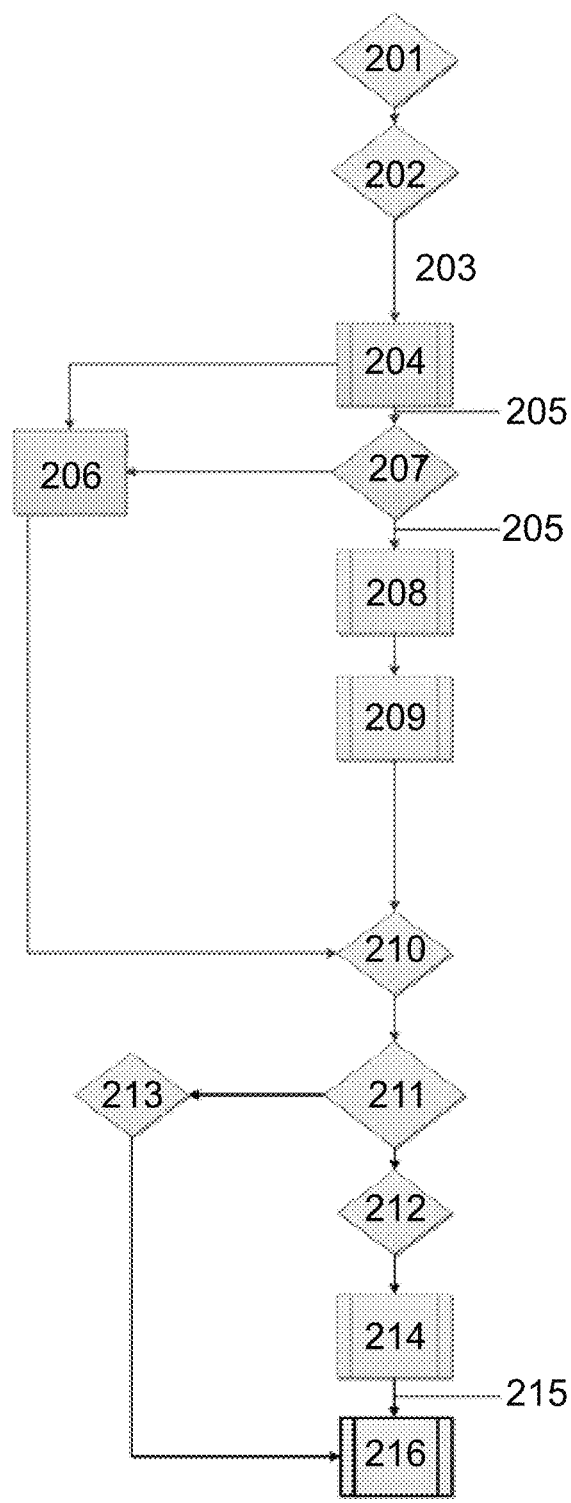
FIG. 2 is a schematic diagram of a system and method for drying asphalt shingle waste, according to some embodiments.
Figure 4:
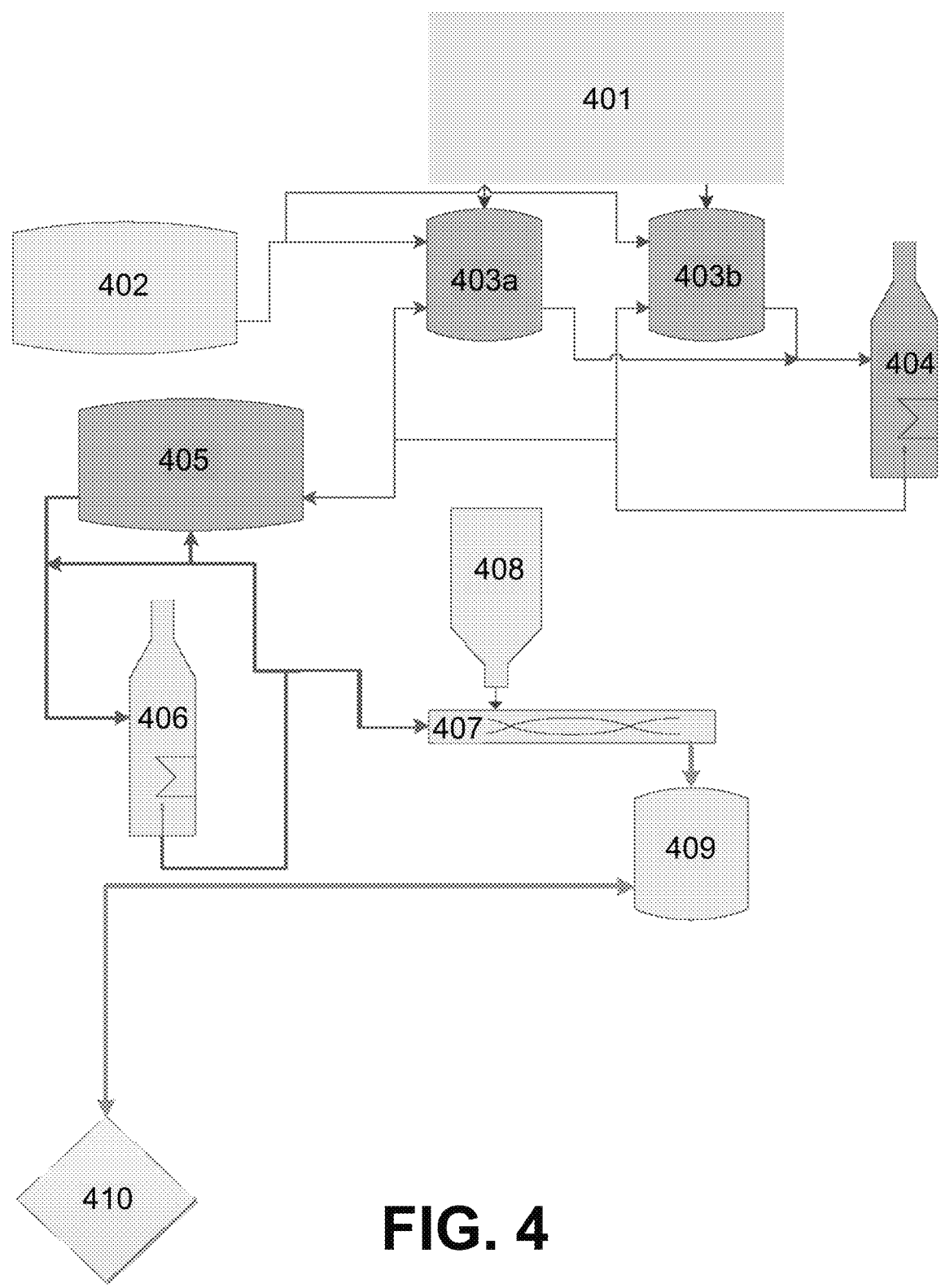
FIG. 4 is a schematic diagram of continuous system and method for processing asphalt shingle waste, according to some embodiments.

FIG. 2 is a flowchart of a method for processing asphalt shingle waste, according to some embodiments. As shown in FIG. 2, in some embodiments, asphalt shingle waste (ASW) 201 may be obtained. In some embodiments, the ASW 201 is subjected to a grinding step 2h02 to form ground ASW particles. In some embodiments, the ground ASW particles 203 are subjected to a screening step 204 to form a first set of ASW particles 205 and a second set of ASW particles 206. In some embodiments, the screening step 204 is performed with a rotary screener. In some embodiments, some or all of the granules are removed from the first set of ASW particles 205 using rotary impact separator 207. While not depicted in FIG. 2, rotary impact separator 207 may also remove some or all of the granules from the second set of ASW particles 206. In some embodiments, the first set of particles 205 is subjected to a grinding step 208, so as to form a third set of ASW particles 209. In some embodiments the second set of ASW particles 206 and the third set of ASW particles 209 may be combined to form a combination 210 of the second and third sets of ASW particles. In some embodiments, the combination 210 of the second and third sets of ASW particles 210 is fed into an air separator 211, where the combination 210 of the second and third sets of ASW particles are separated into a fourth set of ASW particles 212 and a fifth set of ASW particles 213. In some embodiments, the fourth set of ASW particles 212 is subjected to a grinding step 214, so as to form a sixth set of ASW particles 215. In some embodiments, the fifth set of ASW particles 213 and the sixth set of ASW particles 215 are combined to form ASW powder 216. In some embodiments, ASW powder 216 is combined with an asphalt coating to form a partially filled asphalt coating, as shown in FIG. 4 and described herein, infra. In some embodiments, limestone or other filler material may be added to the partially filled asphalt coating to form a filled asphalt coating, as shown in FIG. 4 and described herein, infra. In some embodiments, the filled asphalt coating (not shown) is incorporated into a roofing shingle (not shown).

Figure 3:
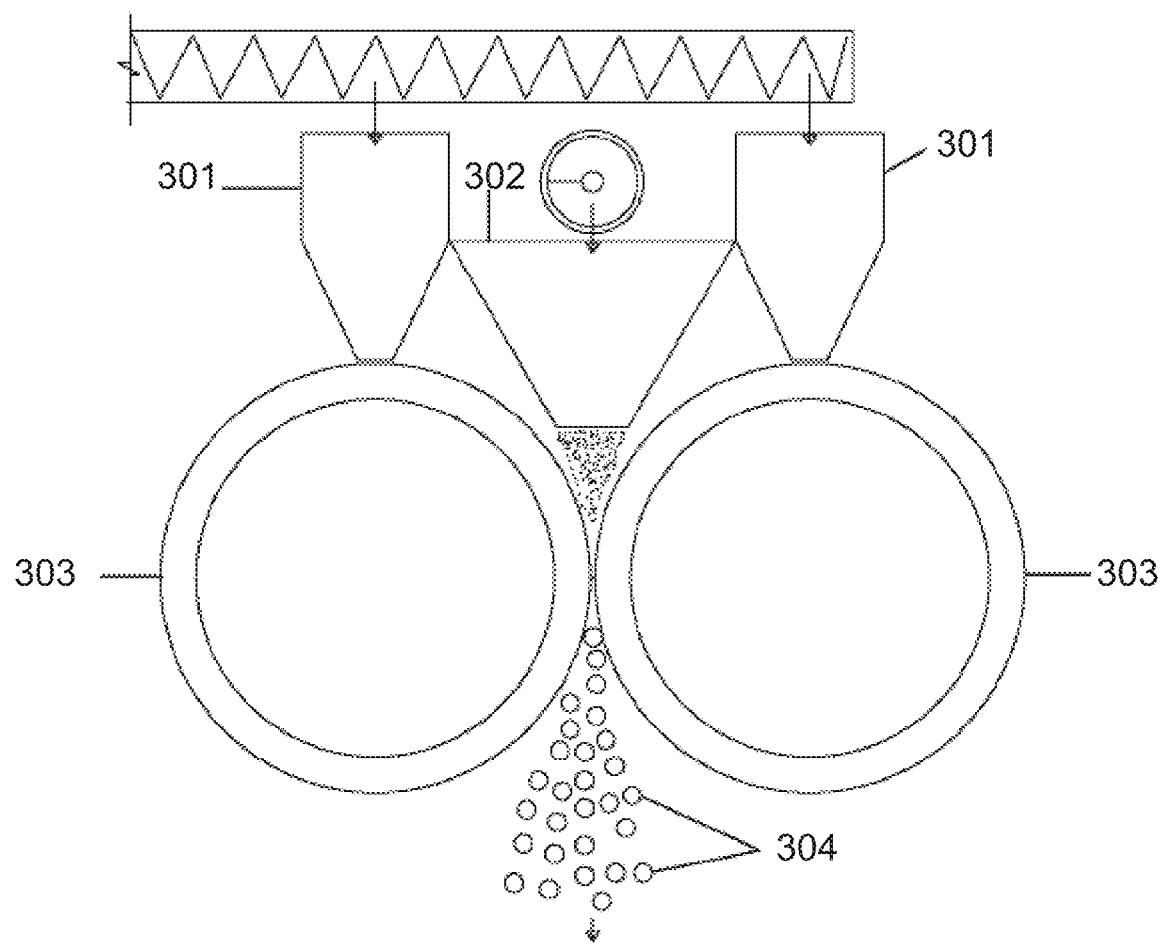
FIG. 3 is a schematic diagram of a briquetting system and method, according to some embodiments.

FIG. 3 is a non-limiting example of a briquetting method according to the present disclosure. As shown, in some embodiments, limestone powder, other filler, or combination thereof 301 coats compression wheels 303. The ASW powder, AC powder, or combination thereof 302 is fed between the coated compression wheels 303. The compression wheels 303 apply a sufficient pressure to: the limestone powder, other filler, or combination thereof 301; and the ASW powder, AC powder, or combination thereof 302, so as to form a plurality of briquettes 304.

FIG. 4 depicts an exemplary non-limiting method according to some embodiments of the present disclosure showing a continuous process of producing an ASW powder filled coating, the AC powder filled coating, or combination thereof as described herein. The non-limiting example of FIG. 4 may include the following steps detailed below.

Sufficient grinding and screening steps (not shown) may be performed on ASW to result in ASW powder 401 having the average particle size described herein. In some embodiments, an AC powder 401 can be obtained. In some embodiments a combination 401 of ASW powder and AC powder can be obtained.

A specified amount of the ASW powder, the AC powder, or combination thereof 401 described herein, is combined with a specified amount of asphalt coating, described herein in tank 402 and fed into first mixers 403a and 403b, where a sufficient amount of shear is applied so as to form a mixture of: ASW powder, AC powder, or combination thereof; and asphalt coating, as described herein. While the embodiment of FIG. 4 depicts two first mixers 403a and 403b, in some embodiments, a single first mixer can be used.

Heat exchanger 404 heats the mixture of: ASW powder, AC powder, or combination thereof; and asphalt coating to a specified temperature so as to form a heated mixture of the ASW or AC powder and the asphalt coating, as described herein. While the embodiment of FIG. 4 depicts heat exchanger 404, any heater or combination of heaters described herein can be used.

A specified amount of the heated mixture of: the ASW powder, AC powder, or combination thereof; and the asphalt coating can be fed into storage tank 405. The storage tank 405 may be in thermal communication with a heater, such as heat exchanger 406.

A specified amount of the heated mixture of the ASW powder, AC powder, or combination thereof; and the asphalt coating can be conveyed from storage tank 405 into second mixer 407 where the at least one filler material 408, described herein, is introduced to the heated mixture of the ASW powder, AC powder, or combination thereof; and the asphalt coating. A sufficient amount of shear is applied to form the ASW powder filled coating, AC powder filled coating, or combination thereof.

The ASW powder filled coating, the AC powder filled coating, or combination thereof can be fed into surge tank 409 where the ASW powder filled coating, the AC powder filled coating, or combination thereof can be stirred until homogenous. The ASW or AC powder filled coating can be transported to coater 410 where, in some embodiments, the ASW powder filled coating, the AC powder filled coating, or combination thereof is applied to a fiberglass mat to form a coated fiberglass mat; and where, in some embodiments, at least one of granules or sand are applied to the coated fiberglass mat to form an asphalt shingle.

Figure 5:
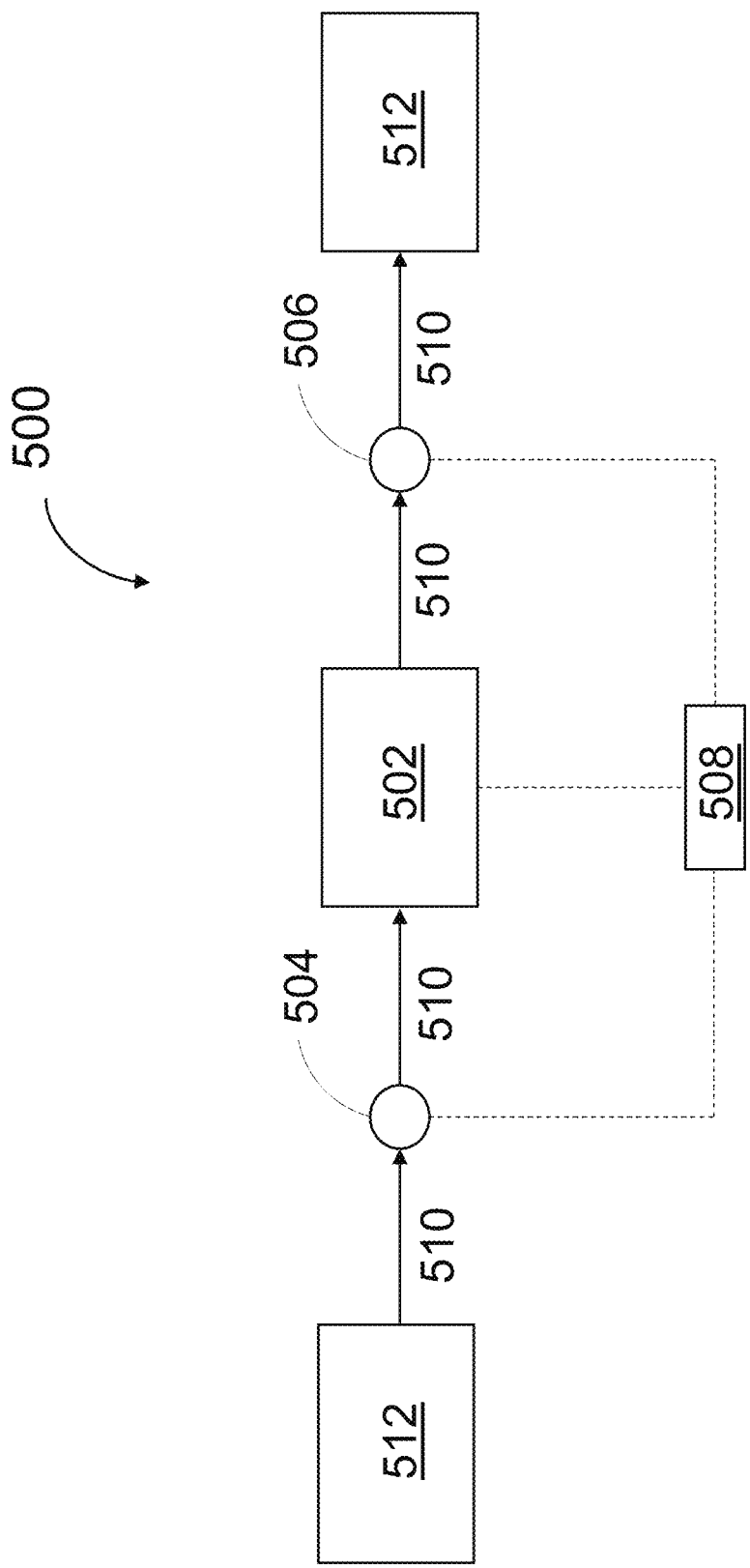
FIG. 5 is a schematic diagram of a system and method for drying an asphalt shingle waste, according to some embodiments.

FIG. 5 is a schematic diagram of a system and method 500 for drying an asphalt shingle waste, according to some embodiments. As shown in FIG. 5, in some embodiments, the system and method 500 comprise at least one of a microwave dryer 502, a sensor 504 upstream of the microwave dryer 502, a sensor 506 downstream of the microwave dryer 502, a controller 508, a conveyer system 510, or any combination thereof. In some embodiments, the sensor 504 is communicatively coupled to the controller 508 via one or more signal transmission lines. In some embodiments, the sensor 506 is communicatively coupled to the controller 508 via one or more signal transmission lines. In some embodiments, the controller 508 is communicatively coupled to the microwave dryer 502 via one or more signal transmission lines. In FIG. 5, the one or more signal transmission lines is represented by dashed lines. In some embodiments, the conveyor system 510 comprises a conveyor belt. In some embodiments, the system and method 500 further comprises a fan for exhausting gases/vapors (e.g., water vapor). In some embodiments, the fan comprises a slow flowing exhaust fan.

In some embodiments, the sensor 504 is configured to measure a moisture content of the asphalt shingle waste. In some embodiments, the moisture content of the asphalt shingle waste is measured by the sensor 504 at a location upstream of the microwave dryer 502. In some embodiments, the moisture content of the asphalt shingle waste is measured by the sensor 504 at a location downstream of at least one process 510. In some embodiments, the sensor 504 is configured to transmit a signal to the controller 508. In some embodiments, the signal transmitted by the sensor 504 is correlative to the moisture content of the asphalt shingle waste as measured by the sensor 504. Non-limiting examples of the sensor 504 include, without limitation, at least one of capacitance sensors, volumetric sensors, potential sensors, resistance sensors, frequency domain reflectometry sensors, time domain reflectometry sensors, or any combination thereof. In some embodiments, the system and method 500 does not comprise the sensor 504.

In some embodiments, the sensor 506 is configured to measure a moisture content of the asphalt shingle waste. In some embodiments, the moisture content of the asphalt shingle waste is measured by the sensor 506 at a location downstream of the microwave dryer 502. In some embodiments, the moisture content of the asphalt shingle waste is measured by the sensor 506 at a location upstream of at least one process 512. In some embodiments, the sensor 506 is configured to transmit a signal to the controller 508. In some embodiments, the signal transmitted by the sensor 506 is correlative to the moisture content of the asphalt shingle waste as measured by the sensor 506. Non-limiting examples of the sensor 506 include, without limitation, at least one of capacitance sensors, volumetric sensors, potential sensors, resistance sensors, frequency domain reflectometry sensors, time domain reflectometry sensors, or any combination thereof. In some embodiments, the system and method 500 does not comprise the sensor 506.

In some embodiments, the controller 508 is a control device. In some embodiments, the control device comprises a processor and a memory. In some embodiments, the controller 508 is configured to receive signals from the sensor 504. In some embodiments, the controller 508 is configured to receive signals from the sensor 504 for monitoring a moisture content of the asphalt shingle waste at a location upstream of the microwave dryer 502. In some embodiments, the controller 508 is configured to receive signals from the sensor 504 for monitoring a moisture content of the asphalt shingle waste at an inlet of the microwave dryer 502. In some embodiments, the controller 508 is configured to receive signals from the sensor 506. In some embodiments, the controller 508 is configured to receive signals from the sensor 506 for monitoring a moisture content of the asphalt shingle waste at a location downstream of the microwave dryer 502. In some embodiments, the controller 508 is configured to receive signals from the sensor 506 for monitoring a moisture content of the asphalt shingle waste at the outlet of the microwave dryer 502.

In some embodiments, the controller 508 is configured to transmit signals to the microwave dryer 502. In some embodiments, the signals transmitted by the controller 508 to the microwave dryer 502 are configured to control at least one parameter of the microwave dryer 502. In some embodiments, the at least one parameter comprises at least one of a frequency of emitted microwaves, an output power of the microwave dryer, or any combination thereof. In some embodiments, the controller 508 is configured to transmit signals in response to signals received from the sensor 504. In some embodiments, the controller 508 is configured to transmit signals in response to signals received from the sensor 506. In some embodiments, the controller 508 is configured to transmit signals and receive signals on a continuous basis over time. In some embodiments, the controller 508 is configured to transmit and receive signals on an intermittent basis over time. In some embodiments, the controller 508 is configured to monitor and control a moisture content of the asphalt shingle waste by receiving signals from the sensors 504, 506 and transmitting signals to the microwave dryer 502.

In some embodiments, the controller 508 is configured to compare the measured moisture content of the asphalt shingle waste to a set point value. In some embodiments, the set point value is a parameter setting the desired moisture content of the asphalt shingle waste. In some embodiments, the set point value is a parameter set in reference to a specific location. In some embodiments, the set point value is set in reference to the moisture content of the asphalt shingle waste upstream of the microwave dryer. In some embodiments, the set point value is set in reference to the moisture content of the asphalt shingle waste downstream of the microwave dryer. In some embodiments, the set point value is a single value.

In some embodiments, when the moisture content of the asphalt shingle waste is measured to be above the set point value, the controller 508 is configured to transmit a signal to the microwave dryer 502. In some embodiments, when the moisture content of the asphalt shingle waste is measured to be above the set point value, the controller 508 is configured to transmit a signal to the microwave dryer 502. In some embodiments, when the moisture content of the asphalt shingle waste is measured to be below the set point value, the controller 508 is configured to transmit a signal to the microwave dryer 502. In some embodiments, when the moisture content of the asphalt shingle waste is measured to be above the set point value, the controller 508 is configured to transmit no signal to the microwave dryer 502. In some embodiments, when the moisture content of the asphalt shingle waste is measured to be below the set point value, the controller 508 is configured to transmit no signal to the microwave dryer 502.

In some embodiments, in response to the signal, the microwave dryer is configured to increase the output power of the microwave dryer 502. In some embodiments, in response to the signal, the microwave dryer 502 is configured to decrease the output power of the microwave dryer 502. In some embodiments, in response to the signal, the microwave dryer 502 is configured to increase the frequency of the microwaves emitted by the microwave dryer 502. In some embodiments, in response to the signal, the microwave dryer 502 is configured to decrease the frequency of the microwaves emitted by the microwave dryer 502. In some embodiments, in response to the signal, the microwave dryer 502 is configured not to adjust any parameter of the microwave dryer 502. It will be appreciated that other parameters of the microwave dryer 502 may be adjusted in response to the signal from the controller 508, without departing from the scope of this disclosure.

In some embodiments, when the moisture content of the asphalt shingle waste is measured to be above the set point value, the output power of the microwave dryer 502 is increased. In some embodiments, when the moisture content of the asphalt shingle waste is measured to be above the set point value, the output power of the microwave dryer 502 is decreased. In some embodiments, when the moisture content of the asphalt shingle waste is measured to be above the set point value, the frequency of the microwaves emitted by the microwave dryer 502 is increased. In some embodiments, when the moisture content of the asphalt shingle waste is measured to be above the set point value, the frequency of the microwaves emitted by the microwave dryer 502 is decreased.

In some embodiments, when the moisture content of the asphalt shingle waste is measured to be below the set point value, the output power of the microwave dryer 502 is increased. In some embodiments, when the moisture content of the asphalt shingle waste is measured to be below the set point value, the output power of the microwave dryer 502 is decreased. In some embodiments, when the moisture content of the asphalt shingle waste is measured to be below the set point value, the frequency of the microwaves emitted by the microwave dryer 502 is increased. In some embodiments, when the moisture content of the asphalt shingle waste is measured to be below the set point value, the frequency of the microwaves emitted by the microwave dryer 502 is decreased.

In some embodiments, the set point value is a set point range.

In some embodiments, when the moisture content of the asphalt shingle waste is measured to be within the set point range, the controller 508 is configured to transmit a signal to the microwave dryer 502. In some embodiments, when the moisture content of the asphalt shingle waste is measured to be outside the set point range, the controller 508 is configured to transmit a signal to the microwave dryer 502. In some embodiments, when the moisture content of the asphalt shingle waste is measured to be within the set point range, the controller 508 is configured to transmit no signal to the microwave dryer 502. In some embodiments, when the moisture content of the asphalt shingle waste is measured to be outside the set point range, the controller 508 is configured to transmit no signal to the microwave dryer 502.

In some embodiments, in response to the signal, the microwave dryer 502 is configured to increase the output power of the microwave dryer 502. In some embodiments, in response to the signal, the microwave dryer 502 is configured to decrease the output power of the microwave dryer 502. In some embodiments, in response to the signal, the microwave dryer 502 is configured to increase the frequency of the microwaves emitted by the microwave dryer 502. In some embodiments, in response to the signal, the microwave dryer 502 is configured to decrease the frequency of the microwaves emitted by the microwave dryer 502. In some embodiments, in response to the signal, the microwave dryer 502 is configured not to adjust any parameter of the microwave dryer 502. It will be appreciated that other parameters of the microwave dryer 502 may be adjusted in response to the signal from the controller 508, without departing from the scope of this disclosure.

In some embodiments, when the moisture content of the asphalt shingle waste is measured to be within the set point range, the output power of the microwave dryer 502 is increased. In some embodiments, when the moisture content of the asphalt shingle waste is measured to be within the set point range, the output power of the microwave dryer 502 is decreased. In some embodiments, when the moisture content of the asphalt shingle waste is measured to be within the set point range, the frequency of the microwaves emitted by the microwave dryer 502 is increased. In some embodiments, when the moisture content of the asphalt shingle waste is measured to be within the set point range, the frequency of the microwaves emitted by the microwave dryer 502 is decreased.

In some embodiments, when the moisture content of the asphalt shingle waste is measured to be outside the set point range, the output power of the microwave dryer 502 is increased. In some embodiments, when the moisture content of the asphalt shingle waste is measured to be outside the set point range, the output power of the microwave dryer 502 is decreased. In some embodiments, when the moisture content of the asphalt shingle waste is measured to be outside the set point range, the frequency of the microwaves emitted by the microwave dryer 502 is increased. In some embodiments, when the moisture content of the asphalt shingle waste is measured to be outside the set point range, the frequency of the microwaves emitted by the microwave dryer 502 is decreased.

In some embodiments, the set point value is a moisture content of 2% by weight based on the total weight of the asphalt shingle waste. In some embodiments, the set point range is a moisture content of 2% by weight or less based on the total weight of the asphalt shingle waste. In some embodiments, the set point range is a moisture content of 0.1% to 2% by weight based on the total weight of the asphalt shingle waste. In some embodiments, the set point range is a moisture content of greater than 2% by weight based on the total weight of the asphalt shingle waste. In some embodiments, the set point range is a moisture content of greater than 2% to 99% by weight based on the total weight the asphalt shingle waste.

In some embodiments, the controller 508 is a specialized computer device (e.g., the controller 508 is not a general computer), comprising at least one of a processor, a memory, a program, or any combination thereof. In some embodiments, the program comprises an adaptive or intelligent program configured to adjust or not adjust at least one parameter of the microwave dryer 502 without human intervention.

Some embodiments relate to a method. In some embodiments, the method comprises obtaining an asphalt shingle waste. In some embodiments, the method comprises exposing the asphalt shingle waste to microwaves emitted by a microwave dryer. In some embodiments, the asphalt shingle waste has a first moisture content at an inlet of the microwave dryer. In some embodiments, the asphalt shingle waste has a second moisture content at an outlet of the microwave dryer. In some embodiments, the second moisture content of the asphalt shingle waste is less than the first moisture content of the asphalt shingle waste. In some embodiments, the method comprises processing the asphalt shingle waste.

In some embodiments, the asphalt shingle waste comprises waste asphalt.

In some embodiments, the asphalt shingle waste comprises at least one of limestone, granules, impurities, or any combination thereof.

In some embodiments, the asphalt shingle waste has an average particle size of at least 425 microns.

In some embodiments, the asphalt shingle waste has an average particle size of 425 microns to 6350 microns.

In some embodiments, the microwave dryer is configured to emit microwaves at a frequency in a range of 700 MHz to 1500 MHz.

In some embodiments, the microwave dryer is configured to emit microwaves at an output power of 5 kW to 150 kW.

In some embodiments, the asphalt shingle waste at the inlet of the microwave dryer has a moisture content of 15% by weight or less based on a total weight of the asphalt shingle waste.

In some embodiments, the asphalt shingle waste at the outlet of the microwave dryer has a moisture content of 2% by weight or less based on a total weight of the asphalt shingle waste.

In some embodiments, the asphalt shingle waste has a first temperature at the inlet of the microwave dryer. In some embodiments, the asphalt shingle waste has a second temperature at the outlet of the microwave dryer. In some embodiments, the second temperature of the asphalt shingle waste is within 10% of the first temperature of the asphalt shingle waste.

In some embodiments, the asphalt shingle waste has a first average particle size at the inlet of the microwave dryer. In some embodiments, the asphalt shingle waste has a second average particle size at the outlet of the microwave dryer. In some embodiments, the second average particle size of the asphalt shingle waste is within 10% of the first average particle size of the asphalt shingle waste.

In some embodiments, the asphalt shingle waste is processed into an asphalt shingle waste powder.

In some embodiments, the asphalt shingle waste is processed into a plurality of briquettes.

In some embodiments, the asphalt shingle waste is processed into an asphalt shingle waste filled coating.

In some embodiments, the method further comprises measuring a moisture content of the asphalt shingle waste, so as to obtain a measured moisture content.

In some embodiments, the moisture content of the asphalt shingle waste is measured at a location upstream of the microwave dryer.

In some embodiments, the moisture content of the asphalt shingle waste is measured at a location downstream of the microwave dryer.

In some embodiments, when the moisture content of the asphalt shingle waste is measured to be below a set point, an output power of the microwave dryer is not adjusted.

In some embodiments, the method further comprises adjusting at least one parameter of the microwave dryer in response to the measured moisture content.

In some embodiments, when the moisture content of the asphalt shingle waste is measured to be above a set point, an output power of the microwave dryer is increased.

In some embodiments, when the moisture content of the asphalt shingle waste is measured to be below a set point, an output power of the microwave dryer is decreased.

In some embodiments, the method is a continuous process.

In some embodiments, the method is a batch process.

Some embodiments relate to a method. In some embodiments, the method comprises obtaining an asphalt shingle waste. In some embodiments, the method comprises exposing the asphalt shingle waste to microwaves emitted by a microwave dryer. In some embodiments, the asphalt shingle waste has a first moisture content at an inlet of the microwave dryer. In some embodiments, the asphalt shingle waste has a second moisture content at an outlet of the microwave dryer. In some embodiments, the second moisture content of the asphalt shingle waste is less than the first moisture content of the asphalt shingle waste. In some embodiments, the method comprises measuring a moisture content of the asphalt shingle waste, so as to obtain a measured moisture content. In some embodiments, the method comprises adjusting at least one parameter of the microwave dryer in response to the measured moisture content. In some embodiments, the method comprises processing the asphalt shingle waste.

In some embodiments, the asphalt shingle waste comprises waste asphalt. In some embodiments, the asphalt shingle waste comprises at least one of limestone, granules, impurities, or any combination thereof.

In some embodiments, the asphalt shingle waste has an average particle size of at least 425 microns.

In some embodiments, the asphalt shingle waste has an average particle size of 425 microns to 6350 microns.

In some embodiments, the microwave dryer is configured to emit microwaves at a frequency in a range of 700 MHz to 1500 MHz.

In some embodiments, the microwave dryer is configured to emit microwaves at an output power of 5 kW to 150 kW.

In some embodiments, the asphalt shingle waste at the inlet of the microwave dryer has a moisture content of 15% by weight or less based on a total weight of the asphalt shingle waste.

In some embodiments, the asphalt shingle waste at the outlet of the microwave dryer has a moisture content of 2% by weight or less based on a total weight of the asphalt shingle waste.

In some embodiments, the asphalt shingle waste has a first temperature at the inlet of the microwave dryer. In some embodiments, the asphalt shingle waste has a second temperature at the outlet of the microwave dryer. In some embodiments, the second temperature of the asphalt shingle waste is within 10% of the first temperature of the asphalt shingle waste.

In some embodiments, the asphalt shingle waste has a first average particle size at the inlet of the microwave dryer. In some embodiments, the asphalt shingle waste has a second average particle size at the outlet of the microwave dryer. In some embodiments, the second average particle size of the asphalt shingle waste is within 10% of the first average particle size of the asphalt shingle waste.

In some embodiments, the asphalt shingle waste is processed into an asphalt shingle waste powder.

In some embodiments, the asphalt shingle waste is processed into a plurality of briquettes.

In some embodiments, the asphalt shingle waste is processed into an asphalt shingle waste filled coating.

In some embodiments, the moisture content of the asphalt shingle waste is measured at a location upstream of the microwave dryer.

In some embodiments, the moisture content of the asphalt shingle waste is measured at a location downstream of the microwave dryer.

In some embodiments, when the moisture content of the asphalt shingle waste is measured to be below a set point, an output power of the microwave dryer is not adjusted.

In some embodiments, when the moisture content of the asphalt shingle waste is measured to be above a set point, an output power of the microwave dryer is increased.

In some embodiments, when the moisture content of the asphalt shingle waste is measured to be below a set point, an output power of the microwave dryer is decreased.

In some embodiments, the method is a continuous process.

In some embodiments, the method is a batch process.

EXAMPLE

Asphalt shingle waste was fed to a microwave dryer at a feed rate of 35 FPM. The asphalt shingle waste was exposed to microwaves emitted by the microwave dryer. The operating parameters of the microwave that were varied included, among others, microwave power (kW). The moisture content of the asphalt shingle waste at the inlet of the microwave dryer and at the outlet of the microwave dryer was measured. The percentage reduction in moisture content of the asphalt shingle waste exiting the microwave dryer is summarized in Table 1 below.

TABLE 1

| Trial No. | % Reduction in Moisture Content |
| --- | --- |
| 1 | 30% |
| 2 | 35% |
| 3 | 36% |
| 4 | 38% |
| 5 | 41% |
| 6 | 45% |
| 7 | 49% |
| 8 | 50% |

TABLE 1-continued

| Trial No. | % Reduction in Moisture Content |
| --- | --- |
| 9 | 54% |
| 10 | 55% |
| 11 | 56% |
| 12 | 56% |
| 13 | 59% |
| 14 | 60% |
| 15 | 64% |

As shown in Table 1, the microwave dryer unexpectedly reduced the moisture content of the asphalt shingle waste. The extent to which the moisture content of the asphalt shingle waste was reduced varied with the microwave power. In general, a greater percentage reduction in moisture content of the asphalt shingle waste was observed with increasing microwave power.

What is claimed is:

1. A method comprising:
   obtaining an asphalt shingle waste;
   feeding the asphalt shingle waste at a first temperature to an inlet of a microwave dryer;
   exposing the asphalt shingle waste to microwaves emitted by the microwave dryer;
   discharging the asphalt shingle waste at a second temperature at an outlet of the microwave dryer,
      wherein the second temperature is a temperature of 140° F. or less;
      wherein a moisture content of the asphalt shingle waste at the outlet of the microwave dryer is less than a moisture content of the asphalt shingle waste at the inlet of the microwave dryer; and
   processing the asphalt shingle waste.

2. The method of claim 1,
   wherein the asphalt shingle waste at the inlet of the microwave dryer has a moisture content of 2% to 20% by weight based on a total weight of the asphalt shingle waste;
   wherein the asphalt shingle waste at the outlet of the microwave dryer has a moisture content of 0.1% to 2% by weight based on the total weight of the asphalt shingle waste.

3. The method of claim 1, wherein the second temperature is within 20% of the first temperature.

4. The method of claim 1, wherein the asphalt shingle waste comprises waste asphalt, limestone, granules, and impurities.

5. The method of claim 1, wherein the processing comprises forming the asphalt shingle waste into an asphalt shingle waste powder.

6. The method of claim 1, wherein the processing comprises forming the asphalt shingle waste into a plurality of briquettes.

7. The method of claim 1, wherein the processing comprises forming the asphalt shingle waste into an asphalt shingle waste filled coating.

8. A method comprising:
   obtaining an asphalt shingle waste;
   feeding the asphalt shingle waste at a first temperature to an inlet of a microwave dryer;
   exposing the asphalt shingle waste to microwaves emitted by the microwave dryer so as to reduce a moisture content of the asphalt shingle waste;
   discharging the asphalt shingle waste at a second temperature at an outlet of the microwave dryer, wherein the second temperature is a temperature of 140° F. or less;

wherein an average particle size of the asphalt shingle waste at the outlet of the microwave dryer is within 10% of an average particle size of the asphalt shingle waste at the inlet of the microwave dryer; and processing the asphalt shingle waste.

9. The method of claim 8, wherein the average particle size of the asphalt shingle waste at the outlet of the microwave dryer is within 5% of the average particle size of the asphalt shingle waste at the inlet of the microwave dryer.

10. The method of claim 8, wherein the second temperature is within 20% of the first temperature.

11. The method of claim 8, wherein the asphalt shingle waste comprises waste asphalt, limestone, granules, and impurities.

12. The method of claim 8, wherein the processing comprises forming the asphalt shingle waste into an asphalt shingle waste powder.

13. The method of claim 8, wherein the processing comprises forming the asphalt shingle waste into a plurality of briquettes.

14. The method of claim 8, wherein the processing comprises forming the asphalt shingle waste into an asphalt shingle waste filled coating.

15. A method comprising:
obtaining a plurality of briquettes,
wherein the plurality of briquettes comprises an asphalt shingle waste;
feeding the plurality of briquettes at a first temperature to an inlet of a microwave dryer;
exposing the plurality of briquettes to microwaves emitted by the microwave dryer; and
discharging the plurality of briquettes at a second temperature at an outlet of the microwave dryer,
wherein the second temperature is a temperature of 140° F. or less;
wherein a moisture content of the plurality of briquettes at the outlet of the microwave dryer is less than a moisture content of the plurality of briquettes at the inlet of the microwave dryer.

16. The method of claim 15, further comprising forming the plurality of briquettes into an asphalt shingle waste filled coating.

17. The method of claim 15, further comprising feeding the plurality of briquettes, an asphalt coating, and at least one filler material into a mixer; and mixing the plurality of briquettes the asphalt coating, and the at least one filler material in the mixer.

18. The method of claim 17, wherein the asphalt coating comprises at least one of an oxidized asphalt, a polymer-modified asphalt, or any combination thereof.

19. The method of claim 15, wherein the plurality of briquettes has an average dimension in a range of 0.5 inches to 2 inches.

20. The method of claim 15, wherein the moisture content of the plurality of briquettes at the outlet of the microwave dryer 30% to 99% less than the moisture content of the plurality of briquettes at the inlet of the microwave dryer.

\* \* \* \* \*